(12) United States Patent
Janssen et al.

(10) Patent No.: US 8,360,832 B2
(45) Date of Patent: Jan. 29, 2013

(54) METHOD AND DEVICE FOR PROCESSING A CARCASS PART OF SLAUGHTERED POULTRY

(75) Inventors: Petrus Christianus Hendrikus Janssen, Wilbertoord (NL); Gerardus Johannes Catharina Van Bussel, Neerkant (NL); Adrianus Josephes Van Den Nieuwelaar, Gemert (NL)

(73) Assignee: Stork PMT B.V., Boxmeer (NL)

( * ) Notice: Subject to any disclaimer, the term of this patent is extended or adjusted under 35 U.S.C. 154(b) by 0 days.

(21) Appl. No.: 13/460,299

(22) Filed: Apr. 30, 2012

(65) Prior Publication Data

US 2012/0238192 A1    Sep. 20, 2012

Related U.S. Application Data

(62) Division of application No. 12/086,129, filed as application No. PCT/NL2006/000632 on Dec. 11, 2006, now Pat. No. 8,192,258.

(30) Foreign Application Priority Data

Dec. 9, 2005 (NL) .................................. 1030638
Dec. 14, 2005 (NL) .................................. 1030671

(51) Int. Cl.
    *A22C 21/00* (2006.01)
(52) U.S. Cl. .................................................. 452/136
(58) Field of Classification Search .................. 452/135, 452/136, 149–153, 155, 156, 166, 167
See application file for complete search history.

(56) References Cited

U.S. PATENT DOCUMENTS

| | | | |
|---|---|---|---|
| 6,095,914 A * | 8/2000 | Cornelissen et al. | 452/179 |
| 6,142,863 A * | 11/2000 | Janssen et al. | 452/165 |
| 6,558,243 B2 * | 5/2003 | Minemura et al. | 452/149 |
| 7,198,564 B2 * | 4/2007 | Hino et al. | 452/135 |
| 7,344,437 B2 * | 3/2008 | Van Den Nieuwelaar et al. | 452/187 |
| 7,357,707 B2 * | 4/2008 | de Vos et al. | 452/136 |
| 7,614,941 B2 | 11/2009 | van den Nieuwelaar et al. | |
| 7,824,251 B2 * | 11/2010 | van den Nieuwelaar et al. | 452/185 |
| 2002/0102933 A1 | 8/2002 | Petrus Hetterscheid et al. | |

FOREIGN PATENT DOCUMENTS

| | | |
|---|---|---|
| CA | 2 427 901 A1 | 11/2004 |
| DE | 102 41 334 A1 | 3/2004 |
| EP | 0 118 963 A1 | 3/1983 |
| EP | 0 447 773 A1 | 2/1991 |
| EP | 0 965 506 A2 | 2/1996 |
| EP | 0 756 826 A2 | 2/1997 |
| EP | 1 191 852 A1 | 4/2002 |
| EP | 1 430 780 A1 | 6/2004 |
| EP | 1 574 133 A1 | 9/2005 |
| GB | 1 330 347 | 9/1973 |
| NL | 1000 935 C2 | 2/1997 |

* cited by examiner

*Primary Examiner* — Richard Price, Jr.
(74) *Attorney, Agent, or Firm* — Birch, Stewart, Kolasch & Birch, LLP

(57) ABSTRACT

A method for processing a carcass part of slaughtered poultry includes, the carcass part including bone parts with at least a part of the back of the rib cage and the spine, and at least a part of the meat that is naturally present on the back of the rib cage and the spine, the method includes detaching a part of the back meat from the underlying bone parts of the carcass part, and engaging at least a part of the detached back meat, and then peeling the back meat off the bone parts of the carcass part.

17 Claims, 66 Drawing Sheets

Figure 1:
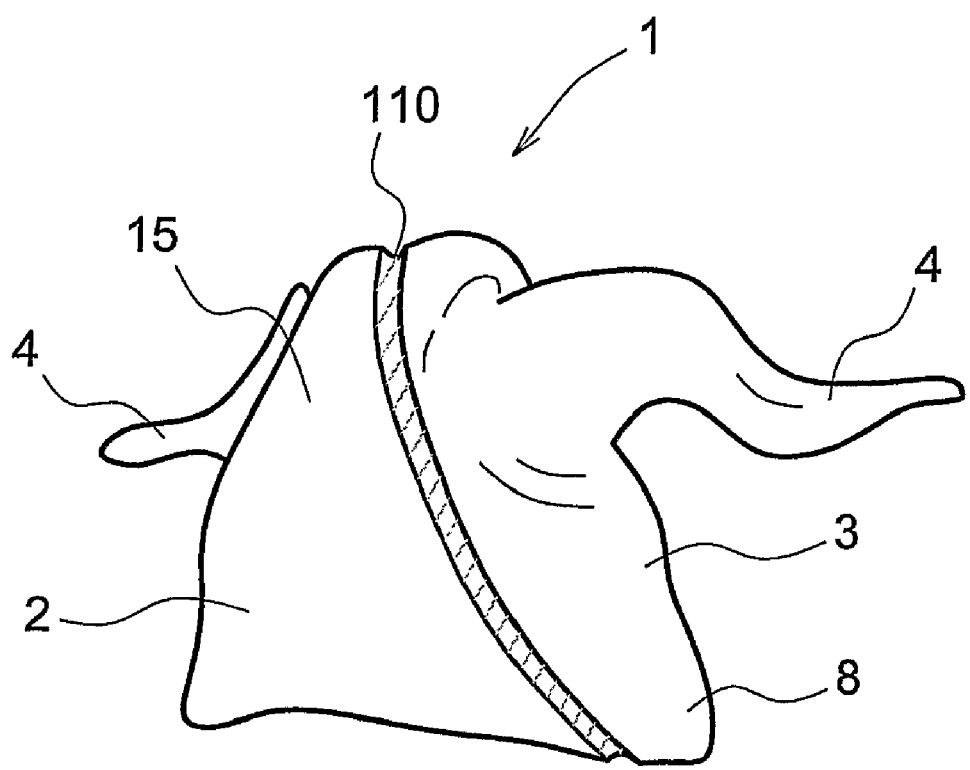

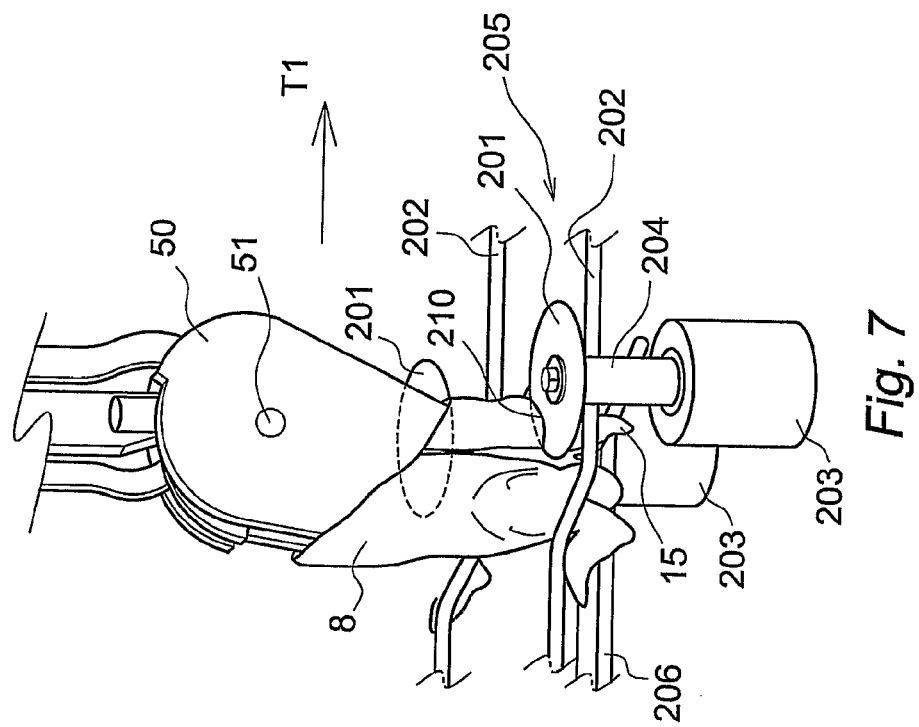
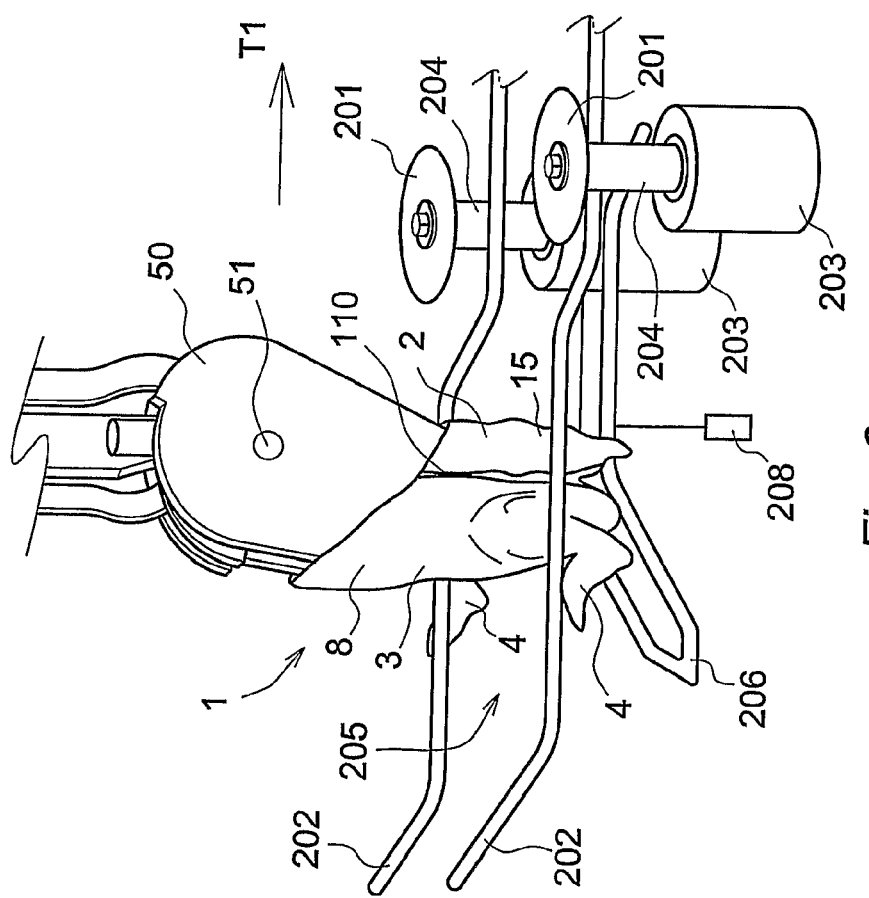
Fig. 6
Fig. 7

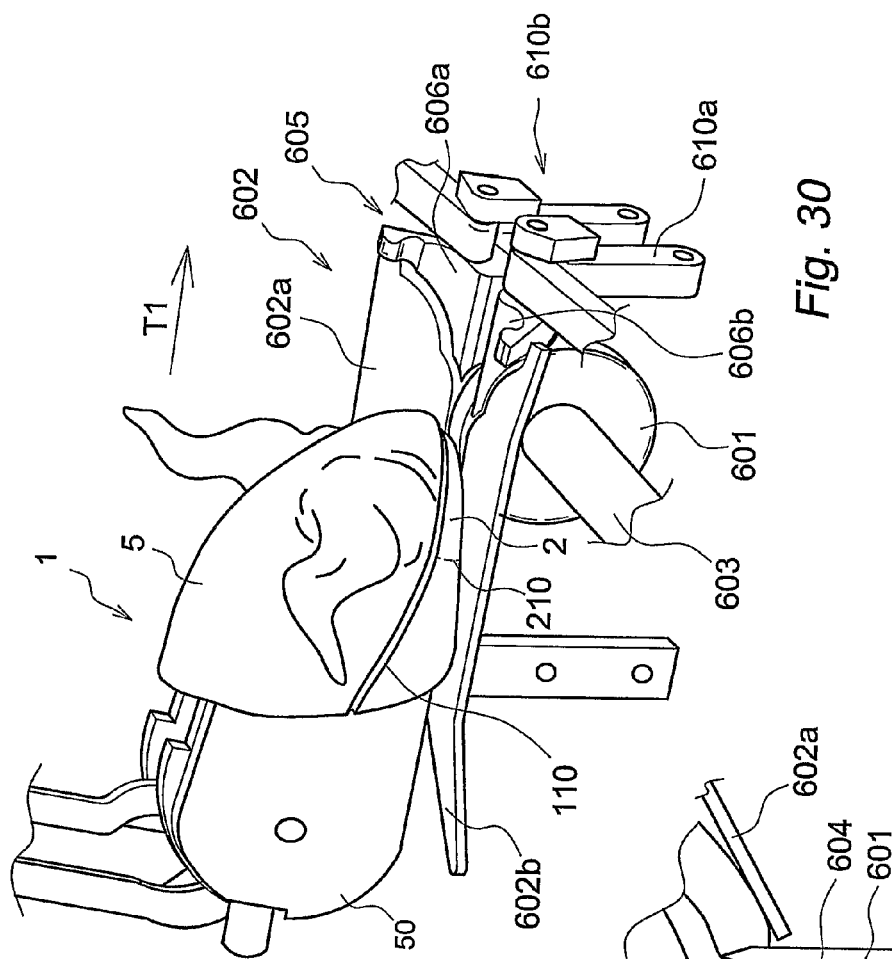
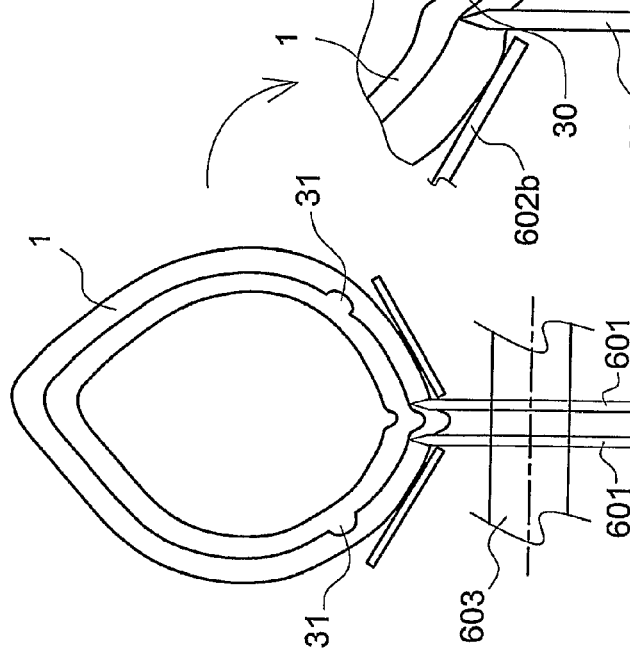

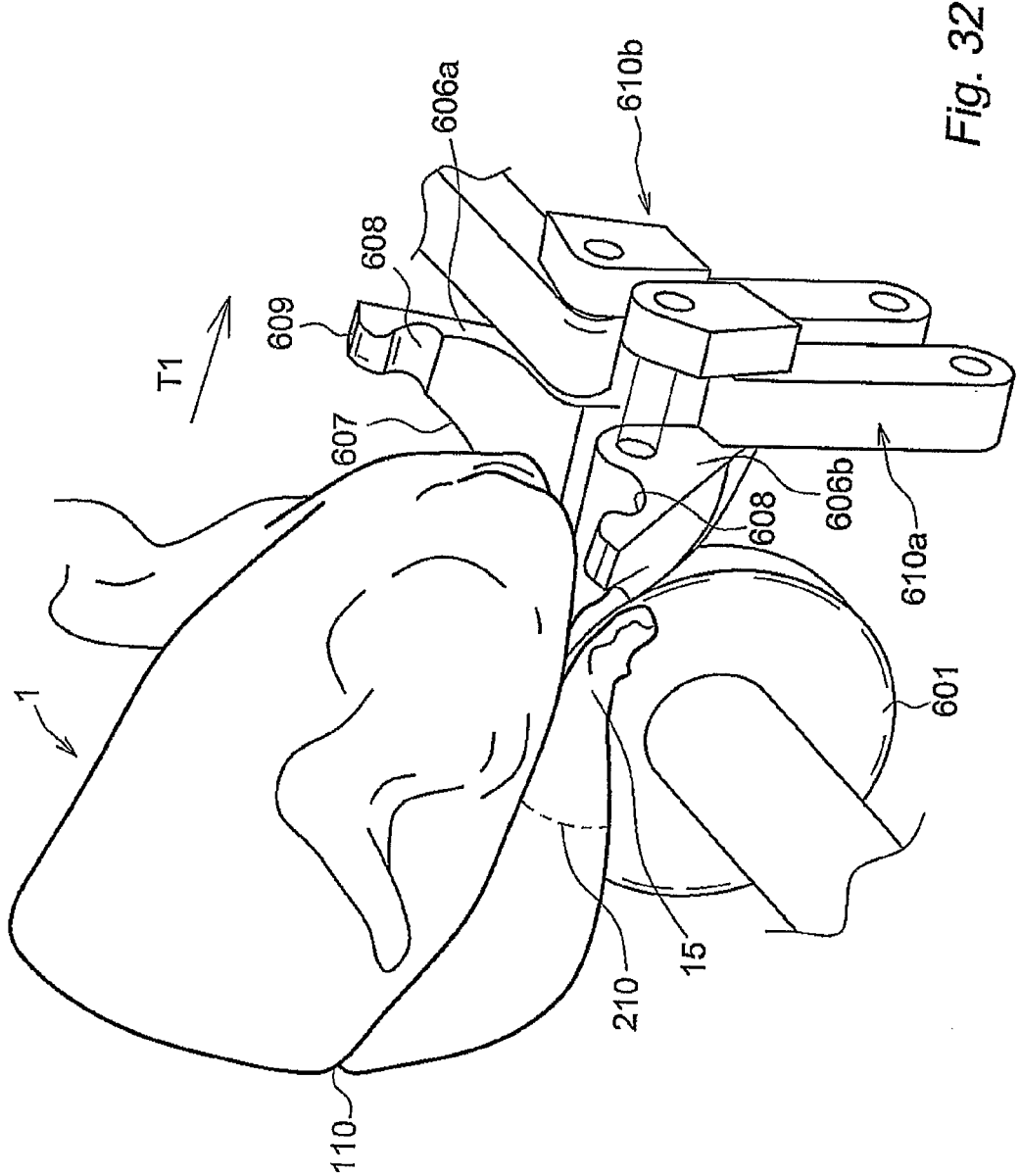

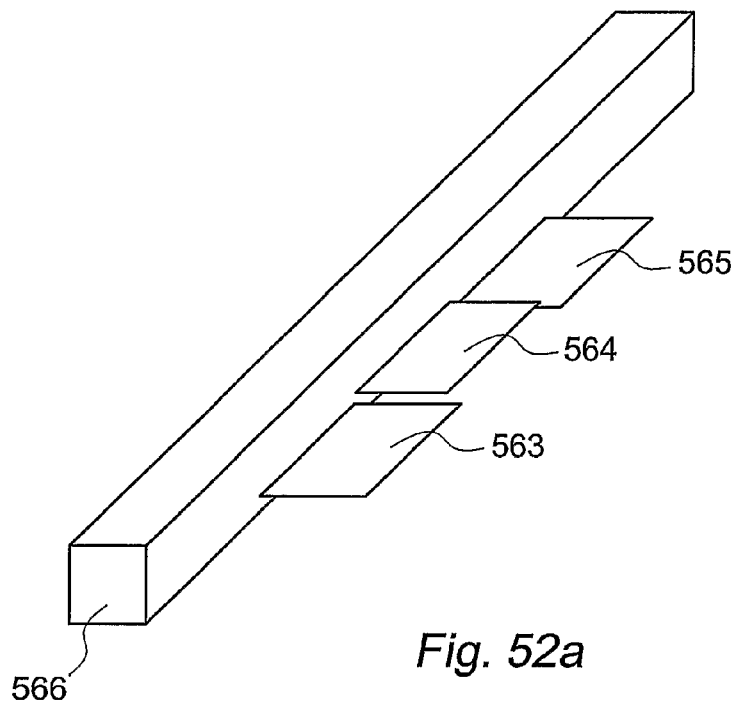
Fig. 52a
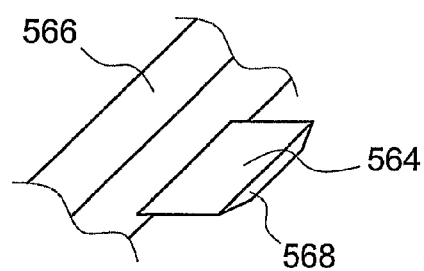 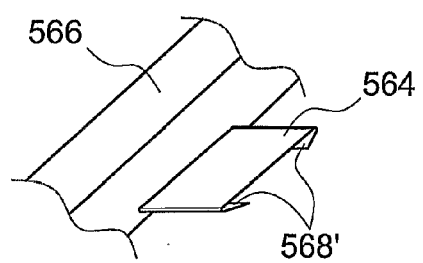
Fig. 52b  Fig. 52c

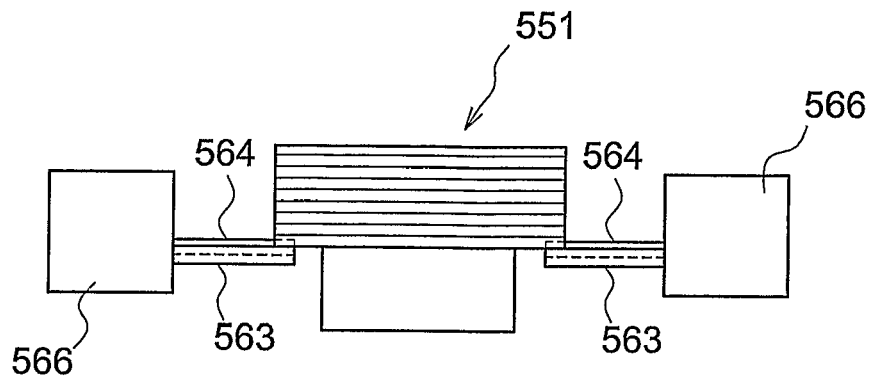
Fig. 53a
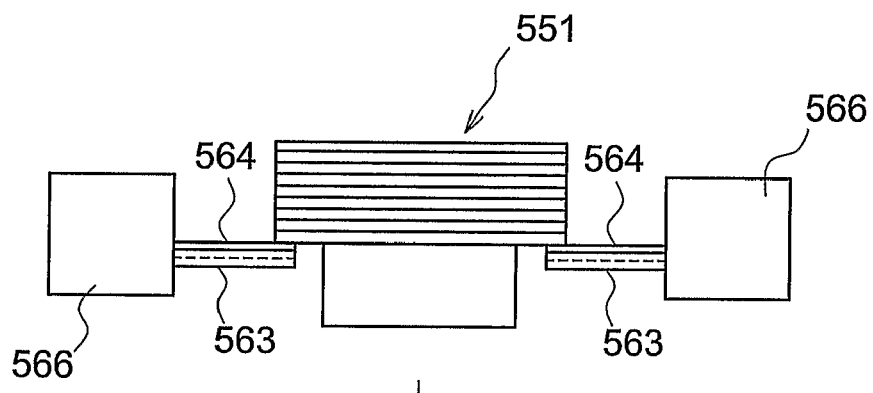
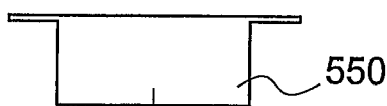
Fig. 53b

METHOD AND DEVICE FOR PROCESSING A CARCASS PART OF SLAUGHTERED POULTRY

CROSS-REFERENCE TO RELATED APPLICATIONS

This application is a Divisional of U.S. application Ser. No. 12/086,129, filed Jan.2,2009 now U.S. Pat. No. 8,192,258 which was filed as PCT/NL2006/000632 on Dec. 11, 2006, and which claims priority to application nos. 1030638 and 1030671, filed in The Netherlands on Dec. 9, 2005 and Dec. 14, 2005, respectively. The entirety of each of the above-identified applications is incorporated herein by reference.

The invention relates to processing a carcass part of slaughtered poultry.

The prior art has disclosed methods of processing carcass parts of slaughtered poultry into products that are attractive for the consumer such as loose inside and/or outer fillets, inside and outer fillets that are still connected to each other, half outer fillets (that is, an outer fillet from one side of the chicken) with or without the inner fillet still attached, wings with one, two or three members, back meat, quarters, drumsticks and the like.

Processing is carried out on a specific type of carcass part depending on the end product required or the group of end products required. Examples of such carcass parts are, for example, whole products (made oven-ready), front halves without wings, front halves with the first member of one or both wings, front halves with the first and second member of one or both wings, front halves with the first, second and third member of one or both wings, front halves of one of the aforementioned types with or without skin, breast caps, breast caps with long rib, breast caps with medium rib, half breast caps, breasts, breasts with short rib, back portions without wings, back portions with one or more wings or parts of wings. Variations of these types of carcass parts are also possible as a starting point for processing.

A carcass part to be processed is placed on a product carrier; this product carrier advances the carcass part to be processed along a path. Processing devices, which perform a specific process on the carcass part, are disposed along this path. The skilled person generally refers to such processing devices as "modules". This patent application relates to several such modules and the processes that they perform. The product carriers can engage on the inside of a carcass part that is to be processed. If the carcass part still comprises one or both legs or part of one or both legs, a product carrier can alternatively engage the leg that is present, the legs that are present, the leg parts that are present or the leg part that is present.

The control system of the slaughterhouse or processing factory where the carcass parts are being processed can, preferably, determine which processes should be carried out for each individual carcass part and which should not. The choice of which processes should be carried out can be determined, for example, by the specific characteristics of the individual carcass part or by the required output of specific products on a certain day.

Not performing a certain process on a carcass part can be effected by guiding the carcass part to be processed past the module concerned in such a way that the carcass part does not come into contact with the processing components (such as blades or scrapers) of the associated module. In an advantageous variation every module can be individually switched on or off.

In this type of system the user therefore has a large degree of flexibility with regard to which processes are performed and it is also possible to introduce flexibility into the sequence in which certain processes are performed. The flexibility with regard to the processing sequence is present in the design, set-up and adjustment to the processing line on account of the ability to select where the modules are disposed in relation to each other along the path.

EP 1 430 780 describes a method and a device for processing a carcass part of slaughtered poultry. The carcass parts to be processed comprise both bone parts and the meat that is naturally present on it. EP 1 430 780 describes various optimizations of the processing of such carcass parts, where the emphasis is largely on removing as much meat as possible from the bone parts.

A disadvantage of this approach is that the meat that is removed still often requires further trimming before it can be put into a tray in a manner that is visually attractive to the consumer.

The object of the invention is to propose improved methods and devices for processing a carcass part of slaughtered poultry.

According to various aspects of the invention an improvement is achieved by optimizing the positioning of one or more incisions. In this way the largest possible amount of the meat desired by the consumer can be harvested in a controlled manner instead of unwanted meat and other tissue (such as fat or pieces of bone) being harvested along with the desired meat. By only harvesting the desired meat subsequent trimming is no longer necessary or is no longer necessary to the extent required with the methods and devices according to the prior art.

Further, in modern slaughterhouses a considerable proportion of the carcasses of the slaughtered poultry is split up after being made oven-ready and cooled. Products such as legs, fillets, drumsticks, wings and the like are packed separately or with a number of similar products for sale to the consumer. During packaging the way in which the product is placed in the packaging is very important; after all the product must be presented in an attractive manner. In order to achieve this much of the work in the packaging department is still often carried out manually.

The prior art has disclosed systems for automatically packing meat products. The known systems comprise a vision-system with a camera; this system determines the position and orientation of each meat product that is to be packed. This vision-system is used to control a robot with a considerable number of degrees of freedom to pick up the product and to place the product in the packaging in the manner required. The known system is complicated and expensive.

The object of the invention is to propose an improved method and an improved system for processing a carcass part of slaughtered poultry.

Various aspects of the invention will be described below. Each of these aspects can be implemented using a separate device (often described as a "module" in the parlance of the skilled person), which can preferably be switched on and off. It is preferable that the control system of the slaughterhouse or the processing factory can determine for each carcass part whether the carcass part concerned should processed by the module involved or if it should be made to bypass the module involved.

The first aspect of the invention proposes a method for processing a carcass part of slaughtered poultry, which carcass part comprises:

bone parts with at least a part of the rib cage,
at least a part of the breast fillet,
other muscle tissue that does not form part of the breast fillet, for example at least a part of the back meat that is naturally present on the rib cage and the spine and/or at least a part of the abdominal muscle tissue, this method comprising the following steps:
making an incision through the meat at least up to the bone parts lying under the meat, which incision is made in an area between the breast fillet and the other muscle tissue that does not form part of the breast fillet, and which incision in that area substantially follows the shape of the breast fillet,
detaching the breast fillet from the bone parts of the carcass part.

The first aspect of the invention also proposes a device for processing a carcass part of slaughtered poultry, which carcass part comprises:
bone parts with at least a part of the rib cage,
at least a part of the breast fillet,
other muscle tissue that does not form part of the breast fillet, for example at least a part of the back meat that is naturally present on the rib cage and the spine and/or at least a part of the abdominal muscle tissue, this device comprising:
a blade for making an incision through the meat at least up to the bone parts lying under the meat, which incision is made in an area between the breast fillet and the other muscle tissue that does not form part of the breast fillet, and which incision in that area substantially follows the shape of the breast fillet,
an actuator for realizing a relative movement between blade and carcass part, this relative movement leading to an incision that extends substantially along the contour of the breast fillet.

Making a preliminary incision between the meat that is present on the breast fillet and the other muscle tissue that is present but which is not part of the breast fillet unequivocally defines which part of the meat that is present on the carcass part will be harvested as breast fillet and which part will not. This is also as a result of the fact that the depth of the incision is chosen in such a way that it extends at least up to the bone parts of the carcass part.

A possible advantage of making the preliminary incision is that the harvested fillets no longer require subsequent manual trimming. As a result savings can be made in labour costs. In addition it is possible that a greater yield of meat can be achieved because the preliminary incision according to the invention follows the anatomy of the breast fillet more accurately than is possible on average with a manual incision during the subsequent manual trimming. The manual incision must, after all, be performed quickly and with the free hand, which does not beneficial for the accuracy. In addition, an automatic incision is uniform, unlike a manual incision. The result of this is, amongst other things, that the products, the fillets in particular, can be presented in a uniform manner.

An example of other muscle tissue that is present on the carcass part according to the invention is back meat that is naturally present on at least a part of the rib cage and the spine. It is preferable that this back meat is harvested separately from the breast fillet after the incision according to the of the invention has been made. Making a preliminary incision between the back meat that is present and the meat that is present on the breast fillet therefore unequivocally defines which part of the meat that is present on the carcass part is to be harvested as breast fillet and which part is to be harvested as back meat.

Another example of other muscle tissue is abdominal muscle tissue. FIG. 1A shows a hatched area. The muscle tissue in this hatched area is the muscle tissue that is designated as "the abdominal muscle tissue" in this application. Some also refer to the muscle tissue in the hatched area of FIG. 1A as "ring muscle", despite that the muscle tissue concerned not, by definition, has to form a closed ring in the carcass part. The abdominal muscle tissue within the meaning of this application comprises at least the part of the m. obliquus externus abdominis, at least the part of the m. obliquus internus abdominis and at least the part of the m. transversus abdominis that lies within the hatched area of FIG. 1A. The abdominal muscle tissue forms a robust connection between the breast fillet and certain bone parts of the carcass part, such as the trabecula lateralis or the delta bone. The delta bone within the meaning of this application is indicated by the reference numeral 12 in FIG. 1B.

In this variation of the method according to the invention the breast fillet and the abdominal muscle tissue are separated from each other by an incision which mainly follows the contour of the breast fillet and which extends at least up to the bone parts of the carcass.

Separating the breast fillet and the abdominal muscle tissue has two different possible advantages. Firstly, the abdominal muscle tissue contains a relatively high amount of fat. This fat is undesirable and it is not harvested along with the breast fillet during harvesting. Secondly, on account of the connection between the abdominal muscle tissue and the breast fillet being severed, the breast fillet is less securely attached to the bone parts of carcass part, which means that less force is required to harvest the breast fillet. The possible advantage of this is that there is less chance of the delta bone being broken while the breast fillet is being harvested and of bone splinters subsequently remaining in the harvested meat, particularly in the fillet.

In order to effect the first aspect of the invention it is not necessary for the incision to be made precisely along the border of the hatched area in FIG. 1A and therefore all the abdominal muscle tissue falling within the hatched area of FIG. 1A to be separated from the breast fillet. In practice, the incision according to the first aspect of the invention can also be made in any other location in the hatched area of FIG. 1A. In that case part of the abdominal muscle tissue is harvested along with the breast fillet. The advantage of this is that a larger weight of meat is harvested, but the disadvantage is that there may still be bone splinters in the abdominal muscle tissue. The choice of the precise positioning of the incision in or close alongside of the hatched area in FIG. 1A can be made by the user of the device and method according to the first aspect of the invention. It is preferable that the device according to the first aspect of the invention permits the precise setting of the location of the incision.

In an advantageous embodiment the carcass part to be processed comprises both at least a part of the back meat and at least a part of the abdominal muscle tissue, and an incision is made that separates the breast fillet from both the part of the back meat that is present and the part of the abdominal muscle tissue that is present.

The optimal separation between breast fillet and back meat and/or abdominal muscle tissue is achieved when the incision runs past that location on the carcass part where the wing joint would be if a wing or a part thereof were present on the carcass part on the side of the back of the carcass part.

If on the carcass part skin remains on the breast fillet and/or the back in the area of the incision, then this skin is, of course, also cut through when the incision is made. The further possible advantage of this is that, as a result of the incision, the subcutaneous peritoneum is always removed together with the skin during the skinning. It is therefore no longer necessary to check that the peritoneum has, in fact, been removed.

Other possible advantages of making the incisions according to the first aspect of the invention are that the incision under the wing as described in EP1430780 A1 is no longer necessary and that the skin can be more easily removed from the breast. After all, in the known methods the skin is always torn loose from the other skin parts such as the back skin, whereas now it has already been cut loose before removal. Because the breast skin has now already been cut loose from the back skin, a defined portion of the skin is removed. Because only part of the total skin is removed in each process operation (for example, first only the breast skin and then only the back skin in a later process) less force is needed to remove the skin.

The incision can be straight, but it can also follow a curved path. The curved path can be achieved by pivoting the product carrier in relation to the blade that makes the incision in the carcass part. As an alternative the blade can also be pivoted or otherwise moved in relation to the product carrier. With a curved incision the contour of the breast fillet can be followed more accurately.

After the incision has been made, the breast fillet and possibly other usable meat, such as the back meat for example, can be removed from the bone parts of the carcass part. If the carcass part still comprises at least a part of a wing it is preferable that the breast fillet is removed from the bone parts of the carcass part by pulling on this wing part, in the manner described in EP 1430780 A1 for example. As an alternative or if the carcass part does not comprise a wing part the breast fillet can be detached from the bone parts of the carcass part by scraping.

In practice it has been found that it is favourable if the carcass part is mainly oriented in the horizontal direction while the incision is being made.

The method according to the first aspect of the invention can be used in combination with various types of product carriers. The type of product carrier chosen will in practice mainly be determined by the type of carcass part that is being processed. It is therefore evident for example that when processing front halves or breast caps or breast caps with short, medium or long rib a product carrier will be chosen that engages on the inside of the carcass part and that when processing carcass parts that comprise at least a part of a leg a product carrier will be chosen that engages on a leg part.

Assuming that the carcass part to be processed is a front half it is envisaged that the method according to the first aspect of the invention will be implemented in such a way that the incision also cuts through at least a part of bone parts of the rib cage. In this way a breast cap is cut from the carcass part and this breast cap can then be further processed later.

The first aspect of the invention also relates to a device for processing a carcass part of slaughtered poultry, which carcass part comprises:
   bone parts with at least a part of the rib cage,
   at least a part of the breast fillet,
   other muscle tissue that does not form part of the breast fillet, for example at least a part of the back meat that is naturally present on the rib cage and the spine and/or at least a part of the abdominal muscle tissue,
this device comprising:
   a blade for making an incision through the meat at least up to the bone parts lying under the meat, which incision is made in an area between the breast fillet and the other muscle tissue that does not form part of the breast fillet, and which incision in that area substantially follows the shape of the breast fillet,
   an actuator for realizing a relative movement between blade and carcass part, this relative movement leading to an incision that extends substantially along the contour of the breast fillet.

It is preferable that the device according to the first aspect of the invention comprises at least one guide that keeps any wing parts that are present on the carcass part away from the blade.

It is preferable that the device according to the first aspect of the invention also comprises a control element to control the pivoting of the product carrier in relation to the blade or to control the pivoting or other movement of the blade in relation to the product carrier. In this way a curved incision which closely follows the natural contour of the breast fillet can be made in an effective manner.

In the second aspect of the invention too, a primary consideration is to ensure that the largest possible quantity of meat desired by the consumer is harvested in a controlled manner, instead of allowing unwanted meat and unwanted other tissue (such as fat or pieces of bone) to be harvested along with the desired meat. By harvesting only the desired meat subsequent trimming remains limited or is even no longer required.

The second aspect of the invention achieves this object by a method for processing a carcass part of slaughtered poultry, which carcass part comprises:
   bone parts with at least a part of the rib cage and a part of the spine,
   at least a part of the back meat that is naturally present on the rib cage and the spine,
   at least a part of the abdominal muscle tissue,
   this method comprising the following steps:
   making a first incision through the back meat near the abdominal muscle tissue at least up to the underlying bone parts of the carcass part,
   detaching the back meat from the bone parts of the carcass part.

The second aspect of the invention also achieves this object by a device for processing a carcass part of slaughtered poultry, which carcass part comprises:
   bone parts with at least a part of the rib cage and a part of the spine,
   at least a part of the back meat that is naturally present on the rib cage and the spine,
   at least a part of the abdominal muscle tissue,
this device comprising:
   a cutting device with a blade for making a first incision through the back meat next to the abdominal muscle tissue at least up to the underlying bone parts of the carcass part.

The carcass part that is processed according to the second aspect of the invention comprises, amongst other things, the abdominal muscle tissue. FIG. 1A shows a hatched area. The muscle tissue in this hatched area is the muscle tissue that is designated as "the abdominal muscle tissue" in this application. The abdominal muscle tissue within the meaning of this application comprises at least the part of the m. obliquus externus abdominis, at least the part of the m. obliquus internus abdominis and at least the part of the m. transversus abdominis that lie within the hatched area of FIG. 1A. The abdominal muscle tissue forms a robust connection between the breast fillet and certain bone parts of the carcass part, such as the trabecula lateralis or the delta bone. The delta bone within the meaning of this application is indicated by the reference number 12 in FIG. 1B.

The abdominal muscle tissue contains a relatively high amount of fat. Because of this it is undesirable that this muscle tissue (or a part of it) is harvested together with the back meat or the breast fillet. In addition, the abdominal muscle tissue robustly anchors the back meat to the bone parts of the carcass part, the delta bone in particular. In practice it is common that because of the abdominal muscle tissue the connection between the back meat and the delta bone is stronger than the delta bone itself and as a result the delta bone breaks when detaching the back meat from the bone parts of the carcass. This results in bone splinters being present in the harvested back meat, which is, of course undesirable.

In the method and the device according to the second aspect of the invention a first incision is made through the back meat, this first incision separating the back meat and the abdominal muscle tissue from each other. In this way the abdominal muscle tissue remains attached to the delta bone. When the back meat is removed from the bone parts of the carcass part the abdominal muscle tissue now remains behind on the bone parts. In addition it is not necessary to exert any force on the delta bone to detach the meat from the carcass parts. In this way there is no danger of the delta bone breaking under the force that is exerted on it while the meat is being detached.

Making the incision according to the second aspect of the invention can easily be combined with making the incision according to the first aspect of the invention. Two separate incisions can be made. In this way the incision according to the first aspect can firstly be made and then the incision according to the second aspect can be made. The reverse order is however also possible. It is also possible to combine these two incisions into a single incision, which preferably follows at least a part of the contour of the abdominal muscle tissue.

In practice it has been found that good results can be achieved if the incision between the abdominal muscle tissue and the back meat runs mainly perpendicular to the bone parts of the carcass part. It is even more favourable if the incision between the breast fillet and the other muscle tissue, such as the back meat and/or the abdominal muscle tissue for example, runs mainly perpendicular to the bone parts of the carcass part.

It is preferable that the incision between the abdominal muscle tissue and the back meat runs closely above the attachment of the back meat to the underside of the rib cage. "Above" and "below" in this context relate to the natural posture of live poultry. The incision is therefore on the same side of the connection of the back meat to the rib cage as where the head sits on live poultry.

It is preferable that the incision between back meat and abdominal muscle tissue and/or the incision between the back meat and the breast fillet follows the contour of the abdominal muscle tissue as closely as possible. In this manner the largest amount possible of desired meat can be harvested.

The second aspect of the invention also relates to a device for processing a carcass part of slaughtered poultry, which carcass part comprises:
- bone parts with at least a part of the rib cage and a part of the spine,
- at least a part of the back meat that is naturally present on the rib cage and the spine,
- at least a part of the abdominal muscle tissue, this device comprising:
- a cutting device with a blade for making a first incision through the back meat next to the abdominal muscle tissue at least up to the underlying bone parts of the carcass part.

In this device a blade is provided to make an incision through the back meat at least up to the bone parts of the carcass part, which incision separates the abdominal muscle tissue from the back meat in such a way that the abdominal muscle tissue remains attached to the delta bone.

This blade can also be used to make the incision between the breast fillet and other muscle tissue, such as the incision between the breast fillet and the back meat and/or the incision between the breast fillet and the abdominal muscle tissue. This incision can, however, also be made using another blade.

The blade can be designed in the form of a rotating blade, but it is equally possible to use a static blade.

A third aspect of the invention is directed to making preparations for skinning. In filleting systems skin that remains for example on the breast of a carcass part is often removed.

EP 1430780 describes a device and a method for removing skin where the skin is tucked up and then removed by, for example, skinning rollers which engage the tucked up skin.

EP1430780 describes a toothed tucking-up member. A disadvantage of the toothed tucking-up member is that after it has been used for some time the teeth become clogged with skin and/or fat. Because of this contamination the tucking-up member becomes less effective relatively quickly.

The object of a third aspect of the invention is to propose an improved device for skinning a carcass part of slaughtered poultry, this device being, in particular, provided with an improved tucking-up member.

The third aspect of the invention achieves this object using a device for processing a carcass part, which carcass part comprises at least meat with skin attached,
this device comprising:
- a skinning means for detaching the skin from the meat of the carcass part,
- a tucking-up means to tuck up the skin before the skinning means detaches the skin from the meat of the carcass part, which tucking-up means is provided with teeth for engaging the skin of the carcass part to be processed, characterized in that, the tucking-up means is provided with an air duct with an inlet and an outlet, where an air supply can be connected to the inlet of the air duct, and where the outlet of the air duct is located in or in the immediate vicinity of the teeth, in such a way that an airflow through the air duct can blow away any contamination that may be present on the teeth.

In this device an improved tucking-up means is provided that has one or more air ducts, each with an outlet in or in the immediate vicinity of the teeth. By connecting an air supply, which can supply air at a pressure higher than the ambient pressure, to an air duct air flows out of the outlet of each connected air duct. This airflow blows away any contamination, such as skin and/or fat remnants, that may be on the teeth. In this way the teeth stay clean and do not silt up. Because of this the tucking-up means can continue to function correctly even after an extended period of uninterrupted use.

In an advantageous embodiment each tooth of the toothing on the tucking-up means is provided with an outlet from an air duct.

In an advantageous embodiment the tucking-up means can move—preferably pivot—under the influence of the forces that are exerted on it while the skin is being tucked up. It is preferable that the tucking-up means is resiliently mounted. This resilient mounting can be achieved using a tension spring, torsion spring or compression spring or using a lever with counterweight.

In a further advantageous embodiment there a valve is provided to open and close the supply of air to the outlet of one or more air ducts. Energy can be saved by only supplying air when necessary (namely when there is contamination on the teeth that must be removed). In an advantageous variation the valve is actuated by the movement, more specifically, by the pivoting of the tucking-up means.

In a further advantageous variation an underpressure can also be created in the air ducts. By applying this underpressure when a carcass part pushes the tucking-up means down the skin of the carcass part to be processed is subjected to greater resistance whereby it can be tucked up in a more effective manner.

After tucking up, the skinning means engages the skin of the carcass part and the skinning means detaches the skin from the meat of the carcass part. This can be done in a known manner, for example using one or more pairs of rollers disposed in parallel, which rollers preferably have a helical profile.

A fourth aspect of the invention is directed to an improvement in detaching the back meat.

According to the fourth aspect of the invention this is achieved by a method for processing a carcass part of slaughtered poultry, which carcass part comprises:
  bone parts with at least a part of the back of the rib cage and the spine,
  at least a part of the back meat that is naturally present on the back of the rib cage and the spine,
this method comprising the following steps:
  making two incisions on the back side of the carcass part, which incisions extend on either side of the spine and which incisions separate the back meat from the spine on either side of the spine,
  detaching at least a part of the back meat that is naturally present on the carcass part using a scraper, which scraper has a cutting edge with a curved shape in a plane that substantially extends perpendicular to the direction of the spine, which curved shape substantially matches the side of the back of the contour of the bone parts of the carcass part from which the back meat must be detached, as seen in the direction of the spine, which cutting edge is sharp so that the connection between the back meat and the bone parts of the carcass part is cut through, in which detachment of the back meat by the scraper starts from the incisions along the spine, and in which the carcass part and the scraper move relative to each other while the meat is being detached.

According to the fourth aspect of the invention this is also achieved by a device for processing a carcass part of slaughtered poultry,
which carcass part comprises:
  at least a part of the back,
  at least a part of the meat that is naturally present on the back,
this device comprising:
  a guide for guiding and positioning the carcass part to be processed in relation to the device,
  at least one blade for making two incisions on the back side of the carcass part, which incisions extend on each side of the spine and which incisions separate the back meat from the spine on either side of the spine,
  a scraper for detaching at least a part of the back meat that is present on the carcass part, which scraper has a cutting edge with a curved shape in a plane that extends substantially perpendicular to the direction in which the spine extends, which curved shape matches substantially the side of the back of the contour of the bone parts of the carcass part from which the back meat must be detached, as seen in the direction of the spine, which cutting edge is sharp and directly adjacent to the blade in such a way that the detaching of the back meat by the scraper starts from the incision along the spine.

When the carcass part enters the device according to the fourth aspect of the invention the back of the carcass part is guided and positioned by a guide. In a preferred embodiment this guide comprises two mainly parallel plates that are positioned a short distance from each other. These plates extend mainly in the conveying direction of the carcass parts.

When the back of the carcass part has been positioned the connection of the back meat to the bone parts of the carcass part is broken on either side of the spine. This can be achieved using rotating blades or static blades. It is preferable that two rotating blades mounted next to each other are used which, in a preferred embodiment, extend into the space between the parallel plates of the guide.

Next, the back meat is at least partly scraped loose from the bone parts of the carcass part. This is done by a relative movement of the carcass part along a scraper. The scraper can have a mainly stationary mounting. In that case a product carrier advances the carcass part along the scraper. The other way around, the scraper can also move and the product carrier can mainly hold the carcass part to be processed still. In addition, a combination of a movement of the carcass part to be processed and a movement of the scraper is possible.

The scraper has a hollow shape, of which the internal shape mainly matches the outer contour of the back side of the system of bone parts of a carcass part to be processed. In addition, the scraper, as seen in the conveying direction of the carcass parts, has a cutting edge that rises on each side. This edge is on the front of the scraper, as seen in the conveying direction of the carcass parts, and is therefore the first part of the scraper that each carcass part comes into contact with. It is preferable that the cutting edge has a curved shape.

By using a sharp scraping edge it is no longer necessary to use a separate blade to start detaching the back meat, as in the devices and methods that have been disclosed by the prior art. The cutting edge severs the initially robust connection between the back meat and the bone parts of the carcass part.

The scraper is arranged in such a way that the cutting edge is directly adjacent to the blades that sever the origin of the back meat on both sides of the spine. As a result the cutting edge of the scraper inserts into the incisions that have been made by the blades concerned. A right positioning of the scraper in relation to the blades can be achieved by a resilient arrangement of the scraper. If rotating blades are used for severing the connection between the back meat and the spine the scraper can, preferably, move resiliently around an axis that coincides with the rotation axis of the rotating blades.

It is preferable that the scraper comprises at least one recess that ensures that the wing joint can pass the scraper without being damaged.

It is preferable that the carcass part is supported on the scraper during scraping.

It is preferable that the scraper comprises two scraper members formed as mirror images of each other. It is more preferable that the scraper members can move transverse to the conveying direction of the carcass part. The advantages of this are that by controlling a movement in the transverse direction the shape of the bone parts of the carcass part can be better followed and that the scraper can be switched on and off.

It is preferable that the scraper has such a shape that the back meat that is scraped loose is moved away from the bone parts of the carcass part.

It is preferable that in the device according to the fourth aspect of the invention the carcass part to be processed is guided into the device in such a manner that during processing of the carcass part the spine lies mainly in the conveying direction and the back is directed downwardly.

Following the performing of the method according to the fourth aspect of the invention, the back meat may have been fully detached from the bone parts of the carcass part, but it is also possible that there is still a connection between the back meat and the bone parts of the carcass part. This is particularly advantageous when the method according to the fourth aspect of the invention is used in preparation for the method according to the fifth aspect of the invention which will be explained further below.

A fifth aspect of the invention is directed to an improvement in harvesting back meat.

According to the fifth aspect of the invention this is achieved with a method for processing a carcass part of slaughtered poultry,
which carcass part comprises:
  bone parts with at least a part of the back of the rib cage and the spine,
  at least a part of the meat that is naturally present on the back of the rib cage and the spine,
this method comprising the following steps:
  detaching a part of the back meat from the underlying bone parts of the carcass part,
  engaging at least a part of the detached back meat, and then peeling the back meat off the bone parts of the carcass part.

According to the fifth aspect of the invention this is also achieved with a device for processing a carcass part of slaughtered poultry,
which carcass part comprises:
  bone parts with at least a part of the back of the rib cage and the spine,
  at least a part of the back meat that is naturally present on the back of the rib cage and the spine, which back meat has been partly detached from the bone parts of the carcass part,
this device comprising:
  a gripper for engaging on at least a part of the previously detached back meat, and
  a peeler for peeling the back meat off the bone parts of the carcass.

According to the prior art the back meat is harvested from the bone parts of a carcass part in a bone press. The disadvantage of this is that the high-quality structure of the back meat is almost entirely lost. Considering the demand for high-quality meat, harvesting the back meat using a bone press is unfavourable. In addition, a higher price can be demanded for unpressed meat which increases the return per processed carcass part.

Peeling the back meat off the carcass retains the relative high-quality structure of the back meat. In addition, the device according to the fifth aspect of the invention is smaller, simpler and cheaper than the known devices for removing back meat from a carcass part.

The meaning of "peeling off" is as follows: initially the back meat is attached to the bone parts of the carcass part across a considerable part of the surface. There is therefore a connecting surface between the back meat and the bone parts of the carcass part. At a part of the back meat the connection with the bone parts of the carcass part has, however, already been severed, by scraping for instance. This loose-hanging meat is then gripped after which a peeling force is exerted on this loose meat. This peeling force works on the connection between the still attached back meat and the underlying bone parts of the carcass part via the loose meat. By applying the peeling force the back meat is gradually detached from the bone parts of the carcass part instead of being detached with more or less a single pull as in the prior art. As a result the back meat remains largely intact. In comparison with the known method and the known device the back meat detached according to the invention is more intact at the location of the connecting surface with the bone parts of the carcass part.

In practice it has been found that peeling off the back meat can be achieved in an effective manner by having at least two rollers, each of which is provided with a profile on the outside, engage the part of the back meat that has already been detached. These rollers then hold the meat securely and also peel the meat off the bone parts of the carcass part.

The profile on the rollers can be helical. The helix can be formed by a continuous, raised edge or by projections which stand some distance from each other being positioned along a helical line.

The most effective peeling of the back meat is achieved if the carcass part is moved in relation to the rollers, particularly if the carcass part moves mainly in the axial direction of the rollers. Apart from that, it is possible to achieve effective peeling of the meat by moving the carcass part mainly in the direction of the spine, whereby the axial direction of the rollers encloses an acute angle with the conveying direction of the carcass parts.

Preferably, the helical profile of the rollers chosen is such that during peeling-off the rollers move the back meat in a direction that is opposite to the conveying direction.

It is preferable that there is some space between the rollers so that the carcass part can be moved between the rollers, allowing the rollers to engage more on the sides of the carcass part. The existence of the space between the rollers has the important advantage that the back meat is not crushed between the rollers but retains it original, high-quality structure.

It is advantageous if the part of the back meat that has already been detached from the bone parts of the carcass hangs free of the bone parts of the carcass part when the gripper engages on the back meat. In this way the gripper can more easily grasp the back meat.

It is preferable that the carcass part is fed into the device according to the fifth aspect of the invention in a position in which the back is turned downwards. In this way gravity pulls the previously detached parts of the back meat downwards.

It is preferable that the carcass part can also pivot, preferably around an axis that extends mainly perpendicular to the carcass part's plane of symmetry while the back meat is peeled off. In this way the direction of the force with which the back meat is unwound is adapted to the anatomy of the carcass part.

The method and the device according to the fifth aspect of the invention can easily be combined with the use of a product carrier that engages on the inside of the carcass part.

It is preferable that the rollers are mounted mainly parallel. This produces the best results in practice. In addition it is preferable that the rollers are resiliently mounted.

In an advantageous embodiment engaging and peeling is achieved by a combination of four rollers. It is preferable that these rollers are positioned in relation to each other in such a manner that, as seen in the axial direction of the rollers, they approximate the contour of the carcass part to be processed as seen in the direction of the spine. This will ensure secure engagement and peeling.

The sixth aspect of the invention is directed to an improvement in harvesting breast fillets.

According to the sixth aspect of the invention this improvement is realized by a method for processing a carcass part of slaughtered poultry, which carcass part comprises:
- bone parts with at least a part of the rib cage, and at least a part of the sternum,
- at least a part of the meat that is naturally present on the rib cage, which meat comprises at least a part of the outer fillet and at least a part of an inner fillet,
- at least a part of the membrane that is naturally present between the inner fillet and the outer fillet, this method comprising the following steps:
- making an preliminary incision on both sides of the sternum, which preliminary incision leaves the part of the membrane that is present between the inner fillet and the outer fillet intact,
- scraping loose the meat that lies against the sternum on either side using a first scraper,
- scraping at least a part of the meat of the inner fillet loose from the rib cage using a second scraper,
- cutting through the membrane connection between the inner fillet and the rib cage,
- removing the outer fillet and the inner fillet from the bone parts of the carcass part, in which the connection between the inner fillet and the outer fillet remains intact.

According to the sixth aspect of the invention this improvement is also realized by a device for processing a carcass part of slaughtered poultry,
which carcass part comprises:
- at least a part of the rib cage,
- at least a part of the sternum,
- at least a part of the meat that is naturally present on the rib cage, which meat comprises at least a part of the outer fillet and a part of at least an inner fillet, this device comprising:
- a blade for making a preliminary incision on either side of the sternum, which preliminary incision leaves the membrane between the inner fillet and the outer fillet intact,
- a first scraper for scraping loose the meat that lies against the sternum on either side,
- a second scraper from the rib cage for scraping loose a part of the meat of the inner fillet that is naturally present on the rib cage,
- a second blade to cut through the membrane connection between the inner fillet and the rib cage.

In a known manner of harvesting the breast fillets, the breast fillets are first halved by a double incision on both sides along the sternum. With the known preliminary incision the membrane connection between the inner fillet ("second fillet") and the outer fillet is severed. As a result the inner fillets remain behind on the bone parts of the carcass part to be processed when the outer fillets are removed. The inner fillets must then be harvested separately.

In the method and the device according to the sixth aspect of the invention the membrane connection between the inner fillet and the outer fillet remains intact when the preliminary incision is made. As a result the inner fillet and the outer fillet can be harvested simultaneously. Keeping the membrane between the inner fillet and the outer fillet intact can be achieved in practice by not having the preliminary incision along the sternum run through up to the bone parts of the carcass part. The preliminary incision according to the sixth aspect of the invention does sever the tendons that connect the fillet halves to each other on both sides of the sternum and to the sternum through the meat up to the beginning of the inner fillets.

It is preferable that the preliminary incisions are made as close as possible along the sternum.

In the method and the device according to the sixth aspect of the invention the meat on both sides of the sternum, the inner fillet in particular, is then partly scraped loose. In practice it has been found that a scraper without a cutting edge produces good results here. A cutting edge can be used here if desired, though.

It is preferable that the scraper for detaching the meat on both sides of the sternum comprises two scraper members, each of which works on one side of the sternum. It is preferable that this scraper moves as closely as possible along the sternum and, during this process, follows the contour of the sternum. This can easily be achieved in the design by resiliently mounting the scraper members of the scraper that scrapes the meat loose on both sides of the sternum (the first scraper). In this way the natural variations in the shape and dimensions of the sternum can easily be accommodated. It is preferable that the scraper members of the first scraper are resiliently mounted in such a way that they can move in multiple directions, for example in two separate directions that are mainly perpendicular to each other such as horizontal and vertical.

Scraping the meat loose on both sides of the sternum also leads to the meat on both sides of the sternum being pressed away towards the outside, i.e. away from the sternum. It is preferable that the first scraper is formed in such a way that the meat is already pushed away a little along the rib cage.

Next a second scraper scrapes loose the meat that is naturally present on the rib cage. It is preferable that the second scraper comprises two scraper members, each of which works on one side of the rib cage. More preferably still, the two scraper members are connected to each other.

In practice it has been found that also these scraper members do not need to have a cutting edge. The advantage of this is that the service life of the scraper members is longer or that they can be made from a less hard material. After all, the scraper member will have to be sharpened or replaced as soon as a cutting edge becomes blunt due to wear. The scraper members that can be used in the first and second scraper do not suffer from this problem as they do not need to be provided with a cutting edge.

It is preferable that the second scraper is also resiliently mounted so that the natural variation in the shape and the dimensions of the rib cage can be accommodated.

After the meat has been scraped loose from the rib cage there is still a membrane connection between the inner fillet or outer fillets and the rib cage. This membrane connection is relatively strong and cannot just be broken without further damage by scraping. Therefore the sixth aspect includes a provision for this membrane to be broken by cutting it through.

This cutting is done in the device according to the invention by a blade that is preferably designed as a blade that can be actuated. In an advantageous embodiment such a blade is fitted to each of the two scraper members of the second scraper. Two rotating blades can also be included as an alternative to the actuatable blades.

Now the inner fillet and the outer fillet can be removed from the bone parts of the carcass part together. It is preferable for the carcass part that is to be processed to still comprise one or more wing parts and the inner fillet and outer fillet are removed together by exerting a tensile force on at least one wing part.

The seventh aspect of the invention is directed to an improved method and an improved device for processing a carcass part of slaughtered poultry.

The sixth aspect of the invention makes it possible to harvest the outer fillet and the inner fillet in such a manner that they remain connected to each other after harvesting. Traditionally, the outer fillet is first at least partly detached from the rib cage, while the inner fillet or inner fillets that are present still remain connected to the bone parts of the carcass part. By detaching the outer fillets, the inner fillets and the connections between the inner fillets and the bone parts of the carcass part are exposed. During this process the tendon that connects the inner fillet to the wing joint is also exposed. This tendon extends mainly into the canalis triosseus and in harvested fillets it can be seen as an elongated piece of white tendon tissue.

Fillet purchasers who set high quality requirements generally require that as little as possible of this tendon is present. It is preferable that the tendon has been severed in such a location that no loose-hanging parts of the tendon are still present on the fillet.

EP1070456 describes a method where first the outer fillet is largely detached from the part of the rib cage that is present. As a result the part of the outer fillet that has been detached hangs down and consequently the inner fillet and its connections with the bone parts of the carcass become exposed. After this the tendon concerned is severed.

The known method is not suitable for use in combination with the sixth aspect of the invention as described in this application. Because the outer fillets have not yet been detached from the rib cage the outer fillets will be cut into if the method that is described in EP1070456 is used and this is undesirable.

In another known method the outer fillet is first removed from the carcass part. In the first instance the inner fillets remain behind on the carcass part. Next the tendons that connect the inner fillets to the bone parts of the carcass part are scraped loose and/or cut loose, after which the inner fillets are harvested by at least two people who are positioned next to the line. This is hard and monotonous work. Furthermore, this method requires the use of a number of machines and using this method it is not possible to harvest inner fillets that are still connected to the associated outer fillet.

Using the device and method according to the seventh aspect of the invention the object is to cut through the tendon between the inner fillet and the wing joint while the outer fillet is still attached to the part of the rib cage that is present on the carcass part to be processed. Because of this it is possible to combine the method according to the sixth aspect and the method according to the seventh aspect of the invention, during which process the inner fillet and the outer fillet can be harvested together, connected to each other, while the white tendon can still be neatly cut off. This object is achieved with a device for processing a carcass part of slaughtered poultry, which carcass part, at the start of the process, comprises:
  bone parts with at least a part of the rib cage, at least a part of the clavicle, and at least a part of the wing joint,
  at least a part of the outer fillet, where the part of the outer fillet that is present is connected to the part of the rib cage that is present,
  at least a part of the inner fillet,
  at least a tendon that connects the inner fillet to the wing joint,
this device comprising:
  an outer fillet guide to maintain at least a part of the outer fillet in the first position,
  a clavicle guide to hold the free ends of the wishbone in the second position,
  at least one blade to cut through the tendon.

The object is also achieved by a method for processing a carcass part of slaughtered poultry using a device according to the seventh aspect of the invention, which carcass part, at the start of processing, comprises:
  bone parts with at least a part of the rib cage, at least a part of the clavicle, and at least a part of the wing joint,
  at least a part of the outer fillet, where the part of the outer fillet that is present is connected to the part of the of the rib cage that is present,
  at least a part of the inner fillet,
  at least a tendon which connects the inner fillet to the wing joint,
this method comprising the following steps:
  exposing the tendon by pushing away at least a part of the outer fillet up to a first position away from the free ends of the clavicle, using an outer fillet guide and by pushing the free ends of the clavicle up to a second position away from the outer fillet using a wishbone guide and,
  cutting through the tendon while the outer fillet is in the first position and the free ends of the clavicle are in the second position.

In order to implement the method according to the seventh aspect of the invention the connection between the wing joint on the one hand and the outer fillet and the wishbone on the other hand has been broken on the carcass part to be processed. Because of this some flexibility is achieved in the outer fillet on the neck side of the carcass part in relation to the bone parts of the carcass part.

In a possible embodiment the method according to the seventh aspect of the invention is performed on a carcass part from which the wishbone has been removed. In this process a relatively large opening is created on the neck side of the carcass part.

When the carcass part is fed into the device according to the seventh aspect of the invention the outer fillet comes into contact with an outer fillet guide. This outer fillet guide engages on the outer fillet on the side of the opening that was created when the wishbone was removed, therefore on the side where the neck previously was present. The outer fillet guide pushes the part of the outer fillet, on which it is engaging away from the clavicle. The outer fillet guide keeps the outer fillet pressed away while passing by the blades that cut through the tendon. The pressed-away position of the top part of the outer fillet is known as the "first position".

When the carcass part is fed into the device according to the seventh aspect of the invention the free ends of the clavicle are engaged by a clavicle guide. The clavicle guide keeps the free ends of the clavicle in a second position while passing by the blades that cut through the tendon pass by.

The carcass part is on a product carrier during the processing operation according to the seventh aspect of the invention. It is preferable that this product carrier advances the carcass part to be processed past the guides and the blade or blades according to the seventh aspect of the invention. It is preferable that the product carrier holds the carcass part in such a way that the breast of the carcass part is directed downwardly and the spine is mainly horizontal and transverse to the path that the carcass part follows past the device according to with the seventh aspect of the invention. When the breast is directed downwardly the outer fillet guide holds the top part of the outer fillet pressed down and the clavicle guide prevents the free ends of the clavicle being pushed up by the blade or the blades while the tendon is severed. If the spine (where present; if there is no spine then this means the spine should this have been present) is to be oriented mainly transverse to the path it is possible to position the outer fillet guide and the clavicle guide parallel to the path.

In this embodiment it is in addition advantageous for the product carrier to press the carcass part upwards against the guides. This results in both the outer fillet and the free ends of the clavicle lying against their respective guides under a little pressure.

Pressing the outer fillet down and preventing the free ends of the clavicle from moving too far up exposes the tendon that is to be cut through. This makes the tendon accessible to a blade.

It is preferable that the tendon is cut through by a rotating blade. A static blade can be used as an alternative. In an advantageous embodiment two rotating blades are used, which are disposed next to each other along the path. It is preferable that the blades rotate in opposite directions. If one or more rotating blades are used it is preferable that they are provided with a serrated edge.

The aforementioned often refers to "the tendon". However, each inner fillet has a tendon which connects it to the associated wing joint. In general, the methods and device according to the seventh aspect of the invention will be used to process carcass parts where both inner fillets are still present. In that case both tendons will then be cut through using the method and device according to the invention.

According to the eighth aspect of the invention a method is proposed for processing a carcass part of slaughtered poultry, this method comprising the following steps:

performing a process on the carcass part using a processing device, in which the carcass part has a predefined position and orientation in relation to the processing device, during which processing at least a harvestable part of the carcass part is separated from the rest of the carcass part, conveying the harvestable part to a tray using a feed device, where the orientation of the harvestable part relative to the feed device is known beforehand based on the orientation of the harvestable part relative to the processing device, depositing the harvestable part of the carcass part in the tray in a predefined position and in a predefined orientation.

According to the eighth aspect of the invention also a device is proposed for processing a carcass part of slaughtered poultry, this system comprising:

a product carrier for holding the carcass part, a processing device for performing a process on the carcass part, in which the carcass part is in a predefined position and orientation in relation to the processing direction, during which processing at least one harvestable part of the carcass part is separated from the rest of the carcass part, a powerable feed device for feeding the harvestable part of the carcass part into a tray, where the orientation of the harvestable part in relation to the feed device is known beforehand based on the orientation of the harvestable part in relation to the processing device, a packaging station for holding a tray into which the feed device can deposit the harvestable part in a predefined position and with a predetermined orientation.

In the method and the system according to the eighth aspect of the invention use is made of the known orientation of the carcass part to be processed in relation to the processing device. The position and orientation of the harvestable part during processing are therefore also known. Use can be made of this known orientation and position of the harvestable part when packaging the harvestable parts and that is in the following manner. The feed device receives the harvestable part from the carcass part and deposits it in the tray that serves as the packaging. By receiving each harvestable part from the carcass part in the same way each harvestable part has the same orientation in relation to the feed device. The point at which the feed device engages the harvestable part too is always the same, obviously this is apart from the natural variations in the shape and size of the harvestable parts.

During packaging the intention is that each harvestable is placed in the packaging in the same, reproducible and inviting manner. Because the feed device engages each harvestable part in the same orientation and at the same location the feed motion that the feed device imposes on the harvestable part between the processing device and the tray can be the same in every case. Because of this complex control and complicated regulation are no longer required and the design of the feed device can be very simple.

Examples of harvestable parts that are suitable for use in the method and the system according to the invention are, for instance, fillets (single, double), legs, quarters, skinless thighs, drumsticks, whole wings or parts of wings. Following separation from the rest of the carcass part the harvestable parts can be coated if desired.

Depending on the carcass part to be processed a product carrier can position and orient the carcass part in relation to the processing device. During this process the product carrier can, for example, engage in the breast cavity or abdominal cavity of the carcass part or onto one or more leg parts.

It is envisaged that the harvestable part is placed in a buffer between the time that the harvestable part is separated from the rest of the carcass part and the harvestable part being fed into the tray. In this step the harvestable part will be placed in the buffer in a predefined orientation so that the feed device that feeds the harvestable part into the tray is again supplied with the harvestable part in a known orientation and in a known position.

It has been envisaged that the feed device comprises a conveyor where the harvestable parts come to lie on the conveyor in a predetermined orientation. This embodiment can easily be used in combination with a processing device that pulls breast fillets loose from the rib cage of a carcass part such as described in EP 1 430 780 A1 for example. In this known device the detached fillet is always received in the same manner from the device by the conveyor. All fillets therefore come to lie on the conveyor in the same orientation. In order to achieve this it is preferable that the conveyor is positioned a short distance from the discharge point where the fillets leave the processing device.

The conveyor can place the harvestable parts directly in a tray that is disposed at the end of the conveyor. Another possibility for getting the harvestable parts from the conveyor into a tray or small tray is a so-called drop conveyor. This is a conveyor that retracts as soon as the harvestable part is above a tray.

It is also envisaged that the feed device to comprises a robot. The robot can take the harvestable part from the conveyor and feed it into the tray, but, for example, it can also take the harvestable part from a buffer. In another advantageous embodiment the robot already holds the harvestable part before it is separated from the rest of the carcass part by the processing device. As soon as the harvestable part has been disconnected from the rest of the carcass part the feed device is already holding the harvestable part. As a result of this, an additional transfer is avoided and the required position and orientation of the harvestable part in relation to the feed device can be guaranteed with a high degree of accuracy.

The robot can place the harvestable part directly into the tray, but it can also place it in a buffer. The same robot or another robot can then extract the harvestable product from the buffer again and place it in the tray.

The robot's design can be very simple. After all, the position in which the harvestable part has to be grasped and the position in which the harvestable part has to placed in the tray are always the same. Therefore the robot does not need to make a range of different movements. The complexity of the movement that the robot needs to make therefore depends on the mutual positions of the processing device, the buffer if any and the place where the tray is disposed in order to be able to receive one or more harvestable parts. If the movement is more or less rectilinear it is possible that a single, extendable and/or pivotable arm will suffice.

Naturally, in certain circumstances it may be necessary to use a more sophisticated robot that can perform a more complex movement. In that case a robot with two arms connected to each other by means of a hinge could be considered, for example. Such a robot and its controls are still significantly less complex than the robot in the known systems, because the robot according to the invention only needs to be capable of performing one or a few different predefined movements.

In an advantageous embodiment the feed device comprises a gripper to handle the harvestable part while the harvestable part is being fed into the tray. Because of its contact with the raw meat it is preferable that the gripper is made of stainless steel. In an advantageous embodiment the gripper is eccentrically mounted on a robot arm. It is preferable that the gripper is then rotatable relative to the robot arm.

This advantageous embodiment is particularly suitable for a variation of the method where the feed device grips the harvestable part during separation of the harvestable part from the rest of the carcass part.

It is envisaged that in the method and system according to the invention the harvestable parts are checked for unwanted bone parts or broken bones, for example using an X-ray device. It is preferable that this is done after the harvestable part has been deposited in the tray. Because the position and the orientation of the harvestable parts are known all the time, the probable location of any bone parts is also known. This simplifies the inspection considerably.

It is also envisaged that in the method and system according to the invention the harvestable parts are visually inspected, for example with the aid of a camera. The visual inspection can be aimed at the quality of the harvestable parts but can also be carried out as a check of the desired presentation of the harvestable parts in the tray for example.

The tray within the meaning of this invention can be suitable for holding one or more harvestable parts. It can be a shallow tray in which the harvestable parts are presented to the consumer but it can also be a crate, for example, that is used for transportation to the retailer. In most cases the tray will have one or more raised edges, but this is not a requirement under the concept of the invention.

If a number of harvestable parts are placed in a tray then, from a presentation point of view, it is desirable that the harvestable parts assume a predefined position relative to each other. In order to ensure that the robot can suffice with making the same movement at all times it is therefore an advantage if the tray is moved relative to the feed device each time prior to the deposition of a following harvestable part such that the following harvestable part can be placed in the correct position.

It is envisaged that the feed device deposits a number of harvestable parts in the tray simultaneously. This may be the case when, for example, the feed device collects several harvestable parts from a buffer or a conveyor at the same time or if several harvestable parts are separated from the rest of the carcass part at the same time.

It is also envisaged that the several harvestable parts are placed in a buffer at a predefined position and in a predefined orientation in relation to each other after separation from the rest of the carcass part, and then deposited in the tray as a group in such a way that the mutual positions and orientations are maintained.

It is preferable that the tray is fed from a destacker to the location at which the feed device will deposit a harvestable part in the tray.

In an advantageous embodiment the destacking process comprises the following steps:
  placing a stack of at least two trays into a holder,
  supporting the stack of trays using a carrier, which carrier comprises two guides that are moveable simultaneously, each of which is provided with, in succession, a first, a second and a third bearing plate, in which the first and the third bearing plate lie mainly in line with each other and the second bearing plate is higher than the first and the third bearing plate, and in which the stack of trays is supported on the first bearing plate,
  simultaneously moving the guides, so that the second bearing plate supports the tray that is one from the bottom of the stack and the bottom tray of the stack is no longer supported,
  simultaneously moving the guides further so that the third bearing plate supports the tray which is then the bottom tray of the stack.

Devices and methods according to various aspects of the invention will be explained in more detail below with reference to the appended drawing, which, without implying any restriction, shows exemplary embodiments.

Figure 1A:
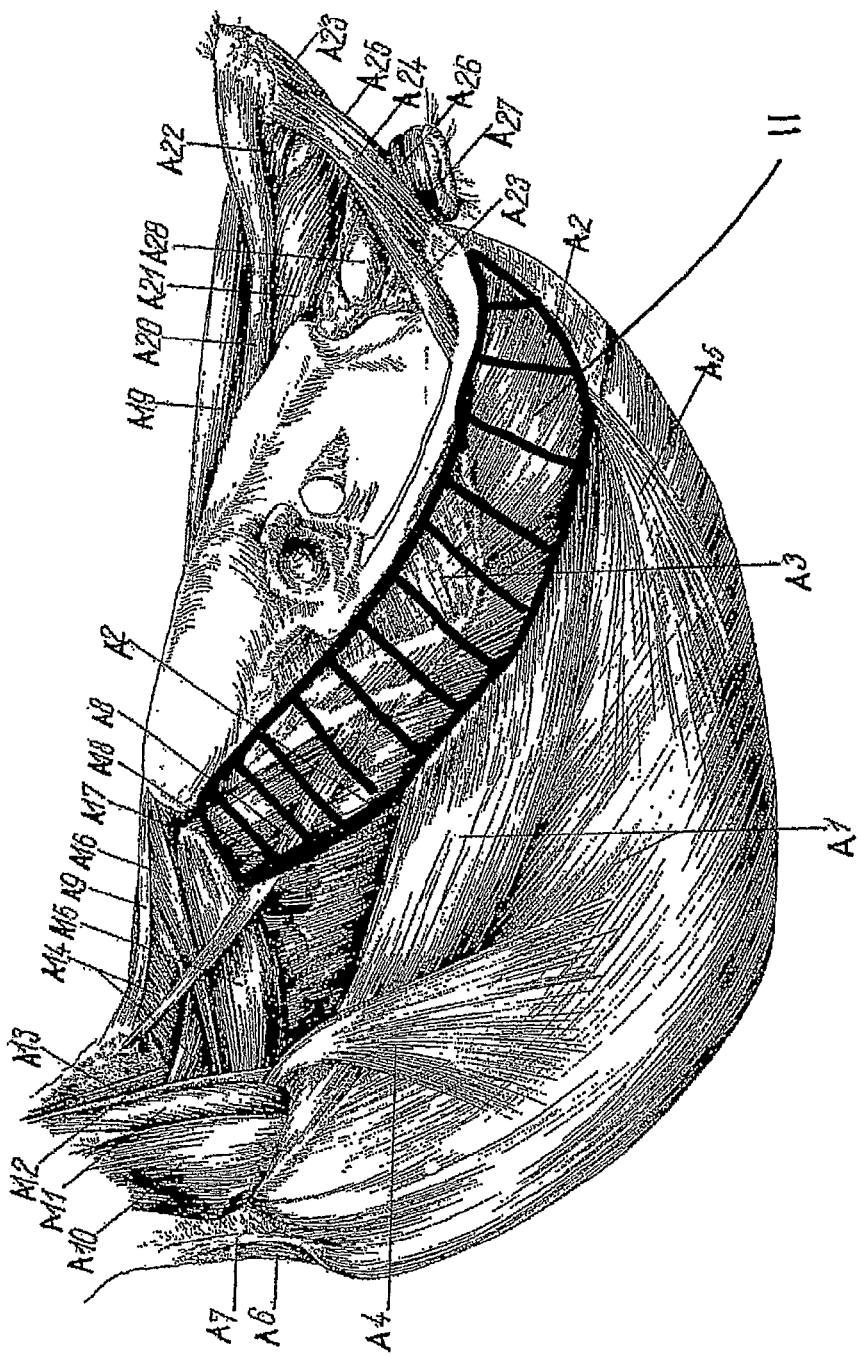
Figure 1B:
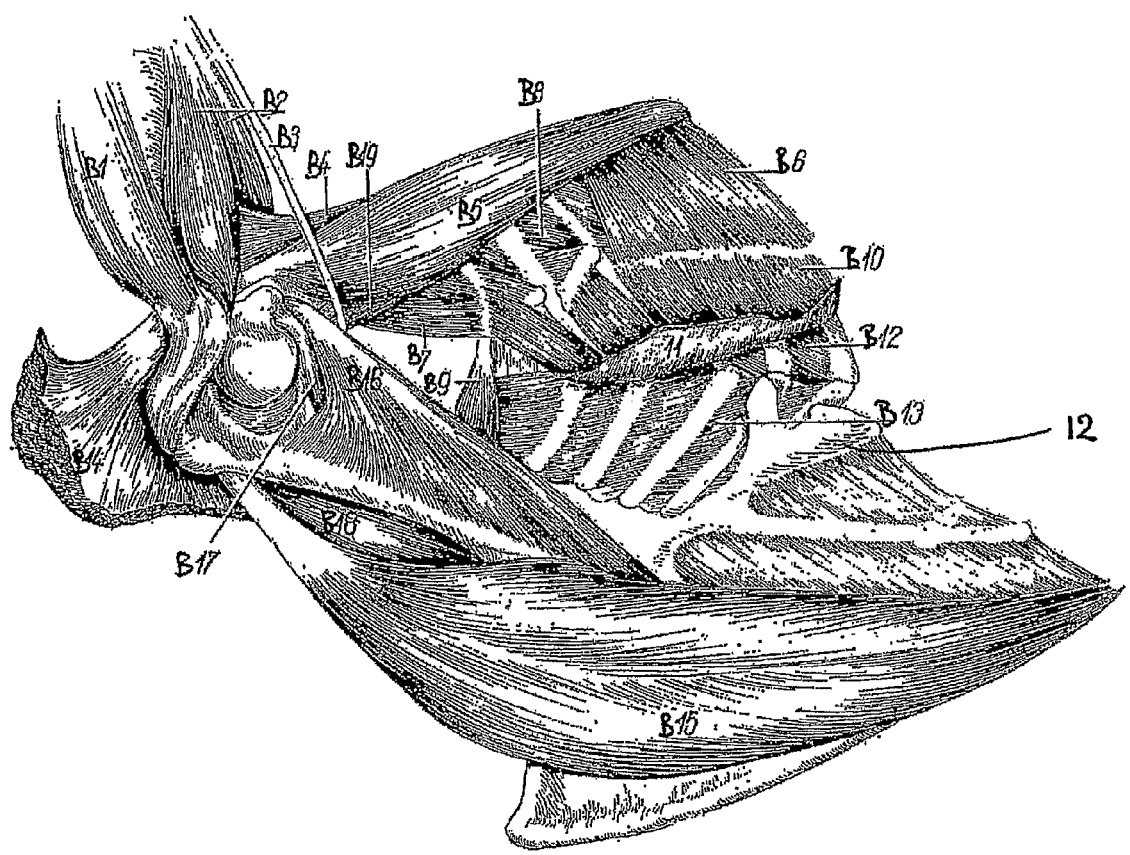
Figure 1C:
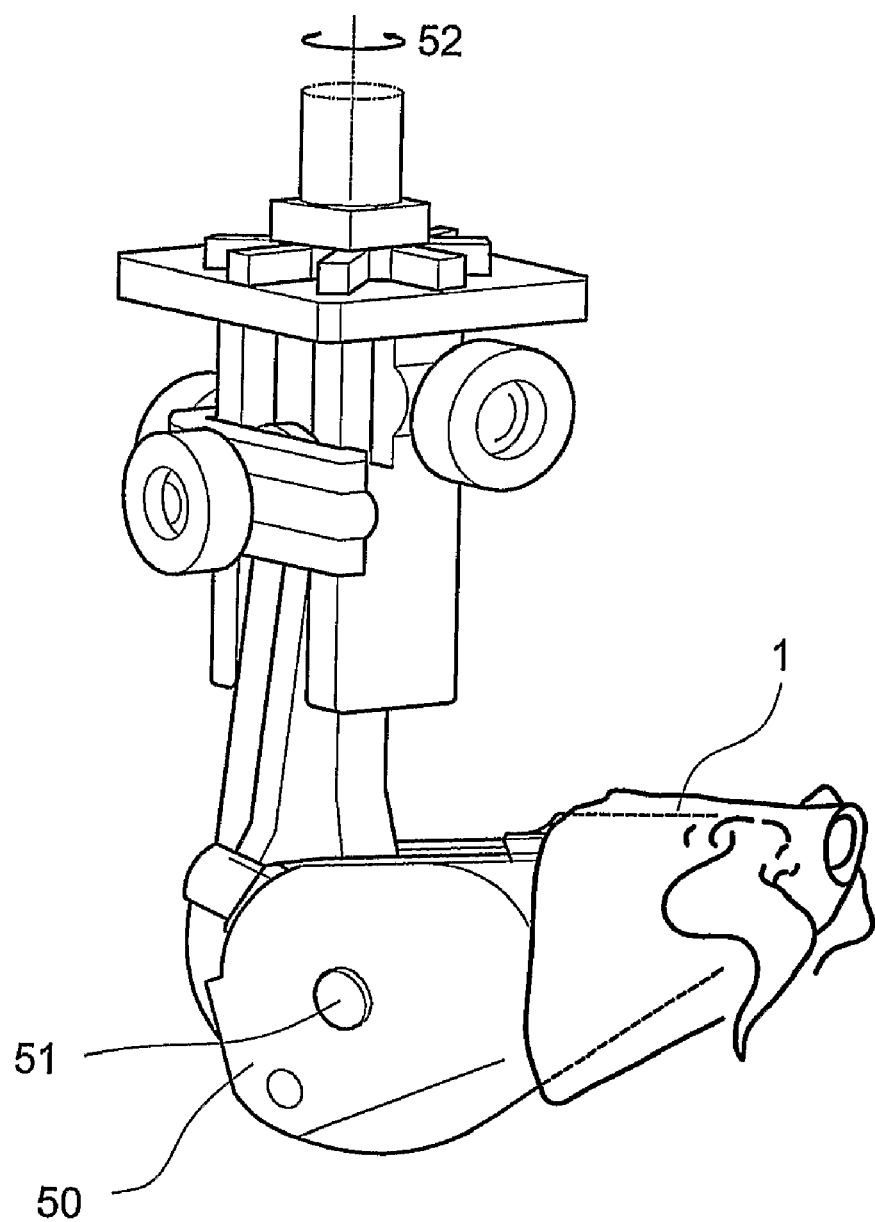
Figures 1D, 1E:
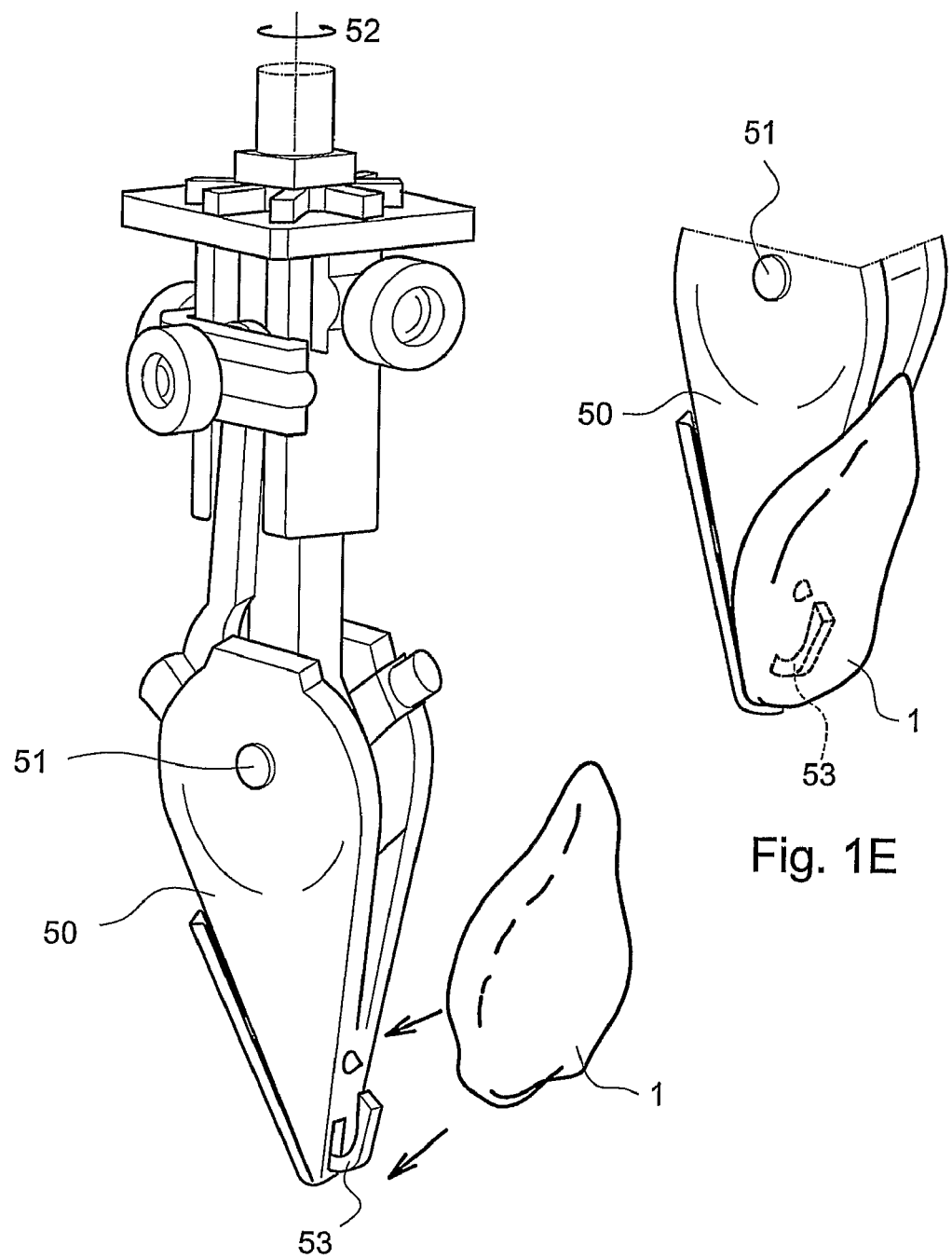
Figure 1F:
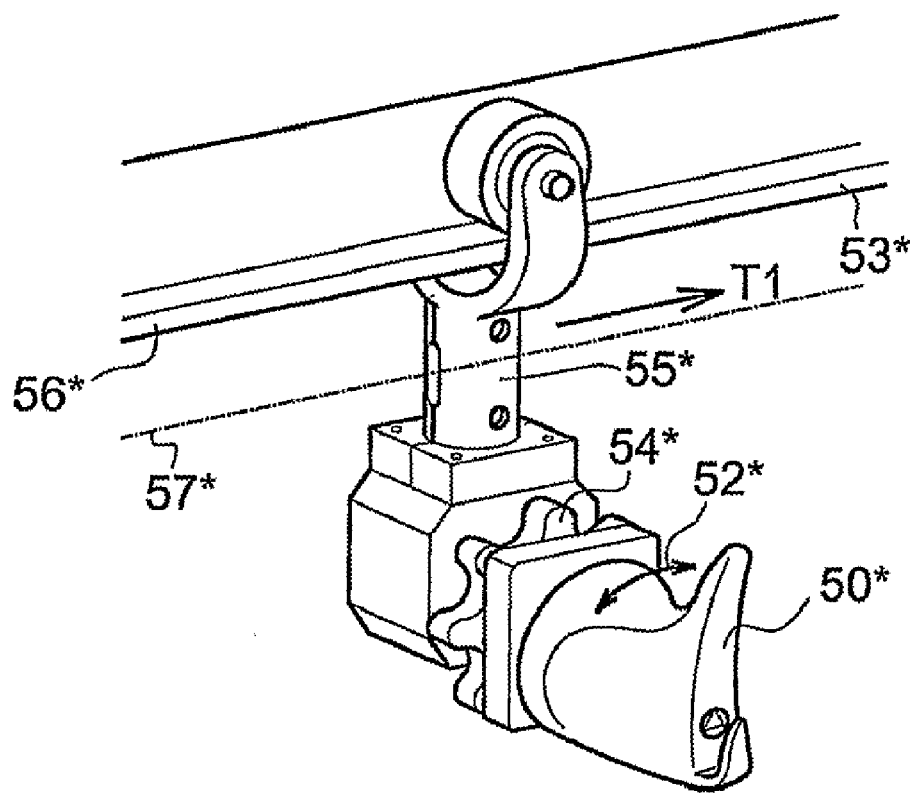
Figure 1G:
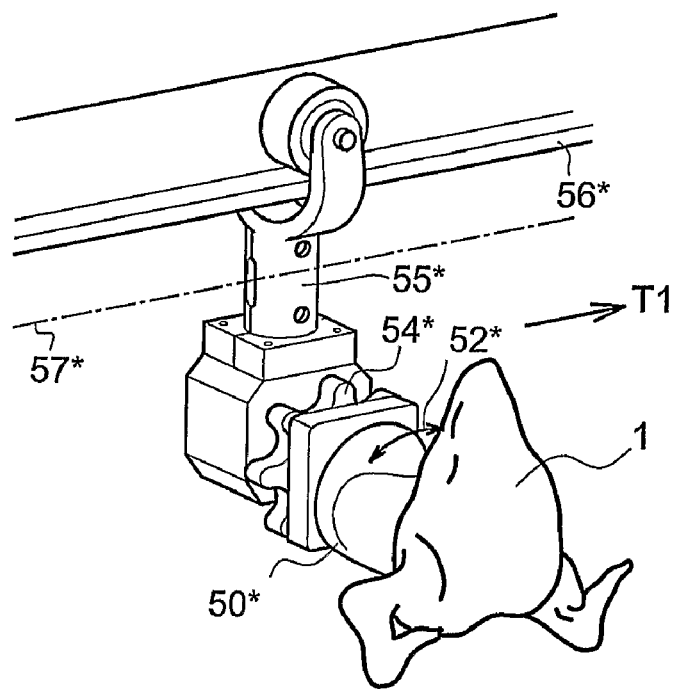
Figure 1H:
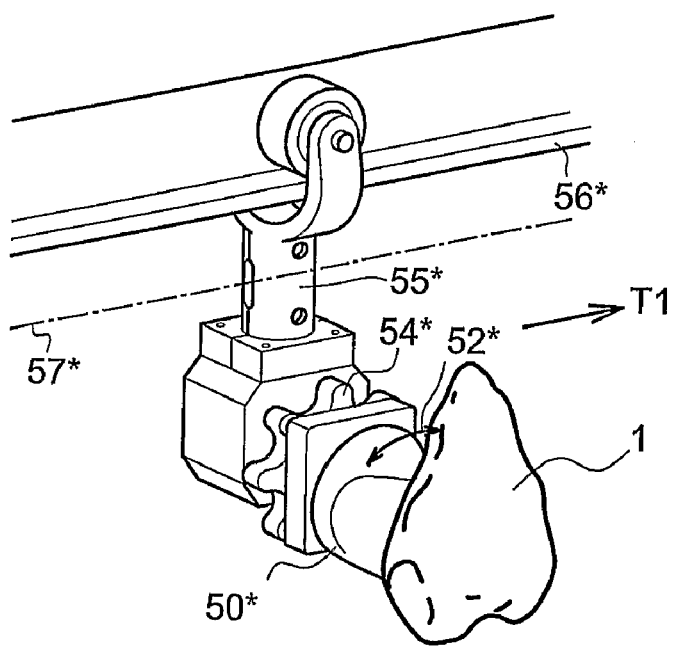
Figure 2:
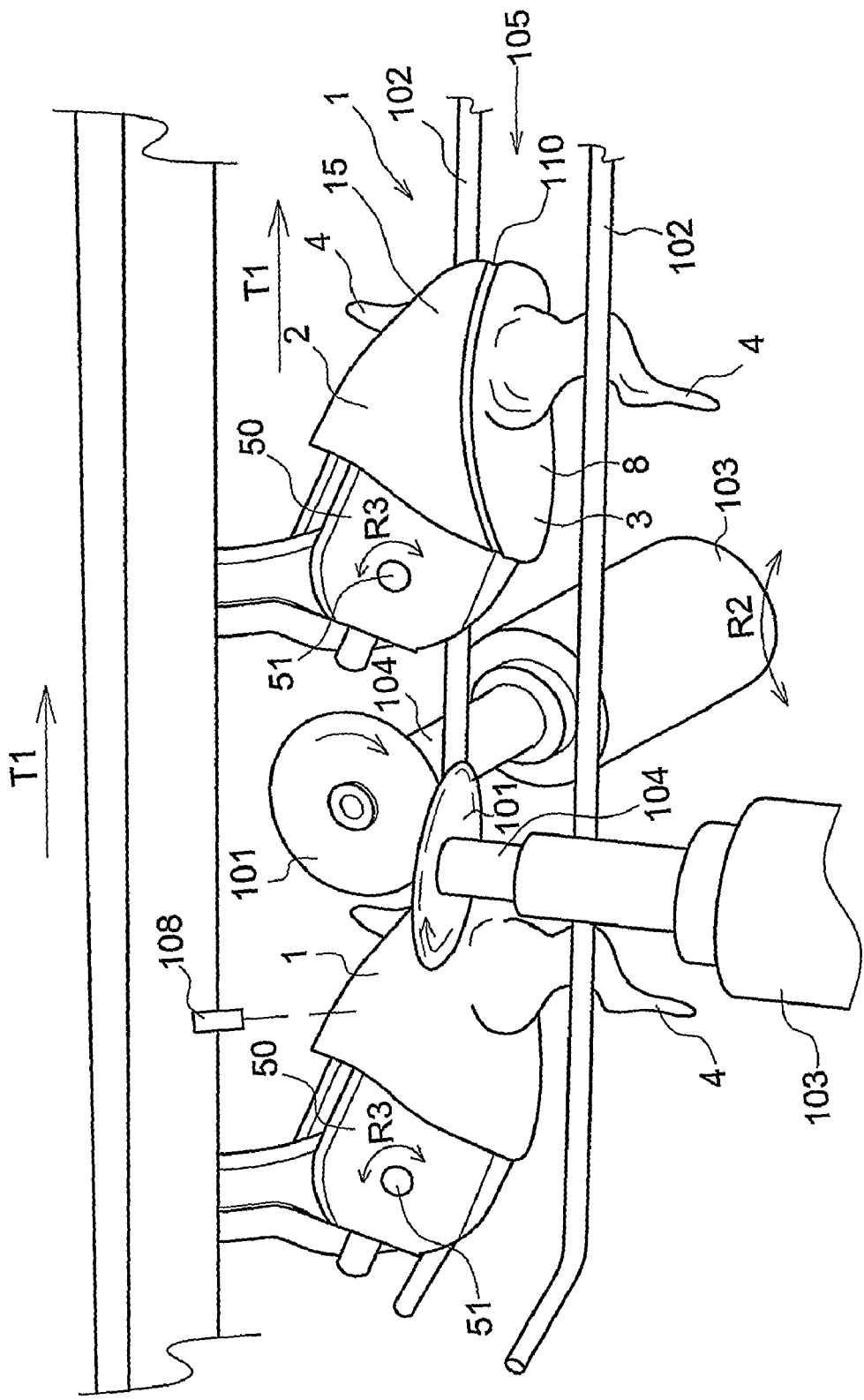
Figure 3:
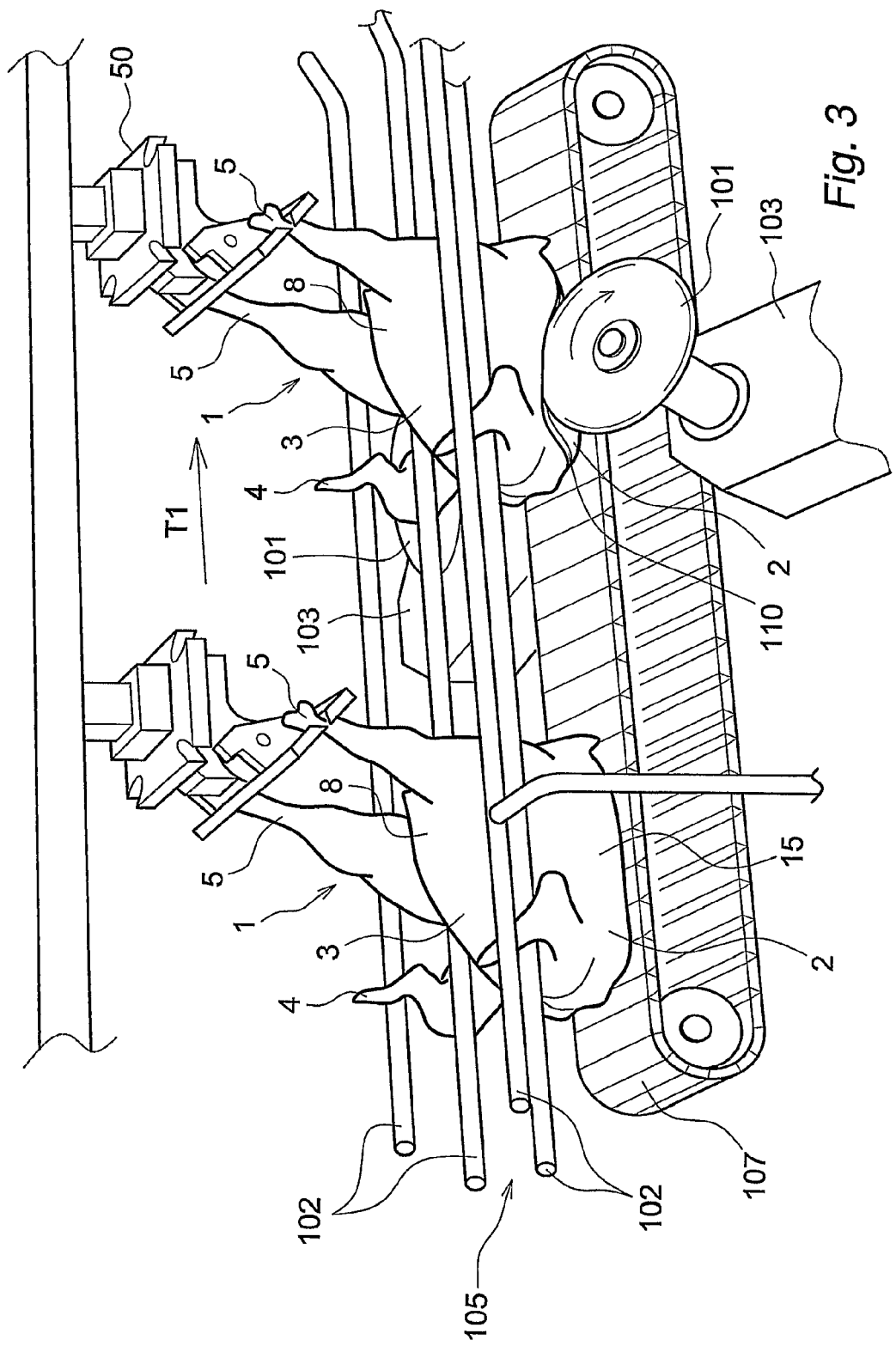
Figure 4:
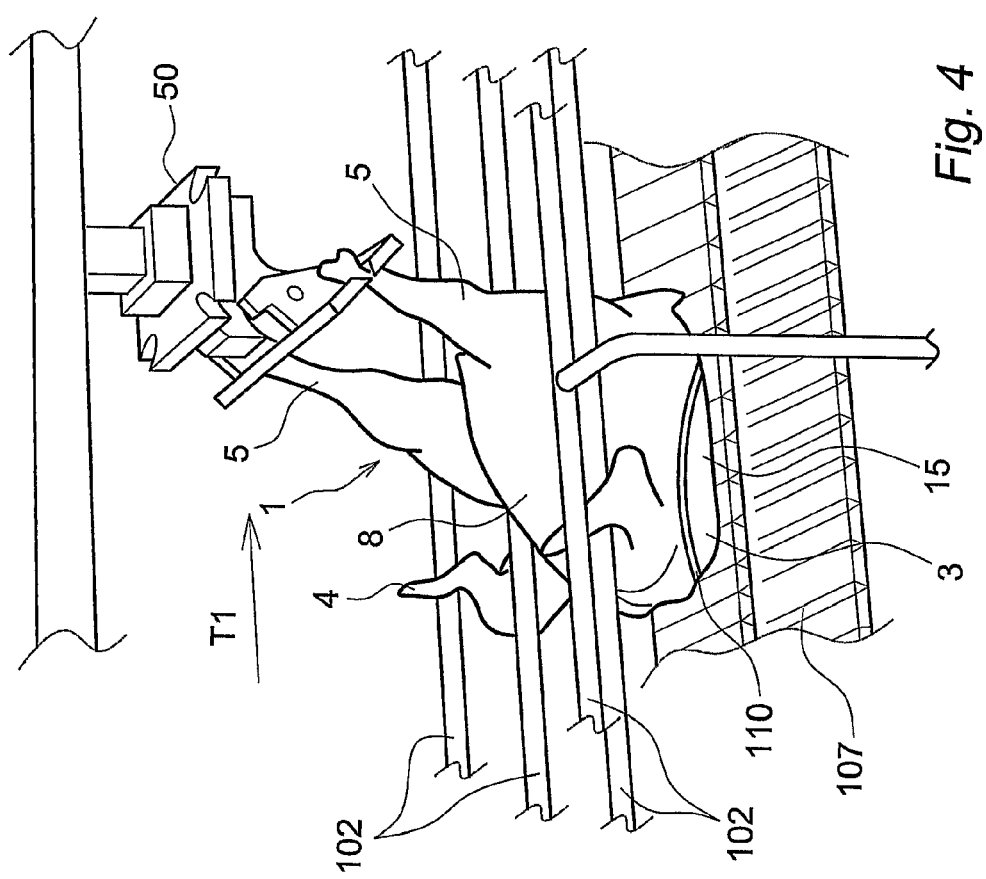
Figure 5:
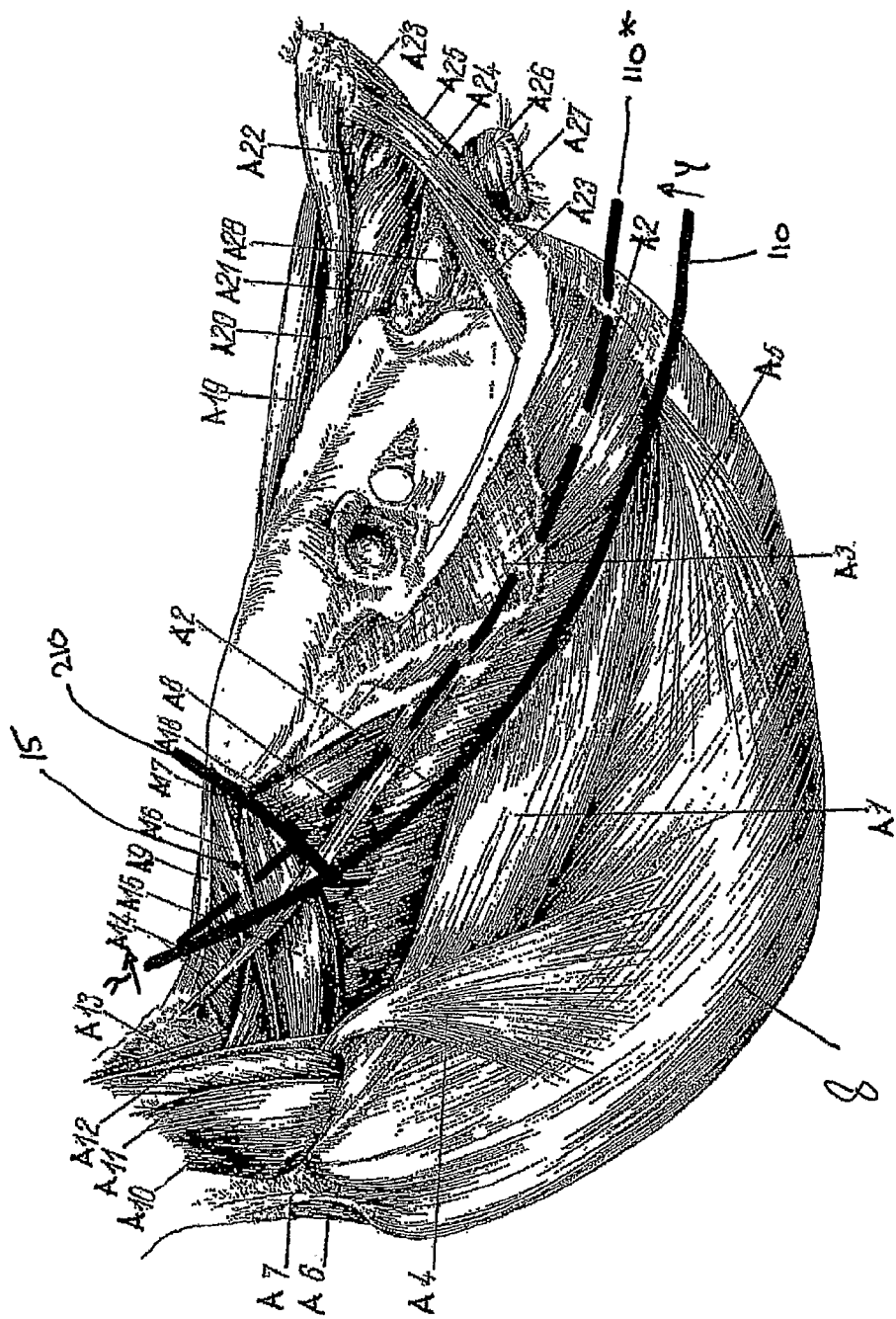
Figures 8A, 8B:
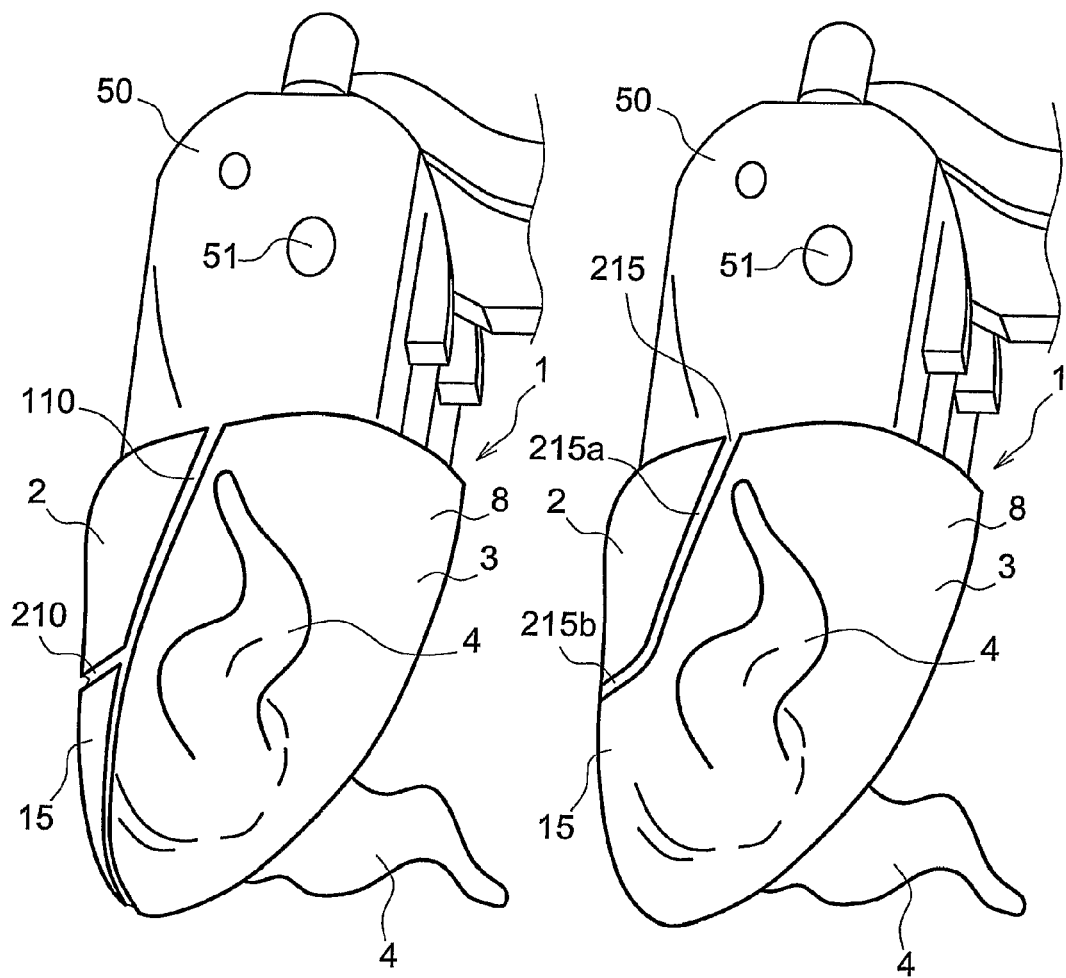
Figure 9:
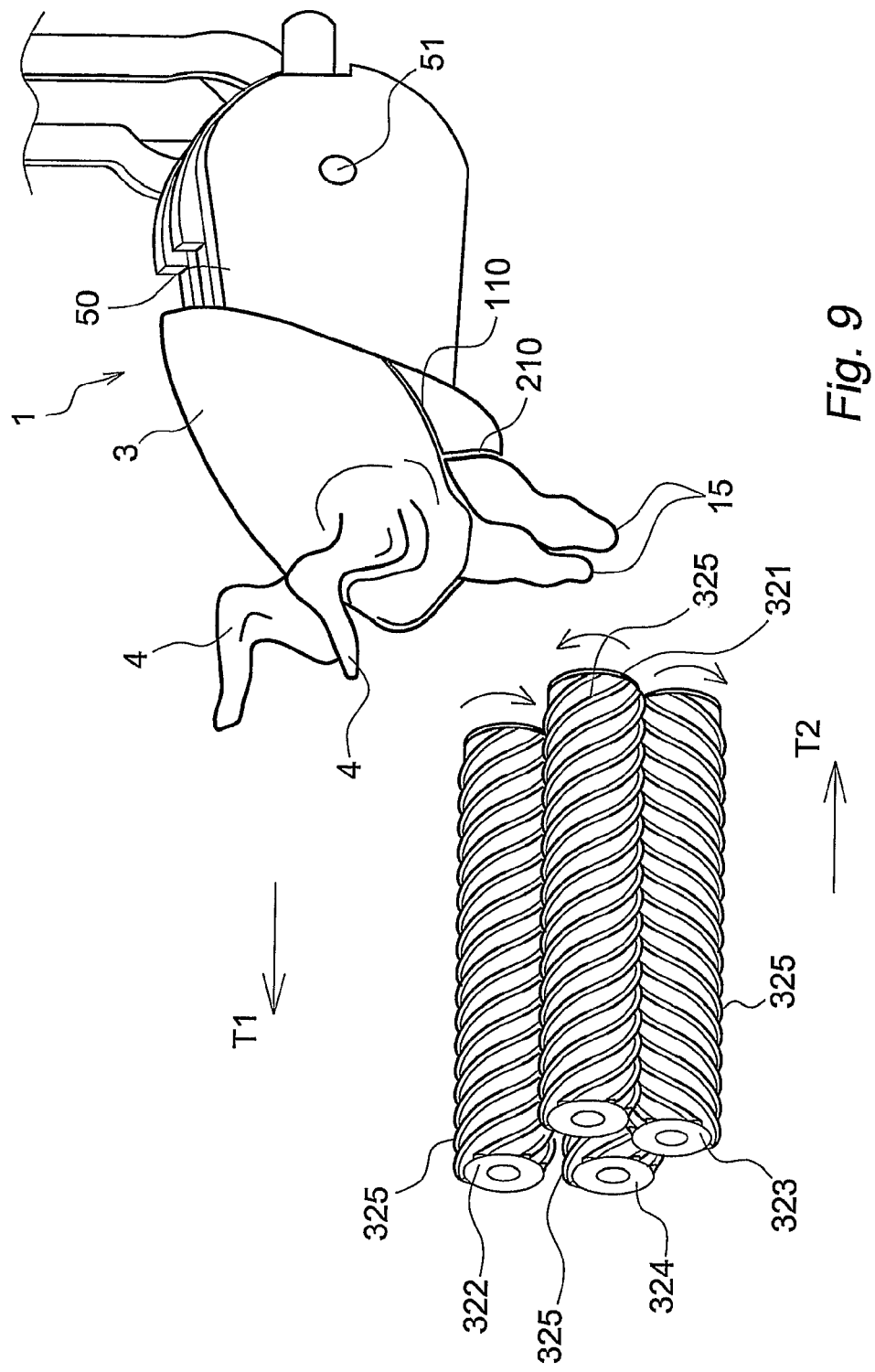
Figure 10:
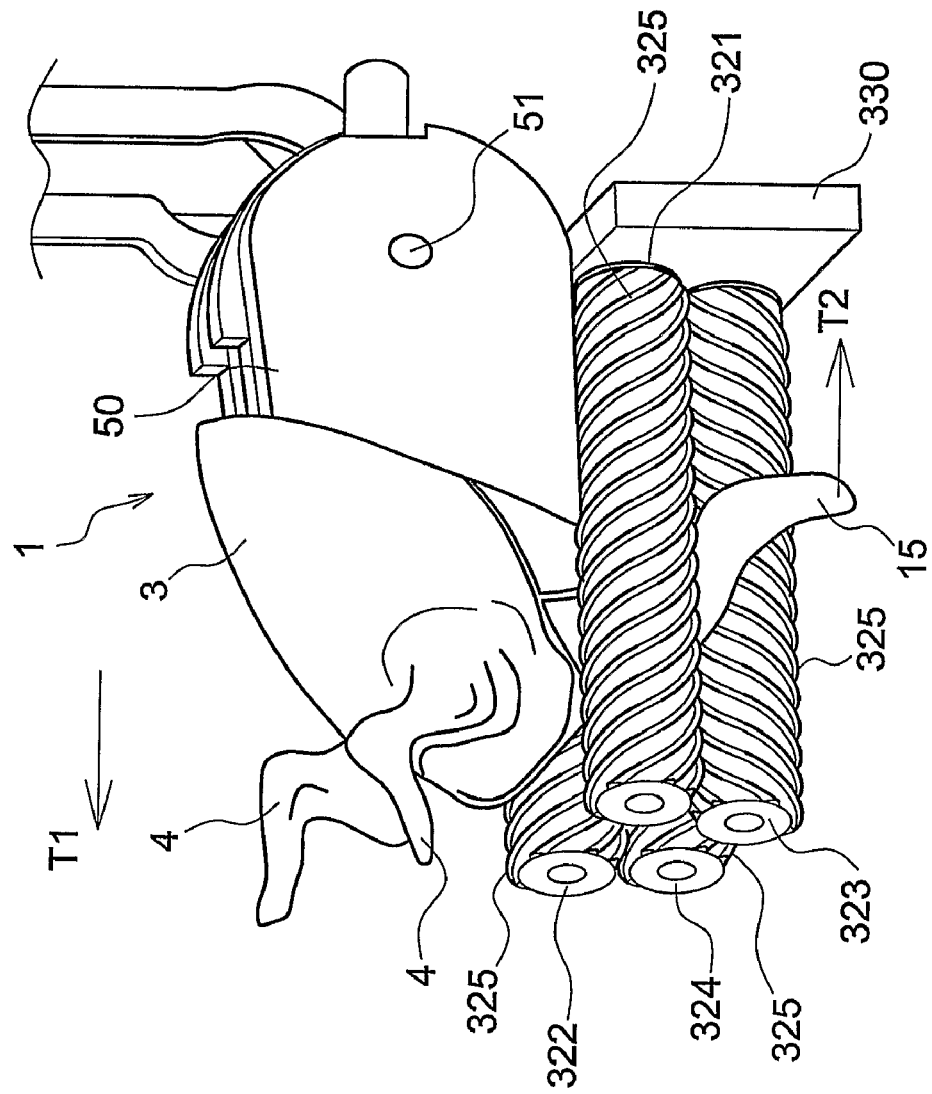
Figure 11:
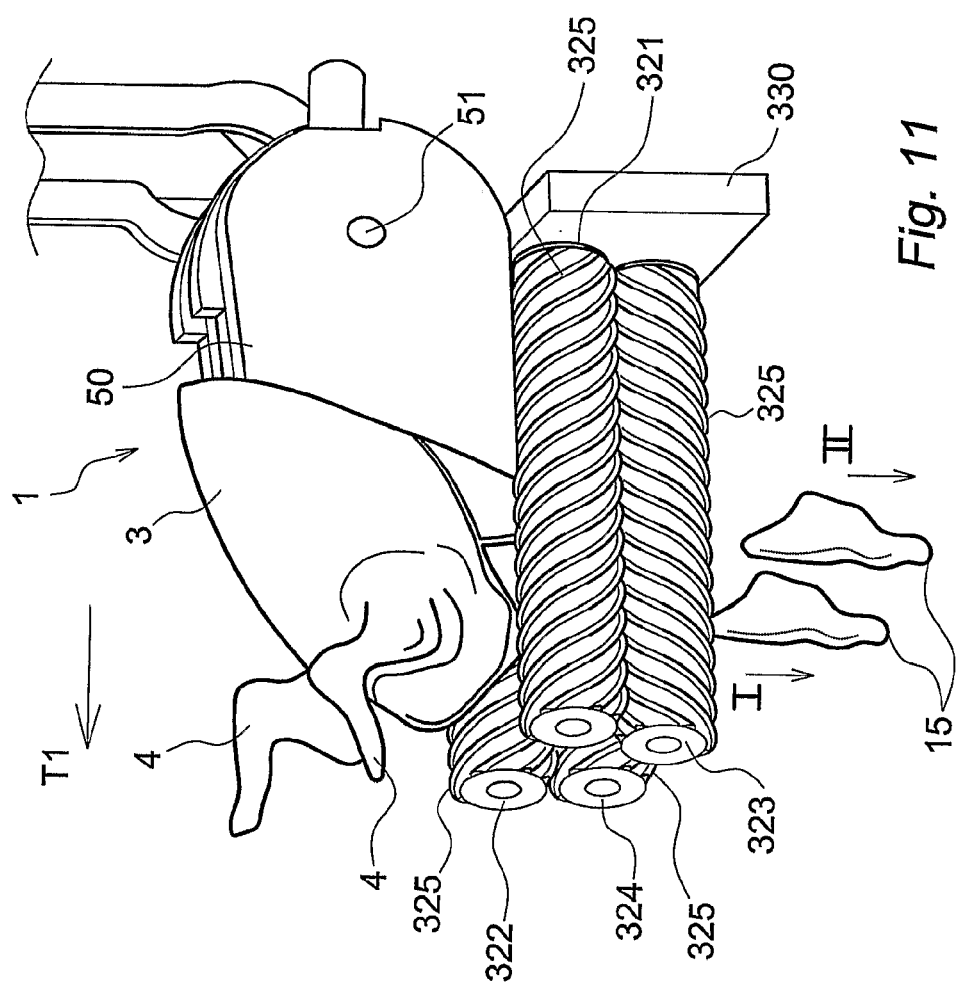
Figure 12:
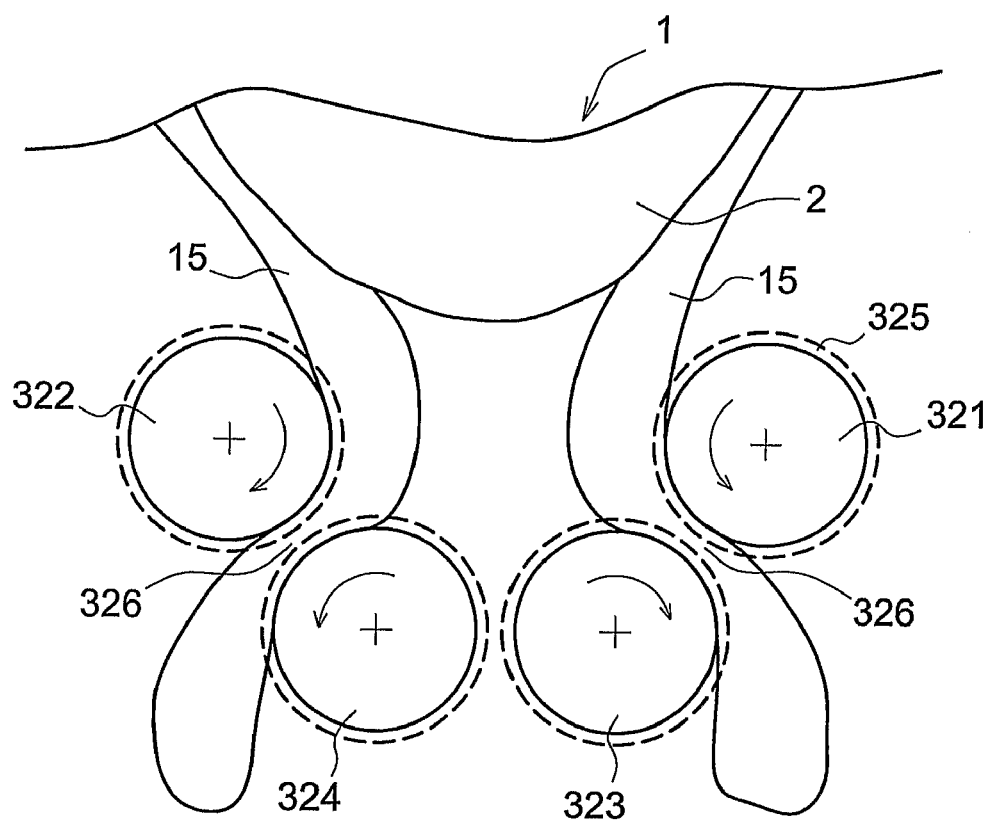
Figure 13:
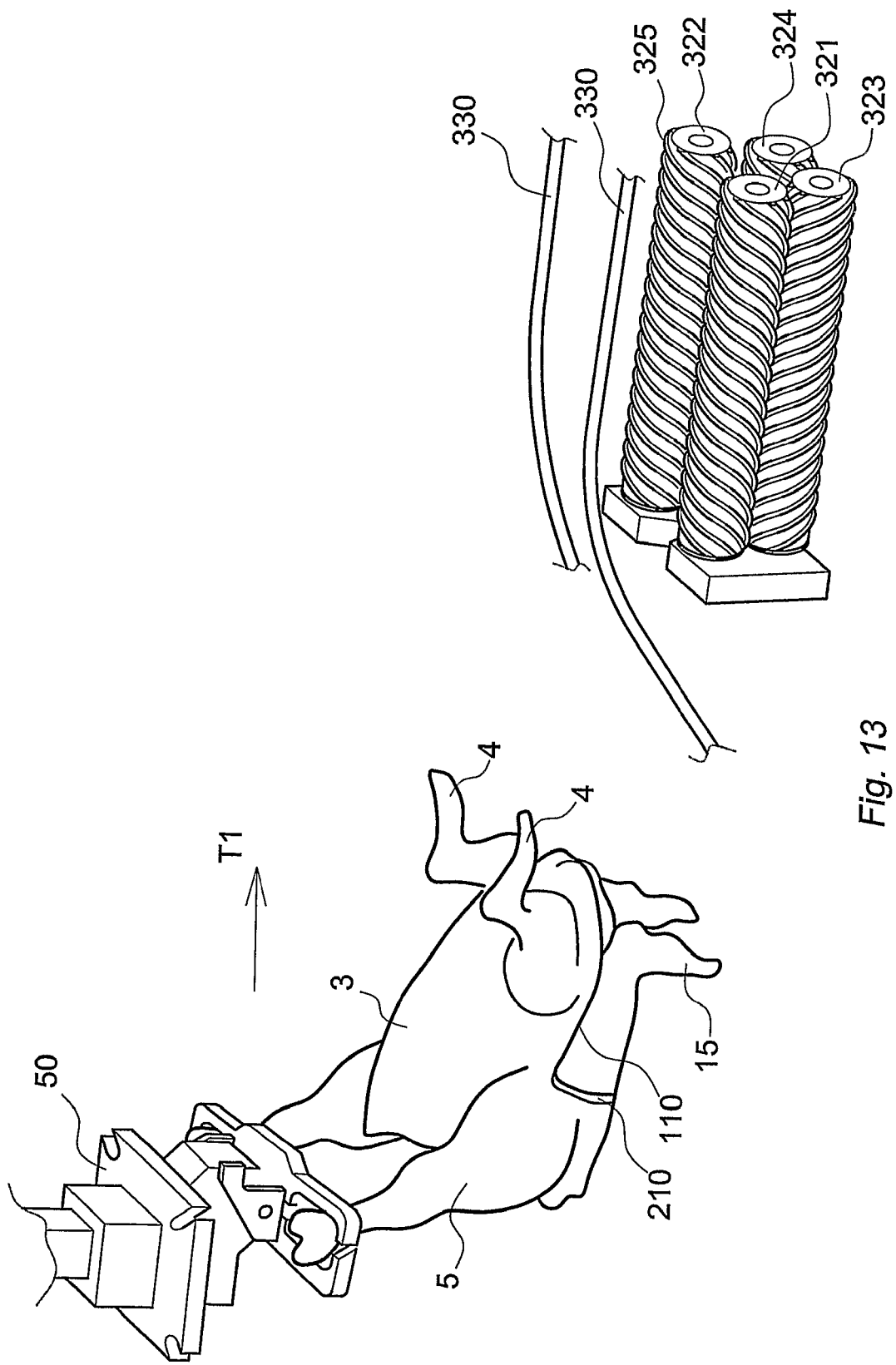
Figure 14:
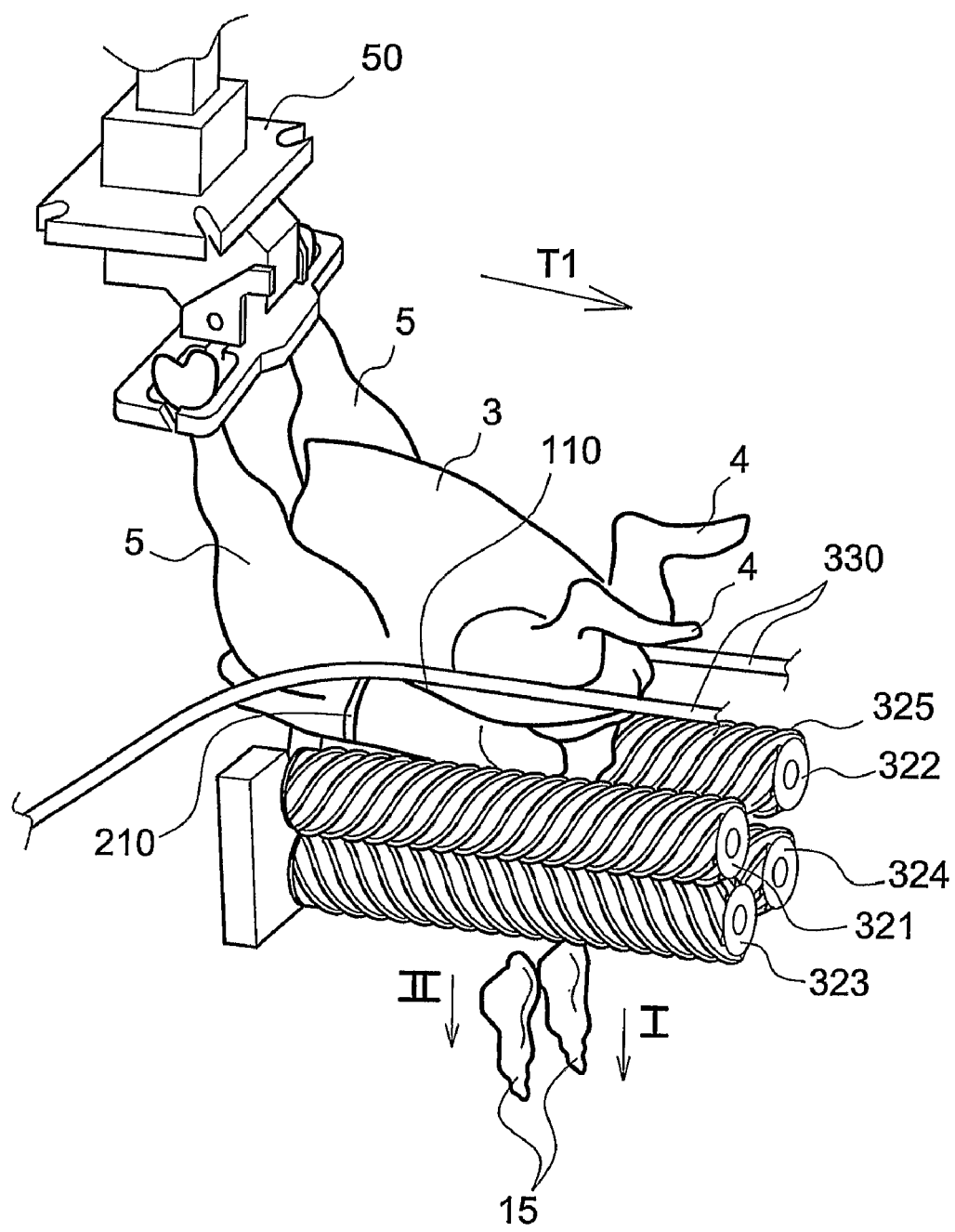
Figure 15:
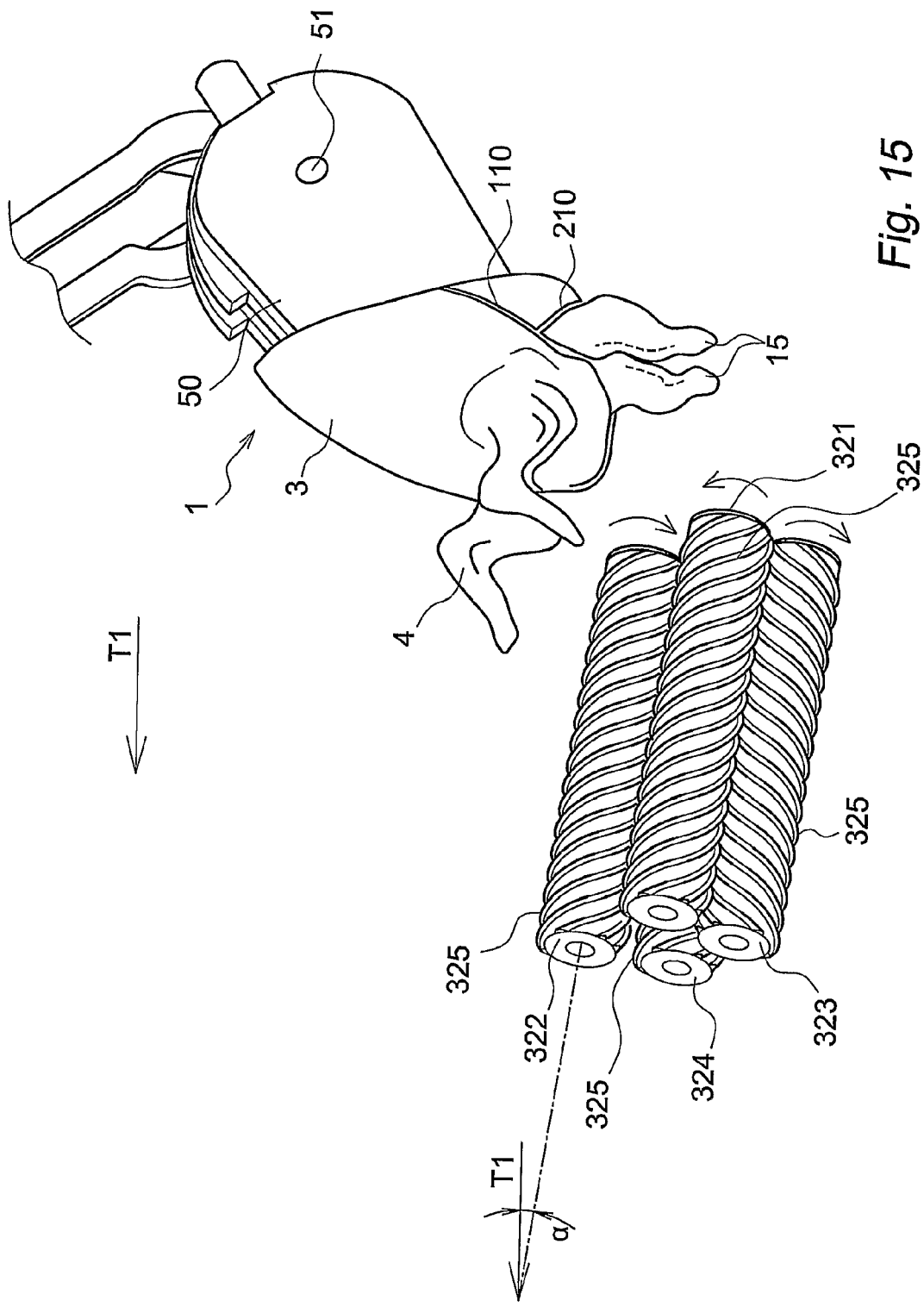
Figure 16:
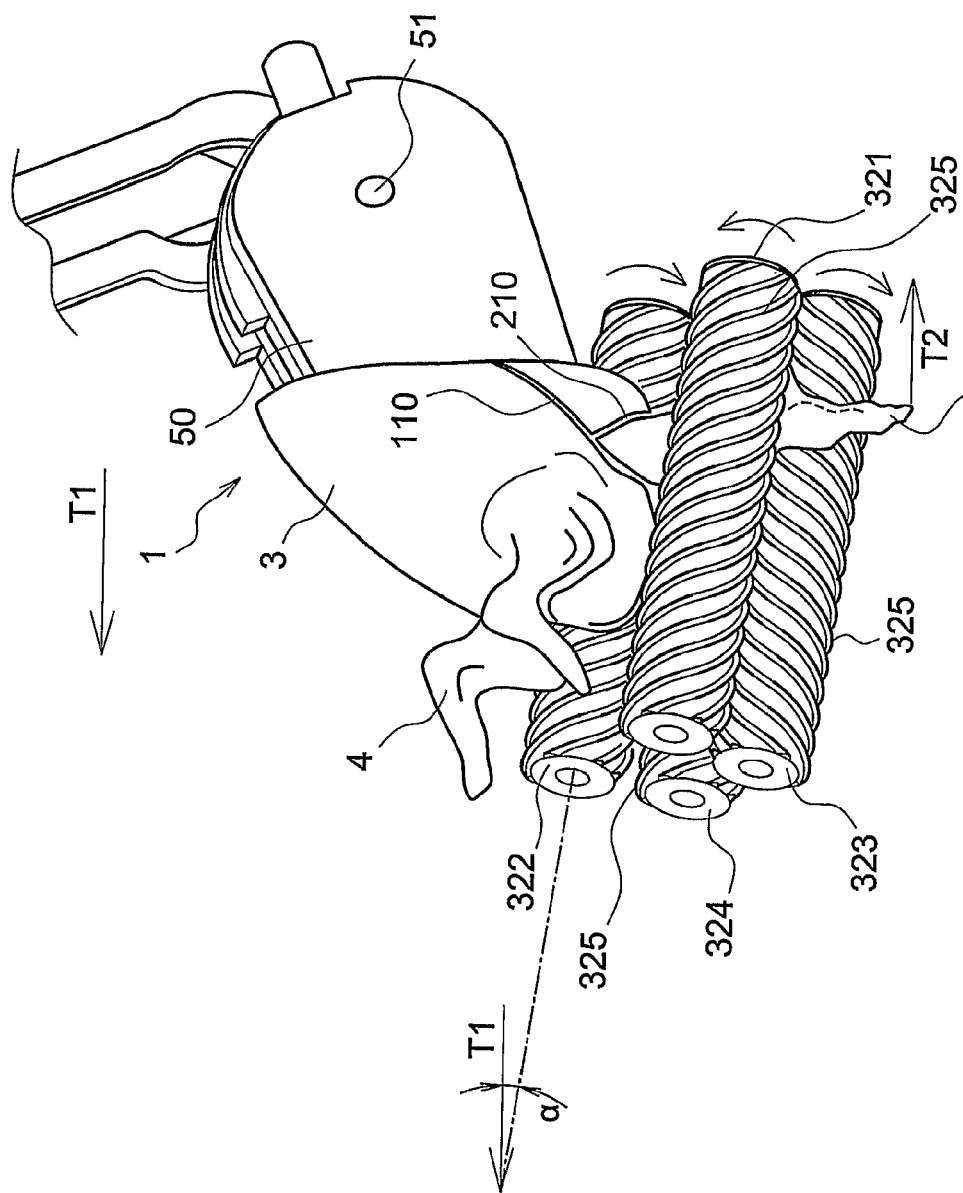
Figure 17A:
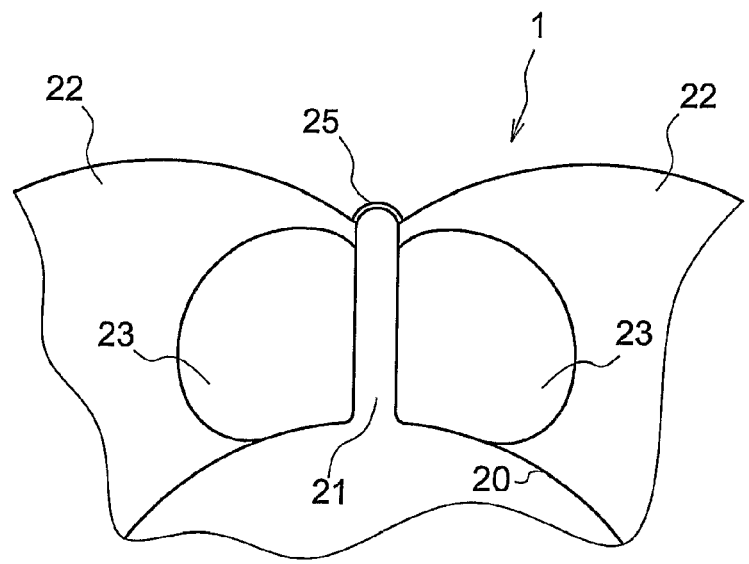
Figure 17B:
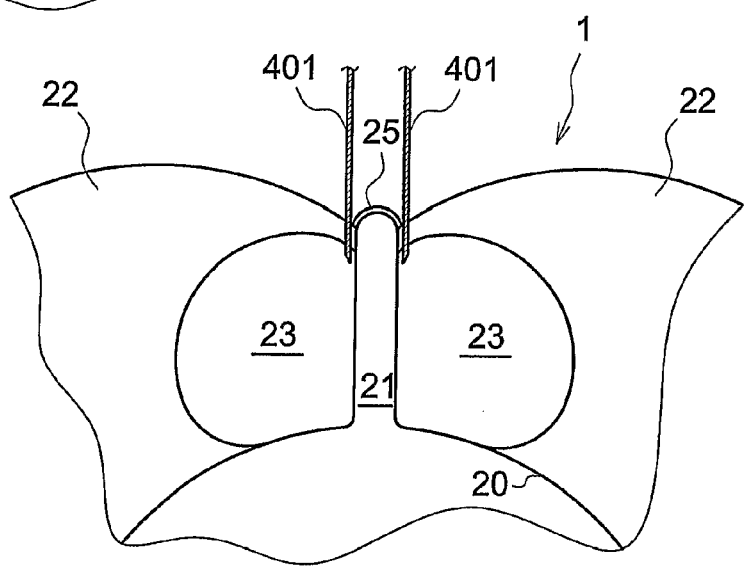
Figure 17C:
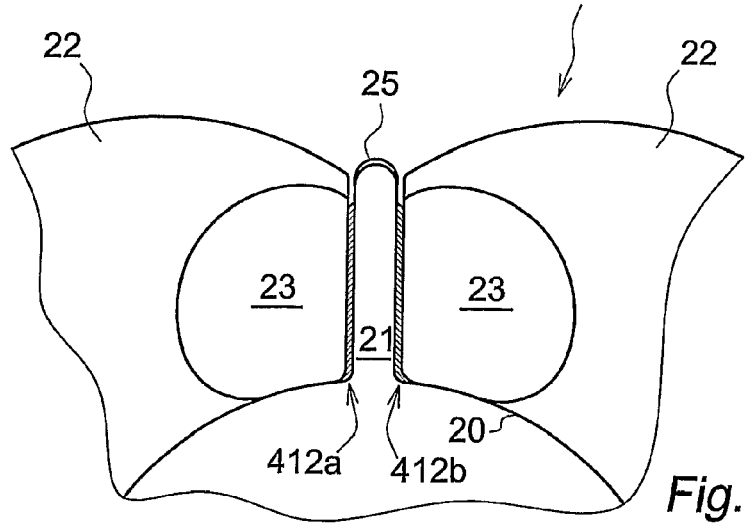
Figure 17D:
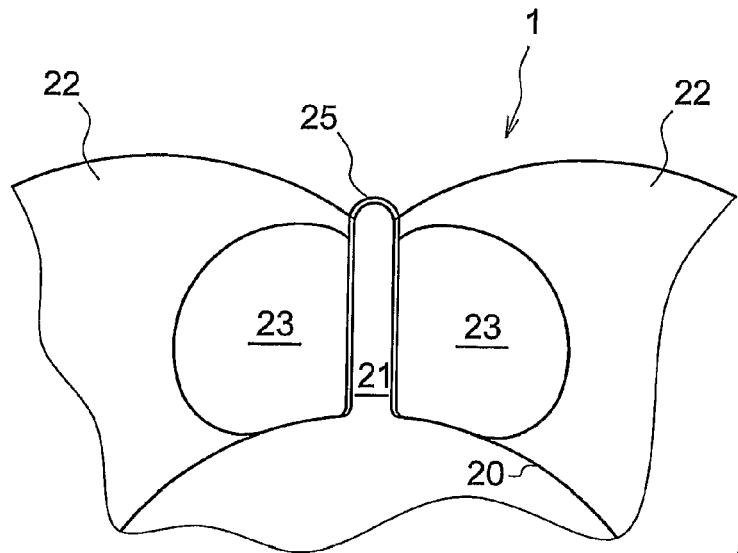
Figure 17E:
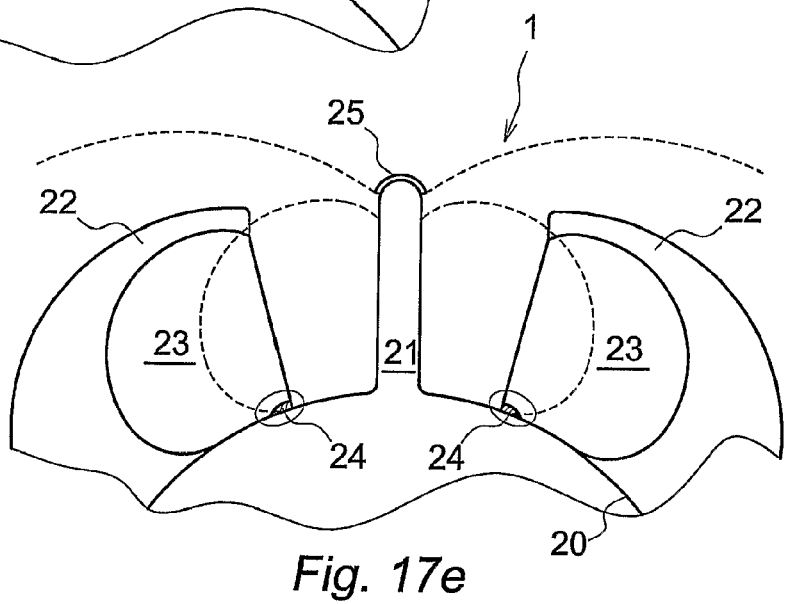
Figure 17F:
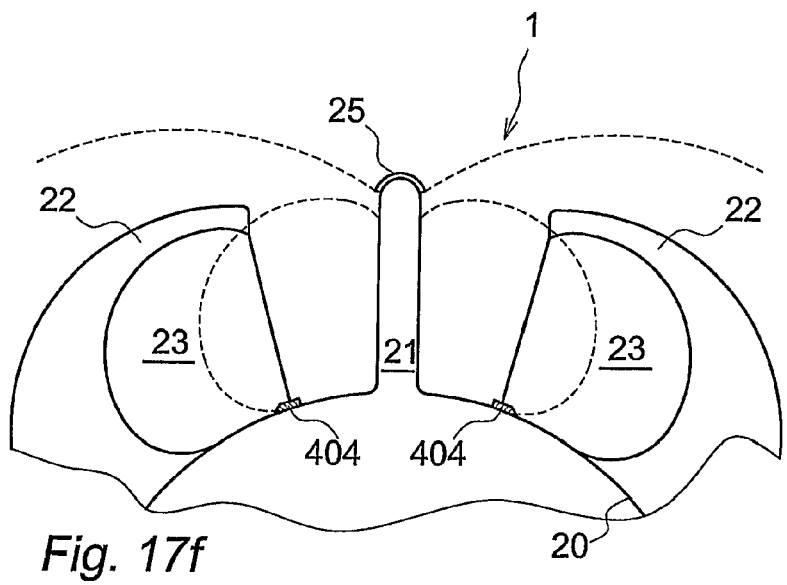
Figure 18:
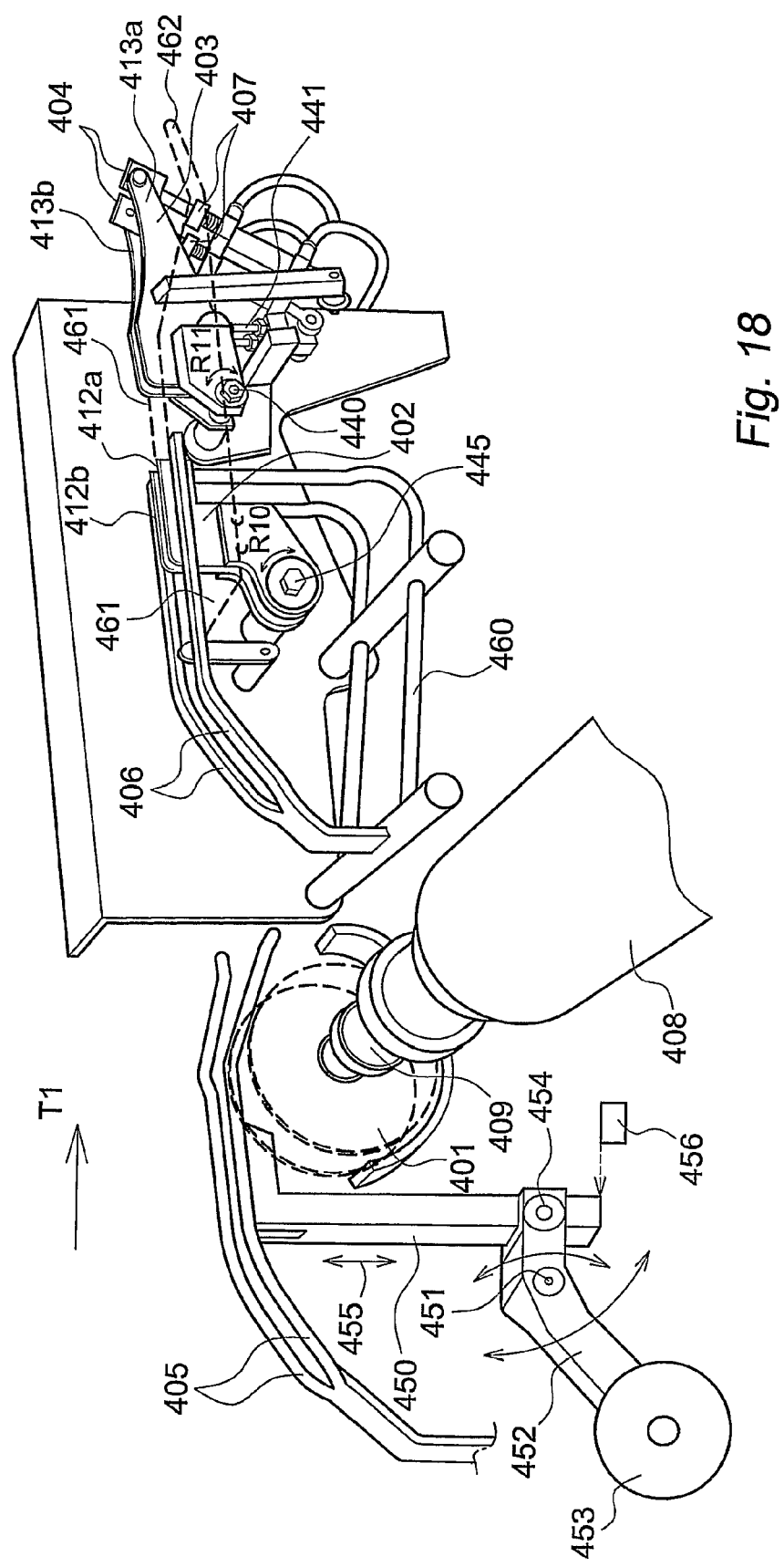
Figure 19:
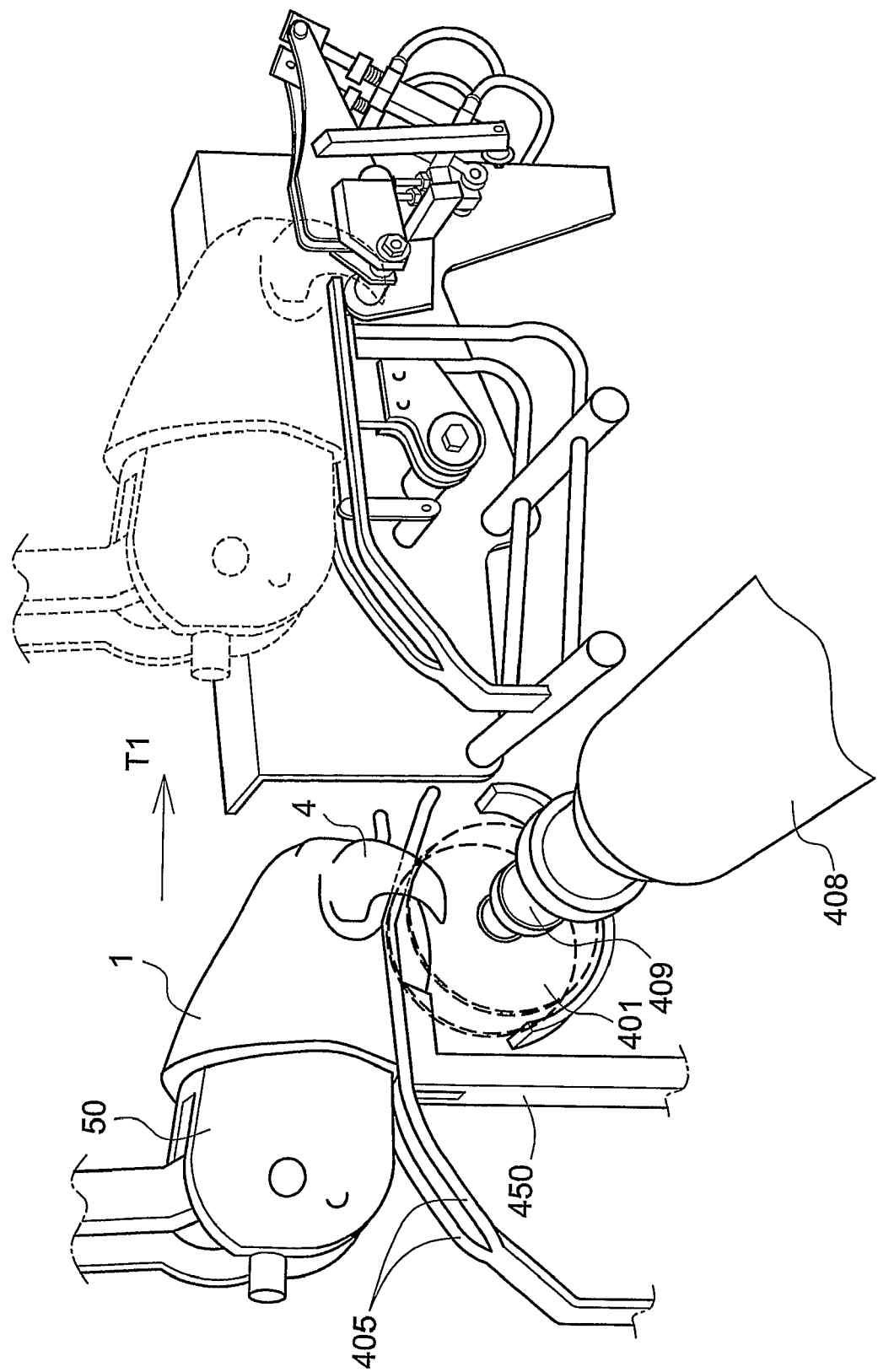
Figure 20:
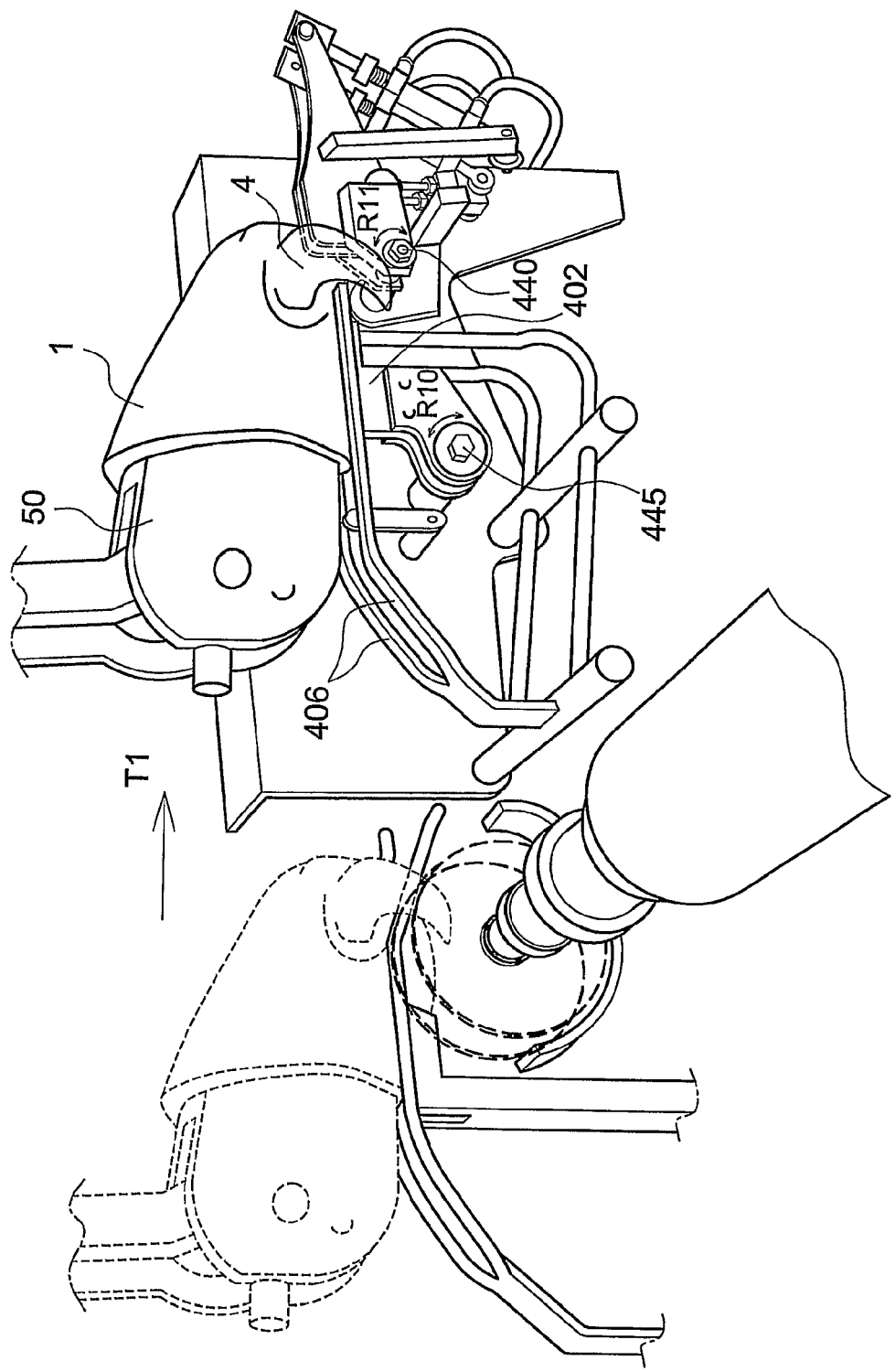
Figure 21:
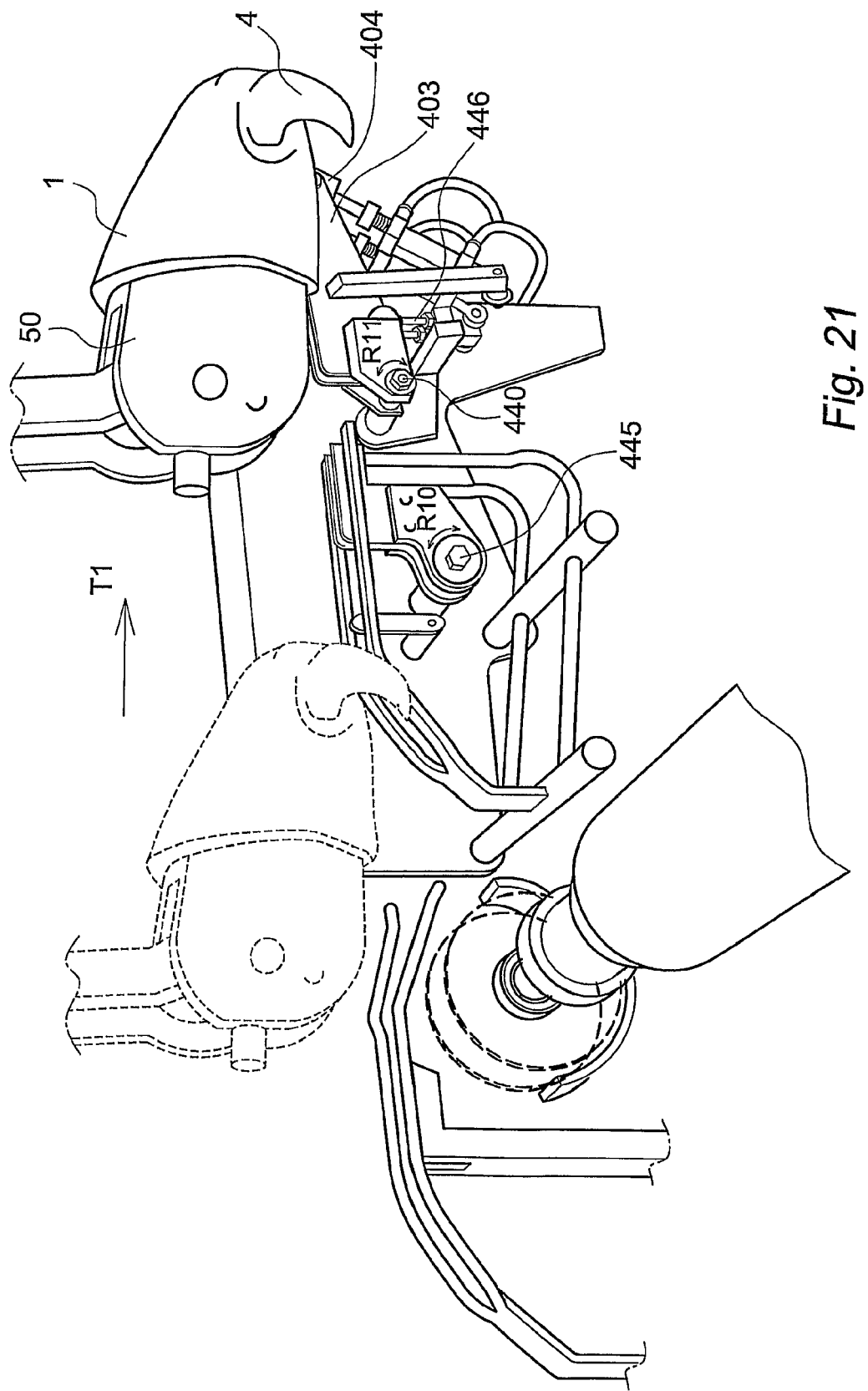
Figure 22:
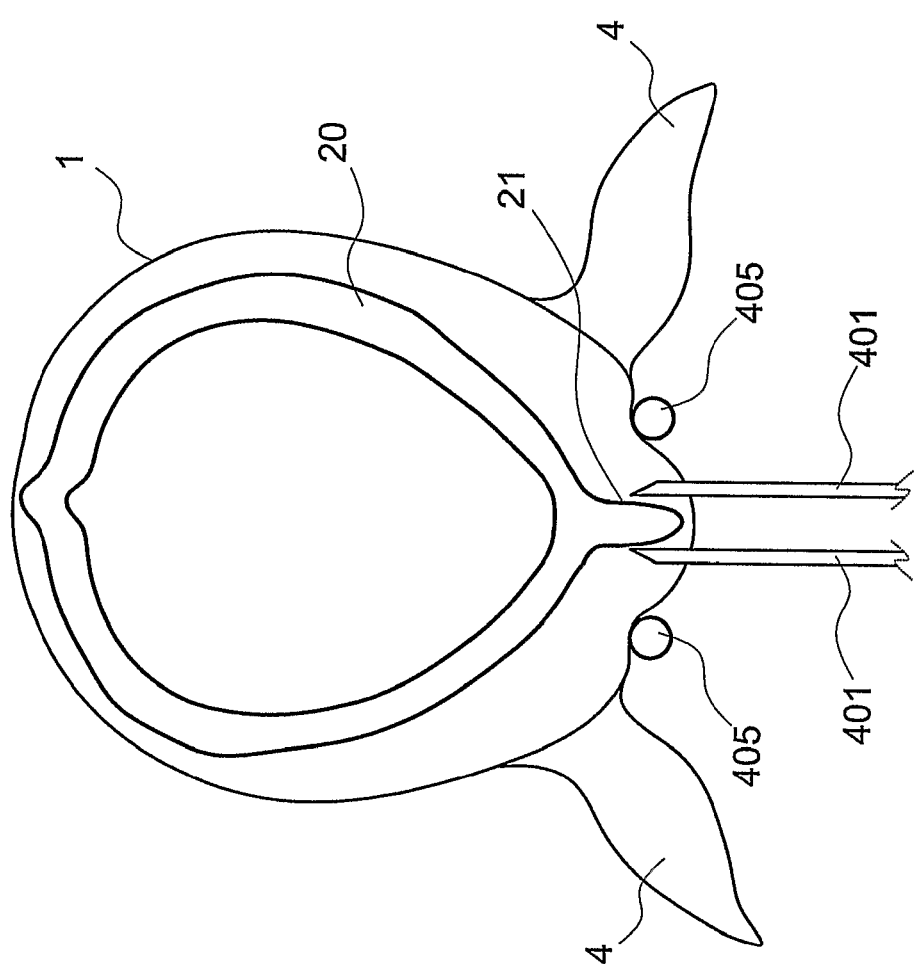
Figure 24:
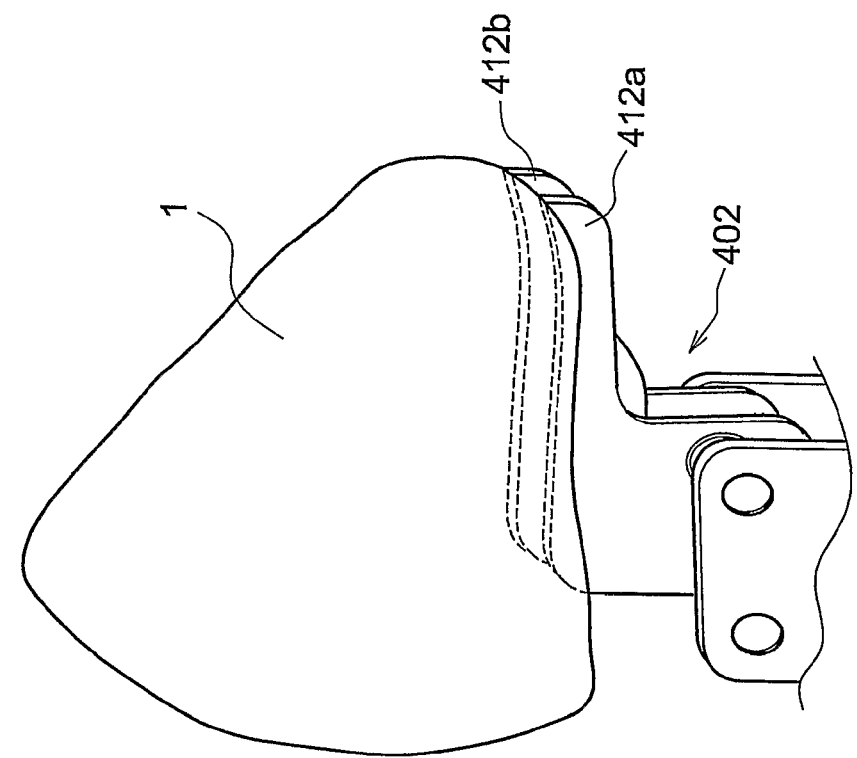
Figure 23:
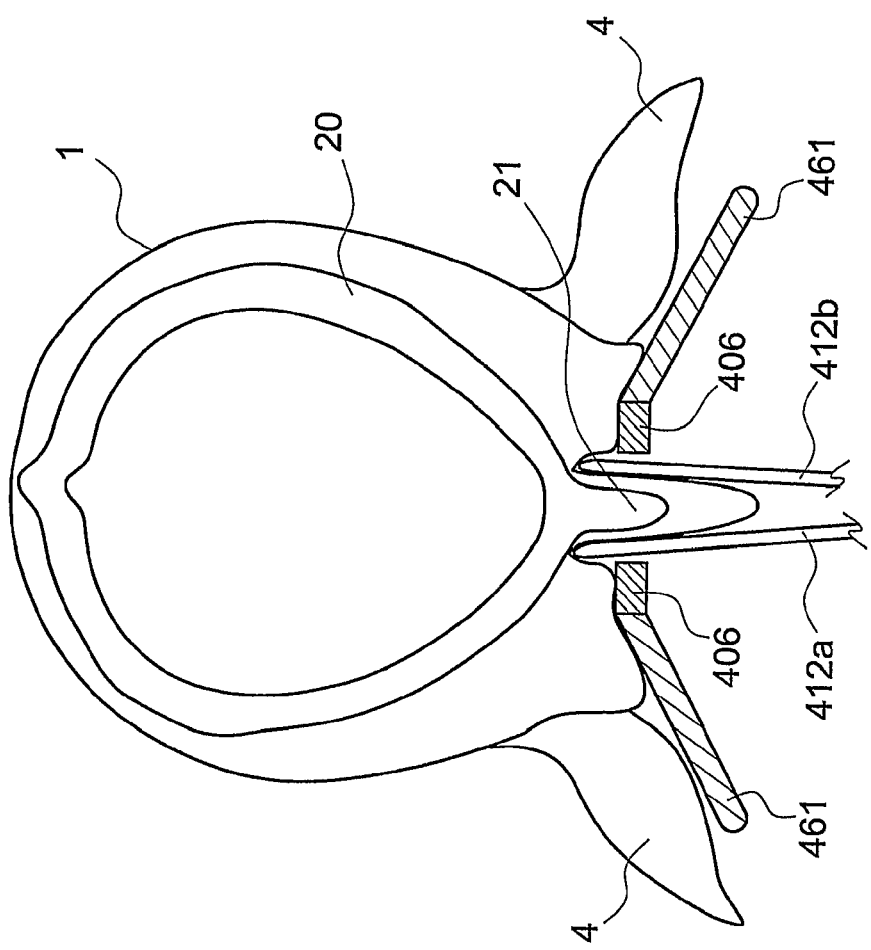
Figure 26:
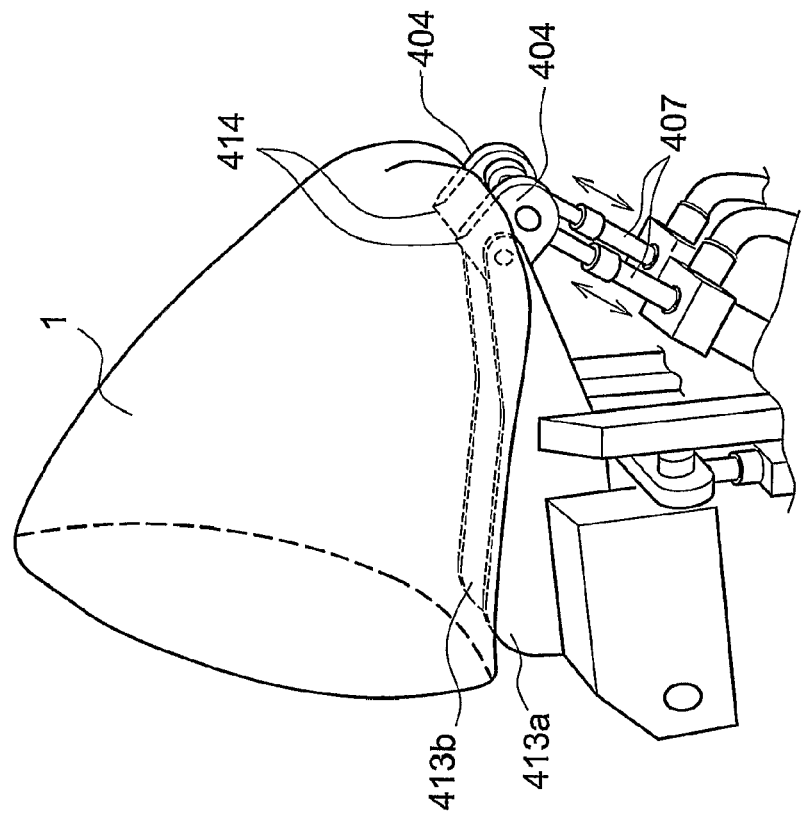
Figure 25:
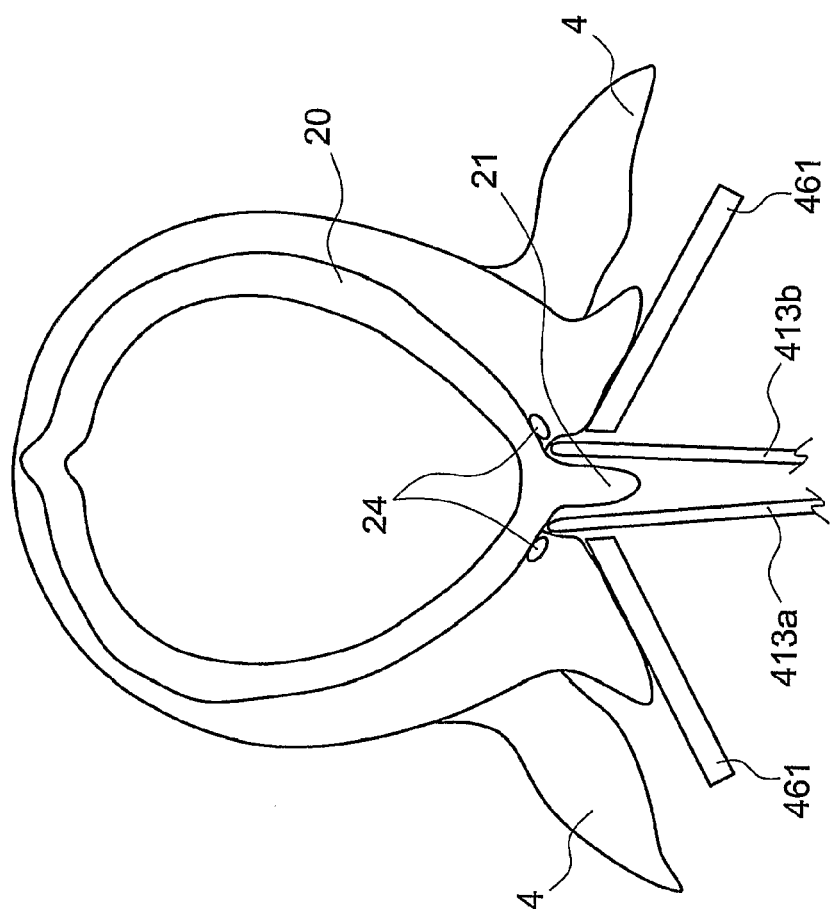
Figure 27:
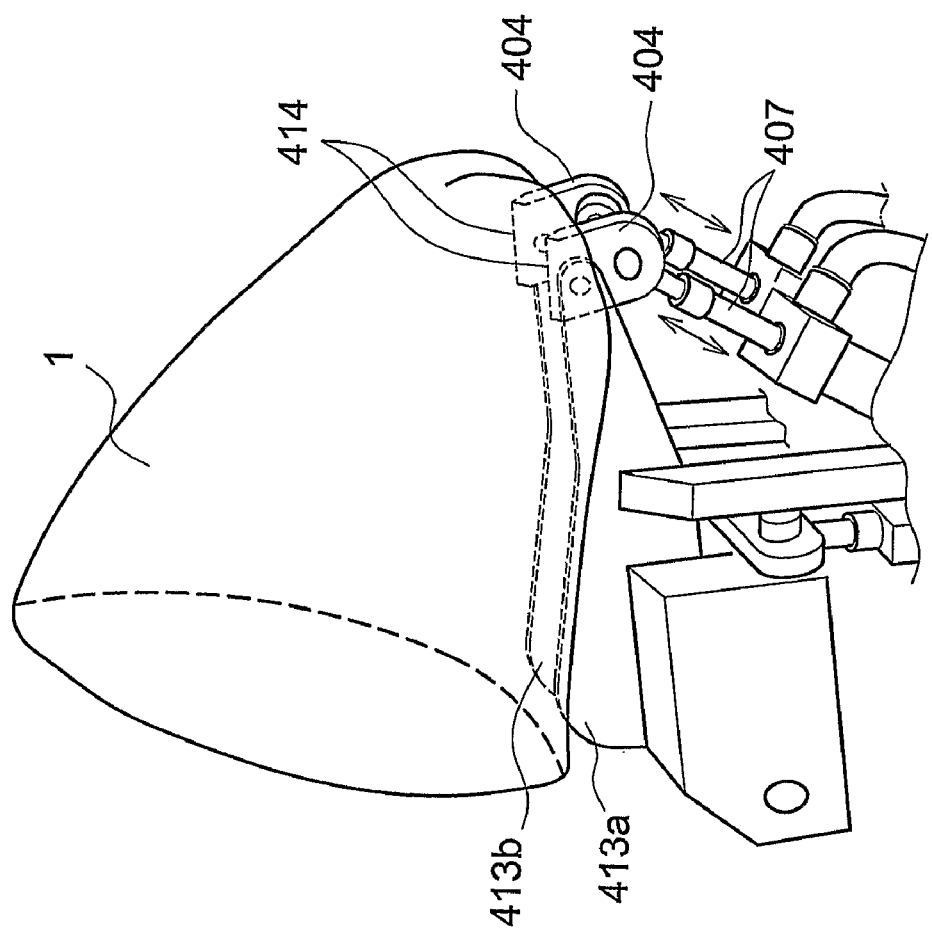
Figure 28:
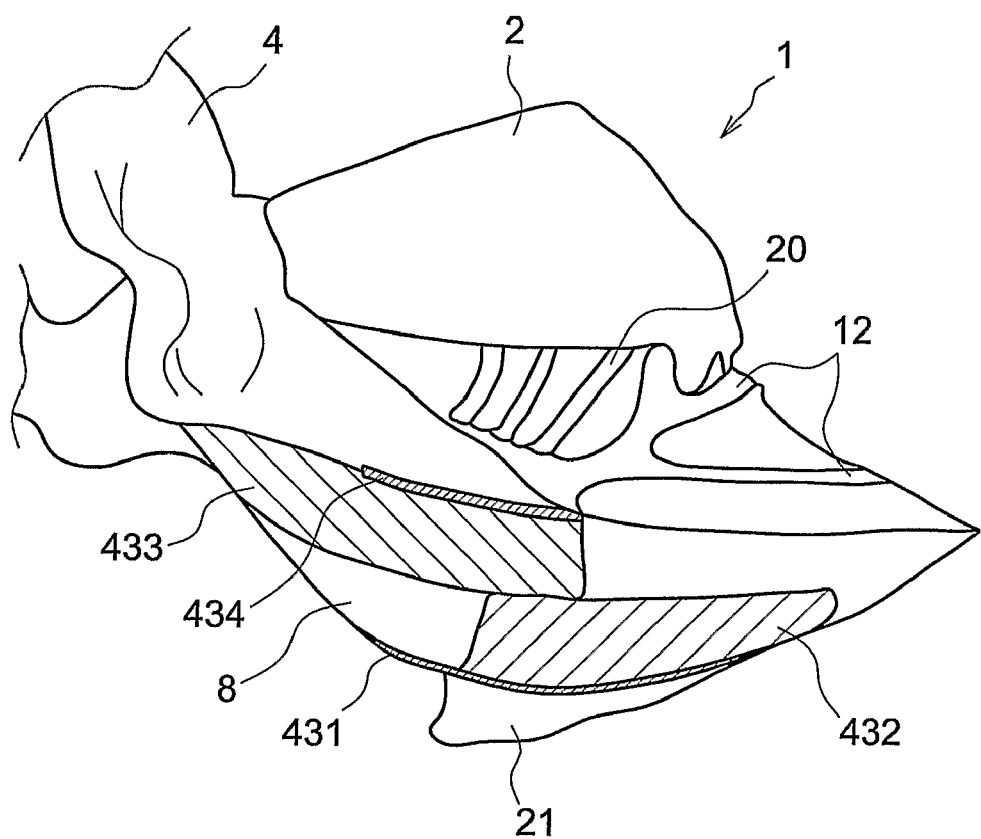
Figure 29:
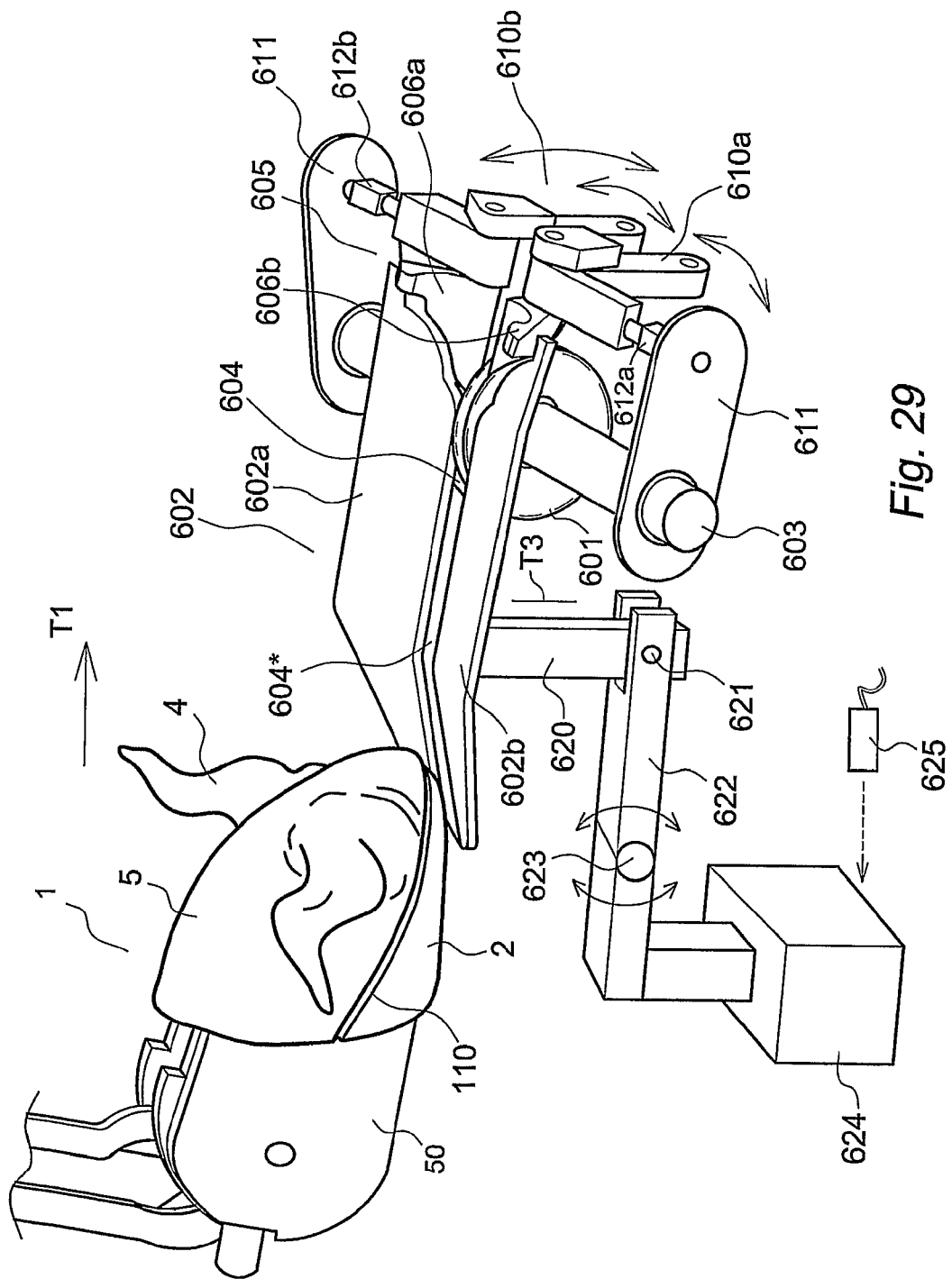
Figure 33:
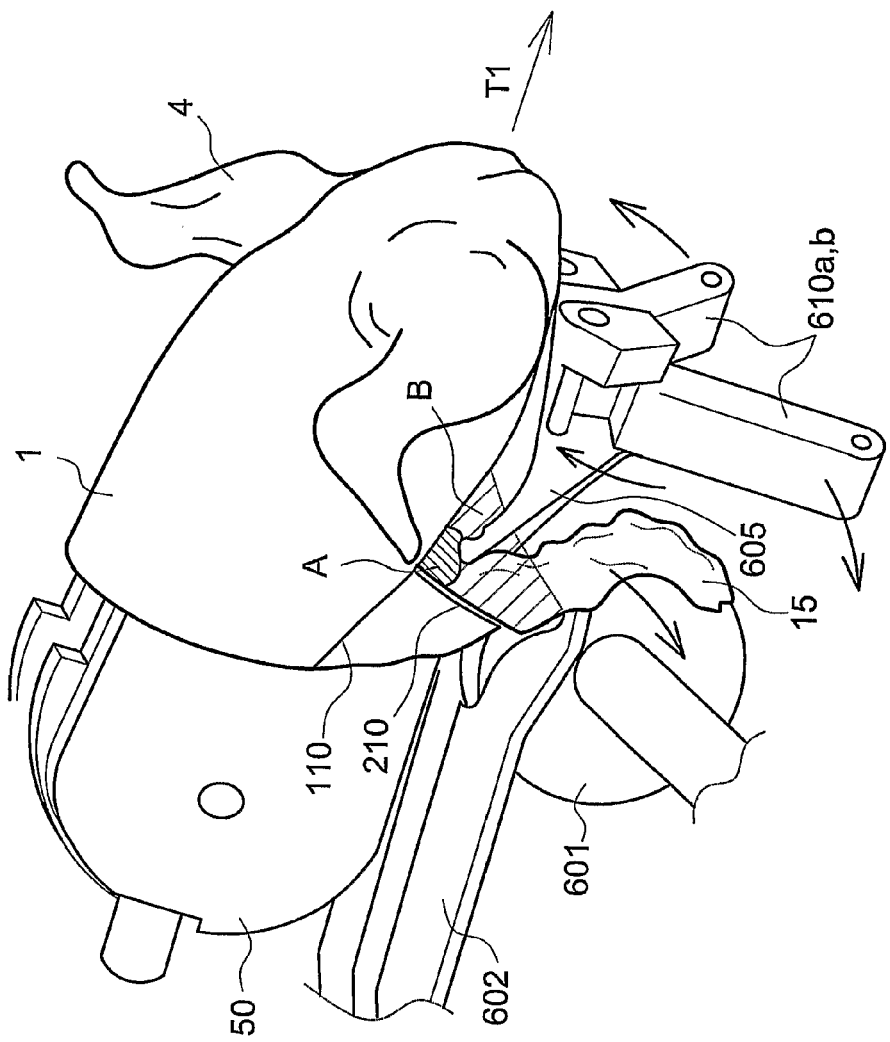
Figure 34:
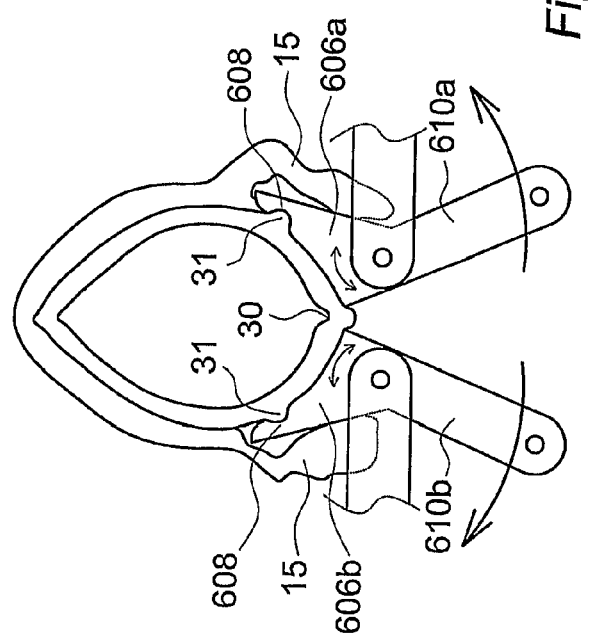
Figure 35:
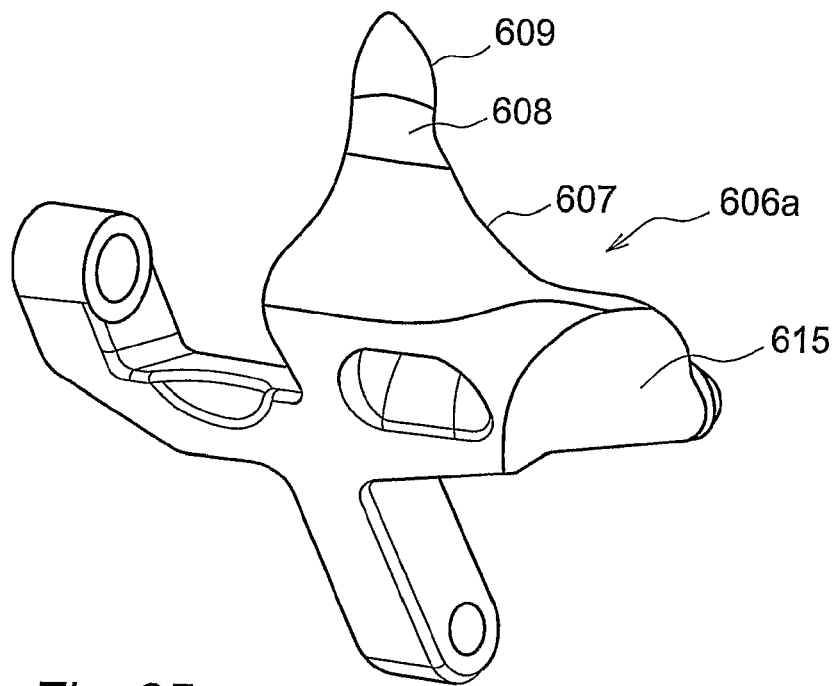
Figure 36:
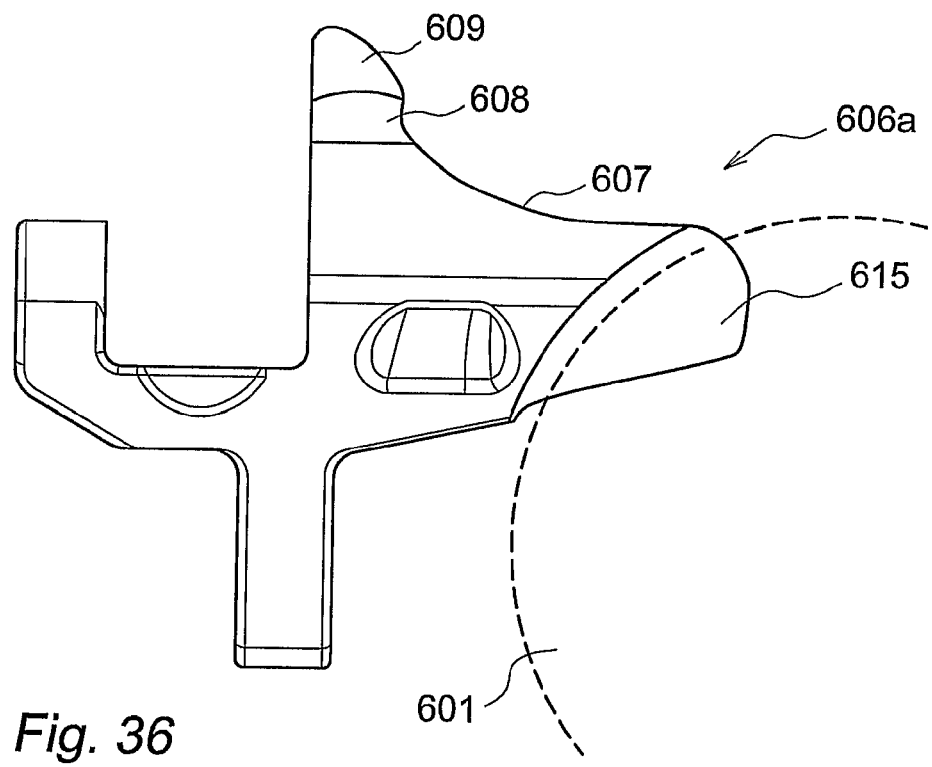
Figure 37:
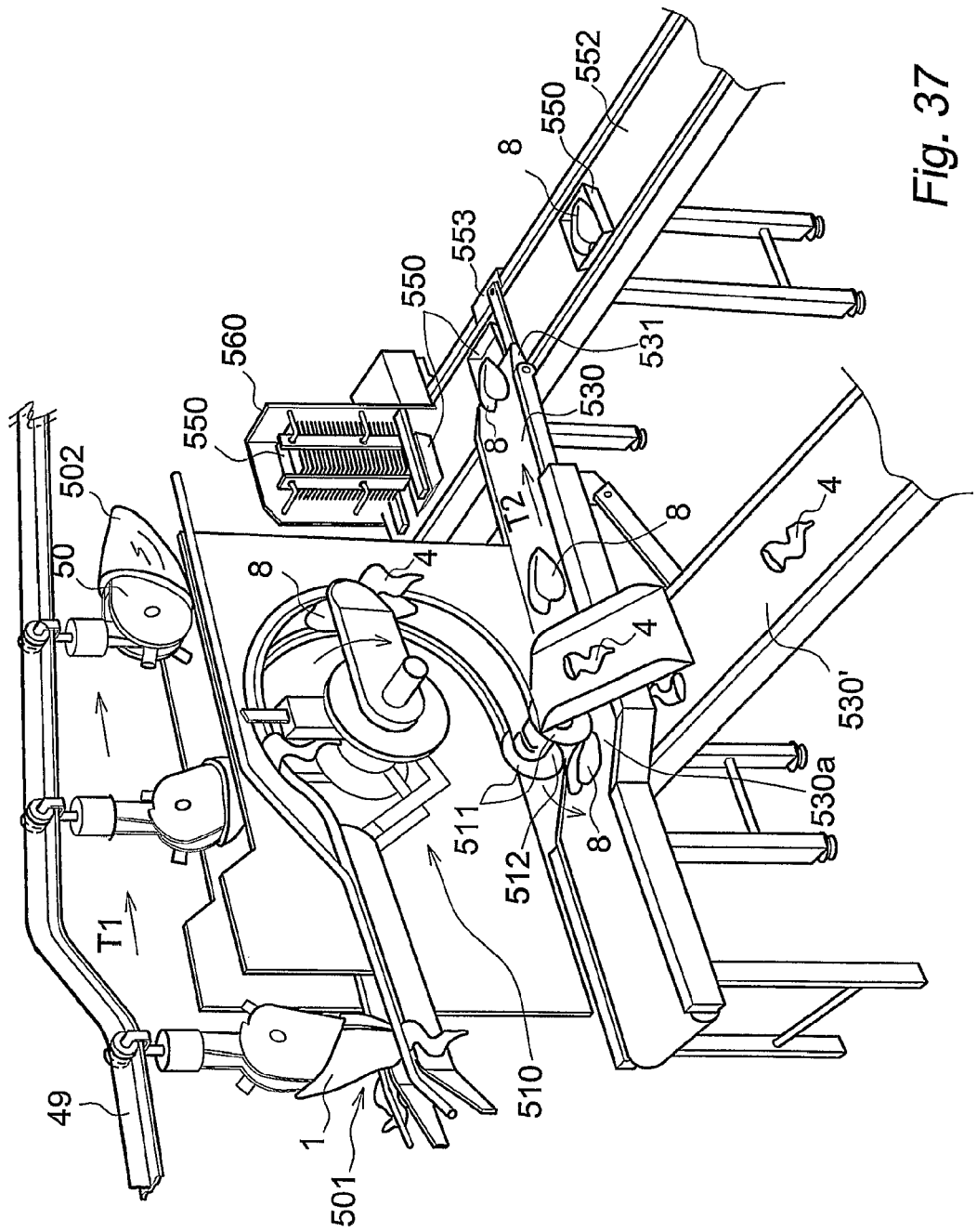
Figure 38:
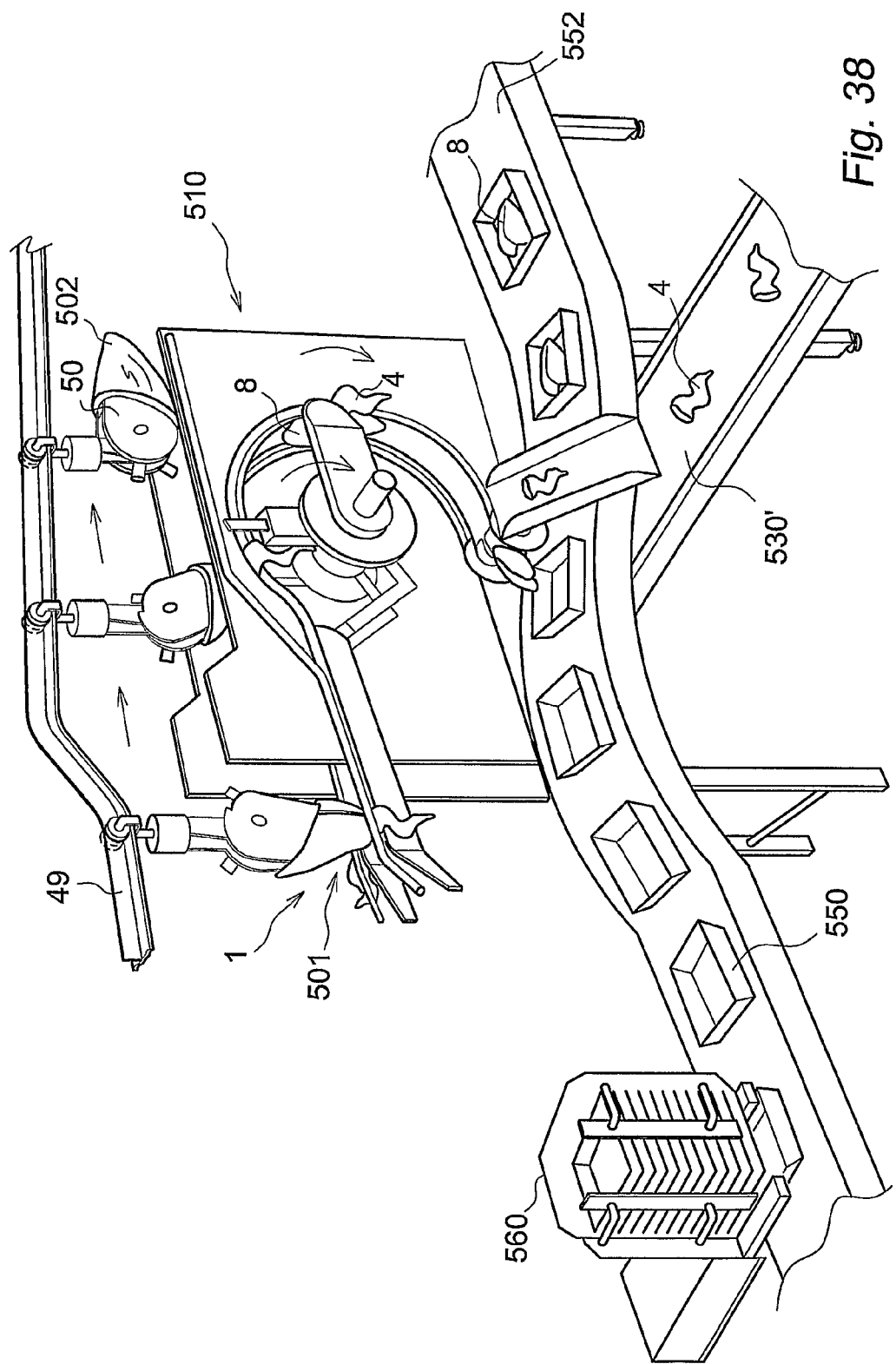
Figure 39:
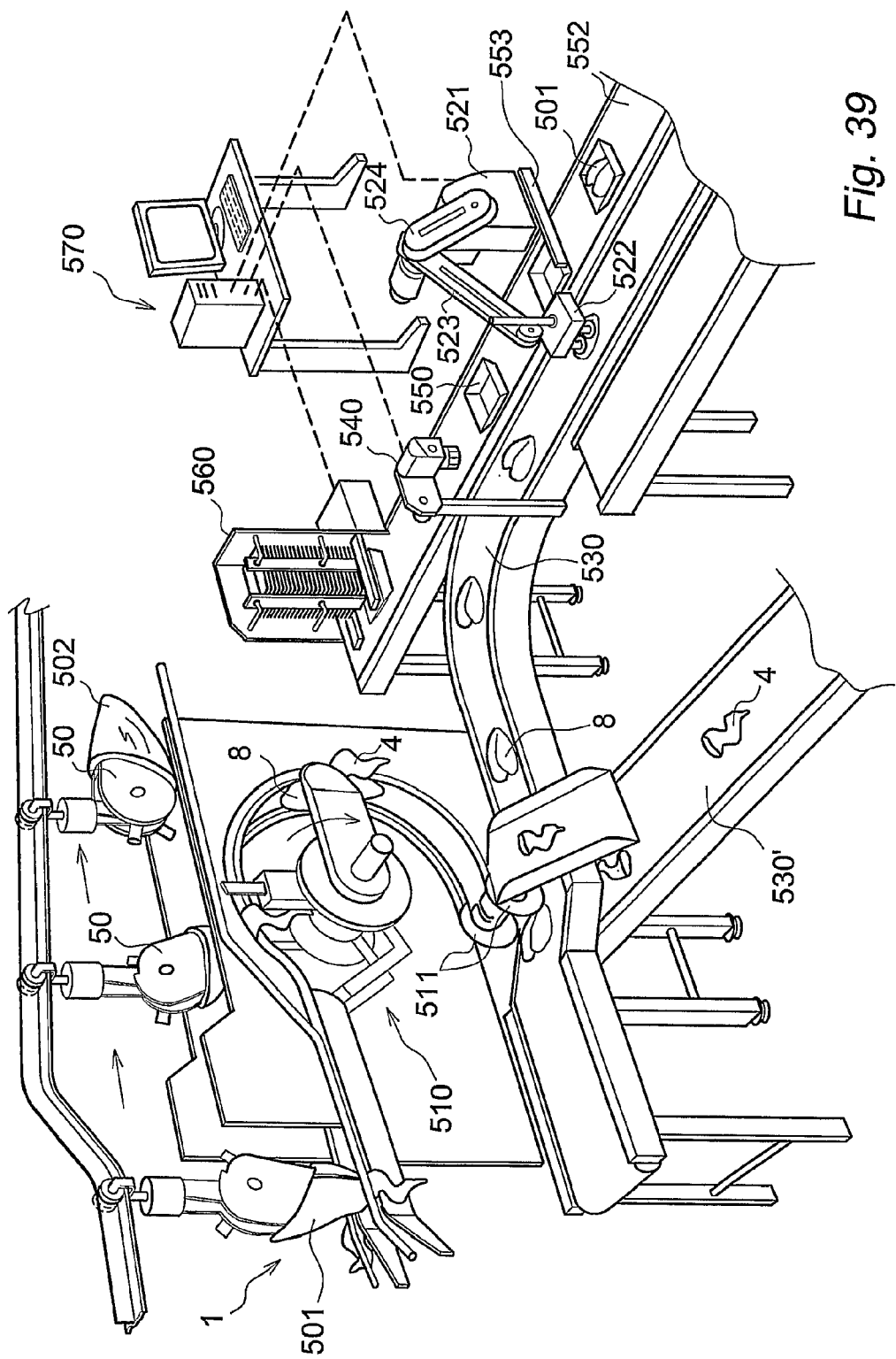
Figure 40:
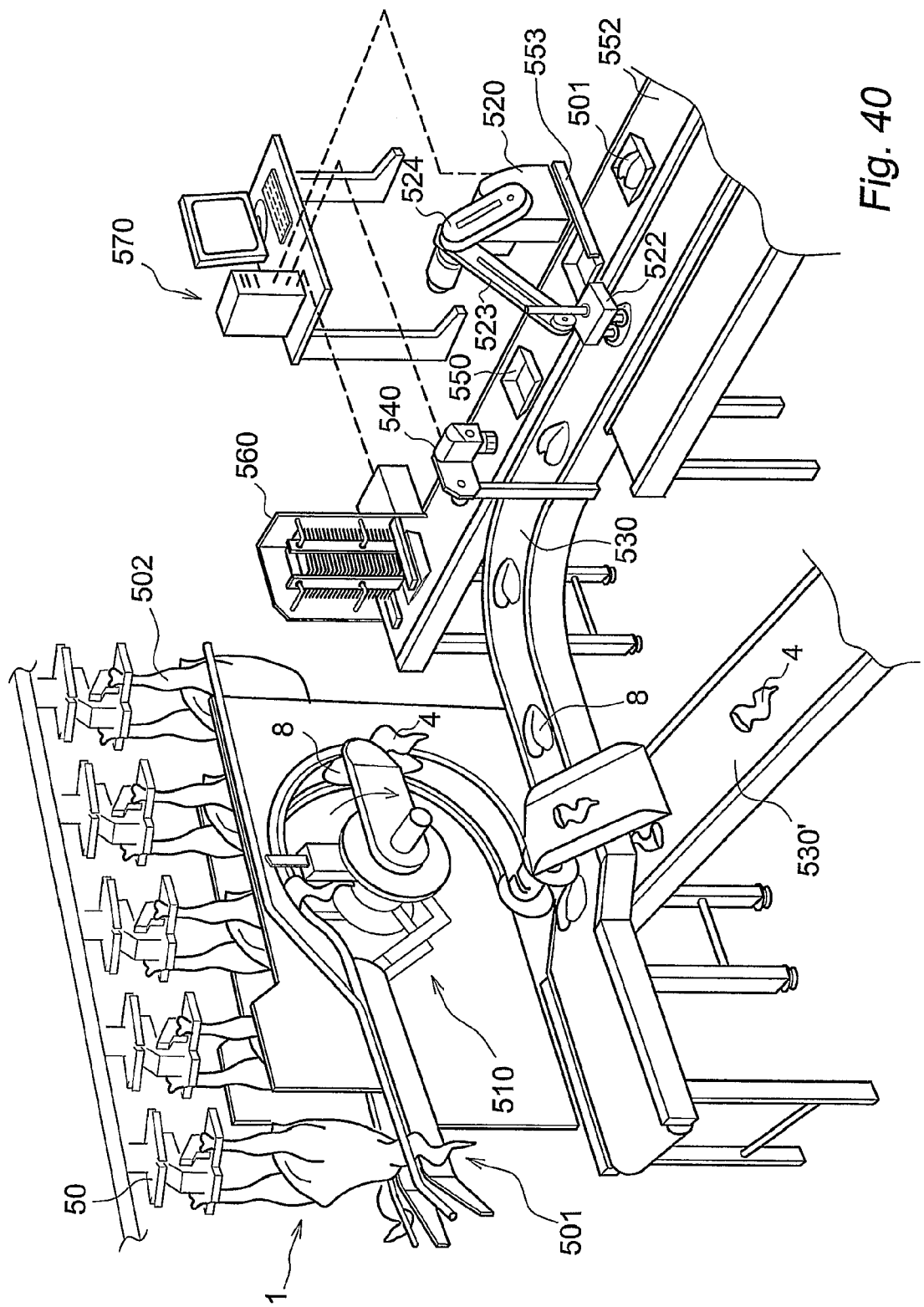
Figure 41:
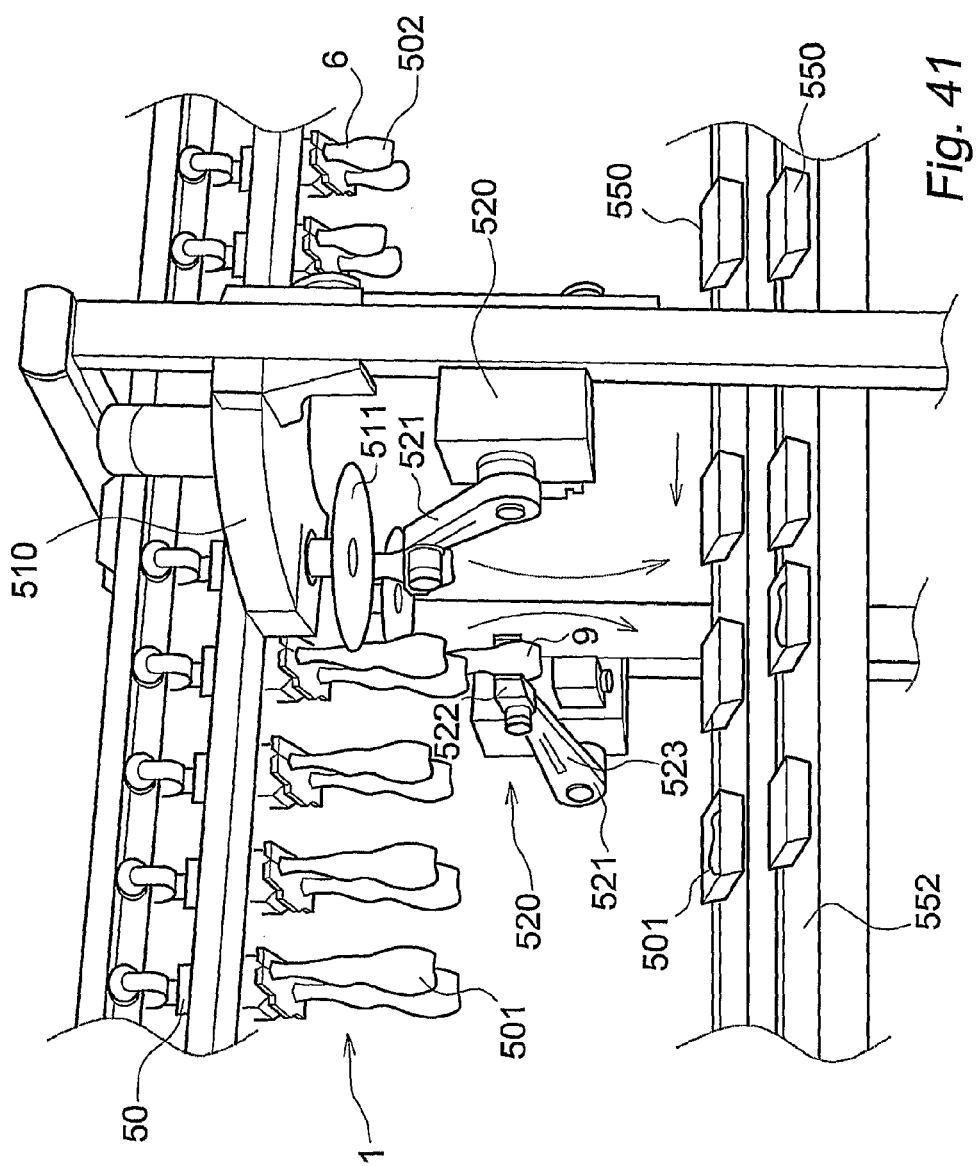
Figure 42:
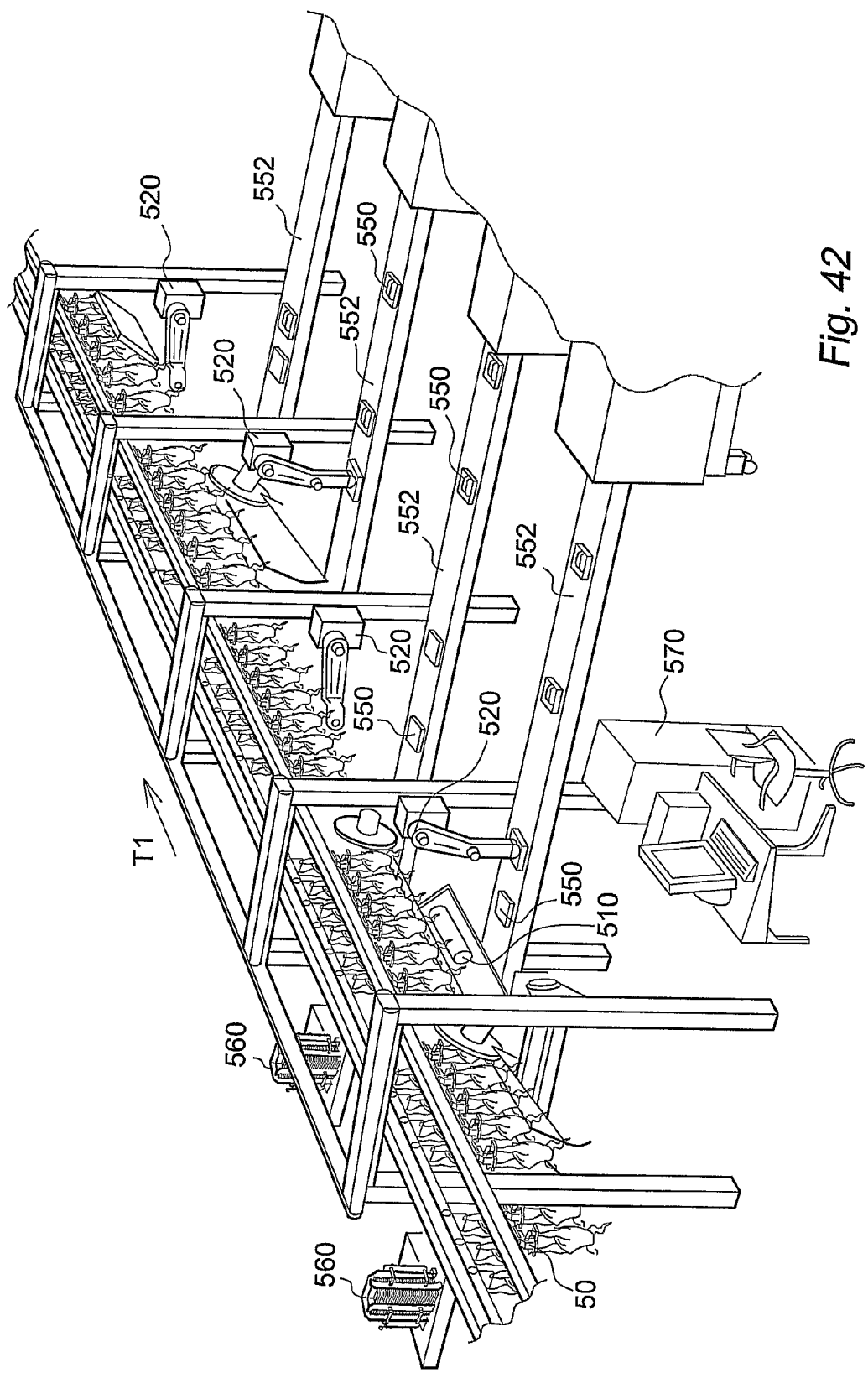
Figure 43:
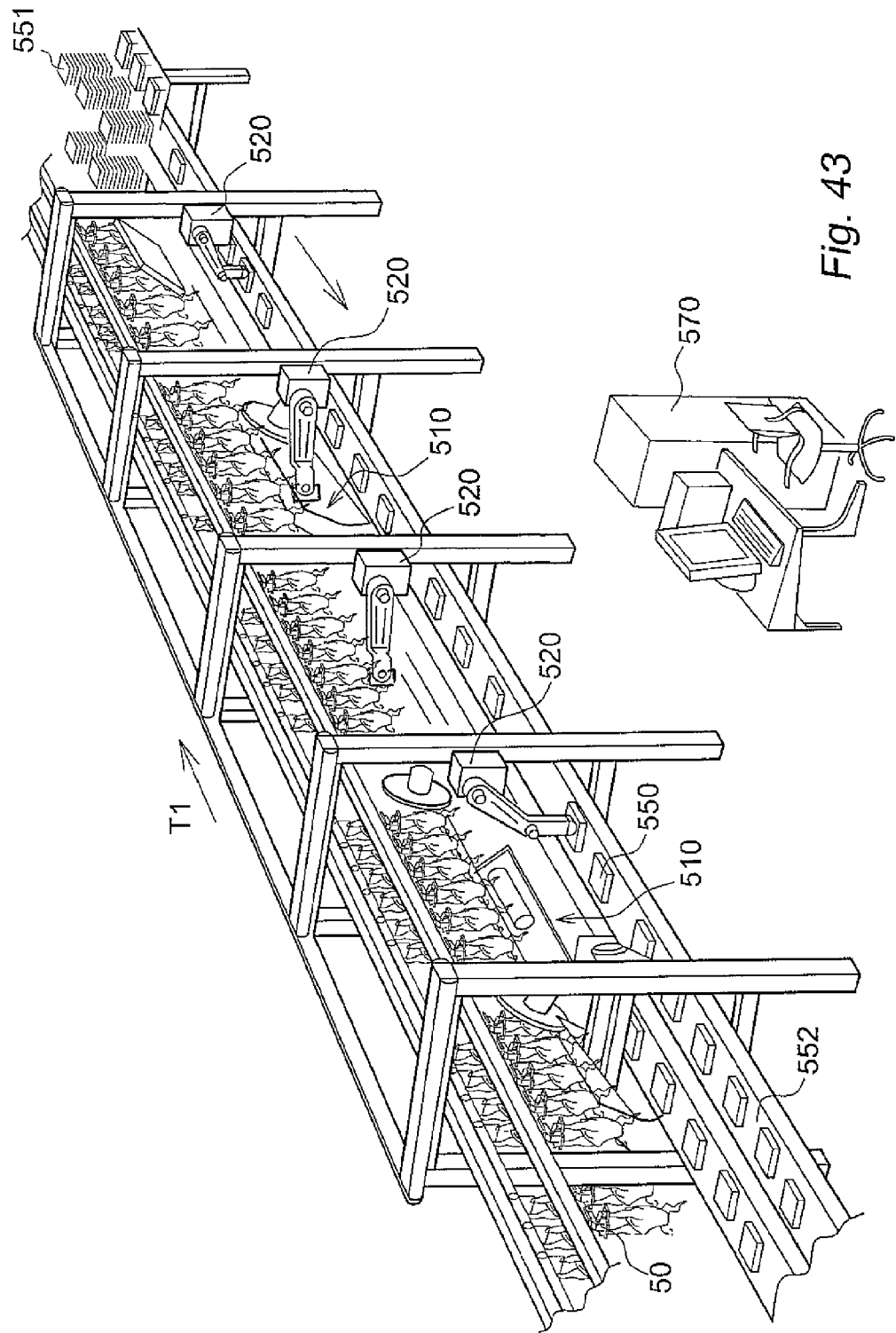
Figure 44:
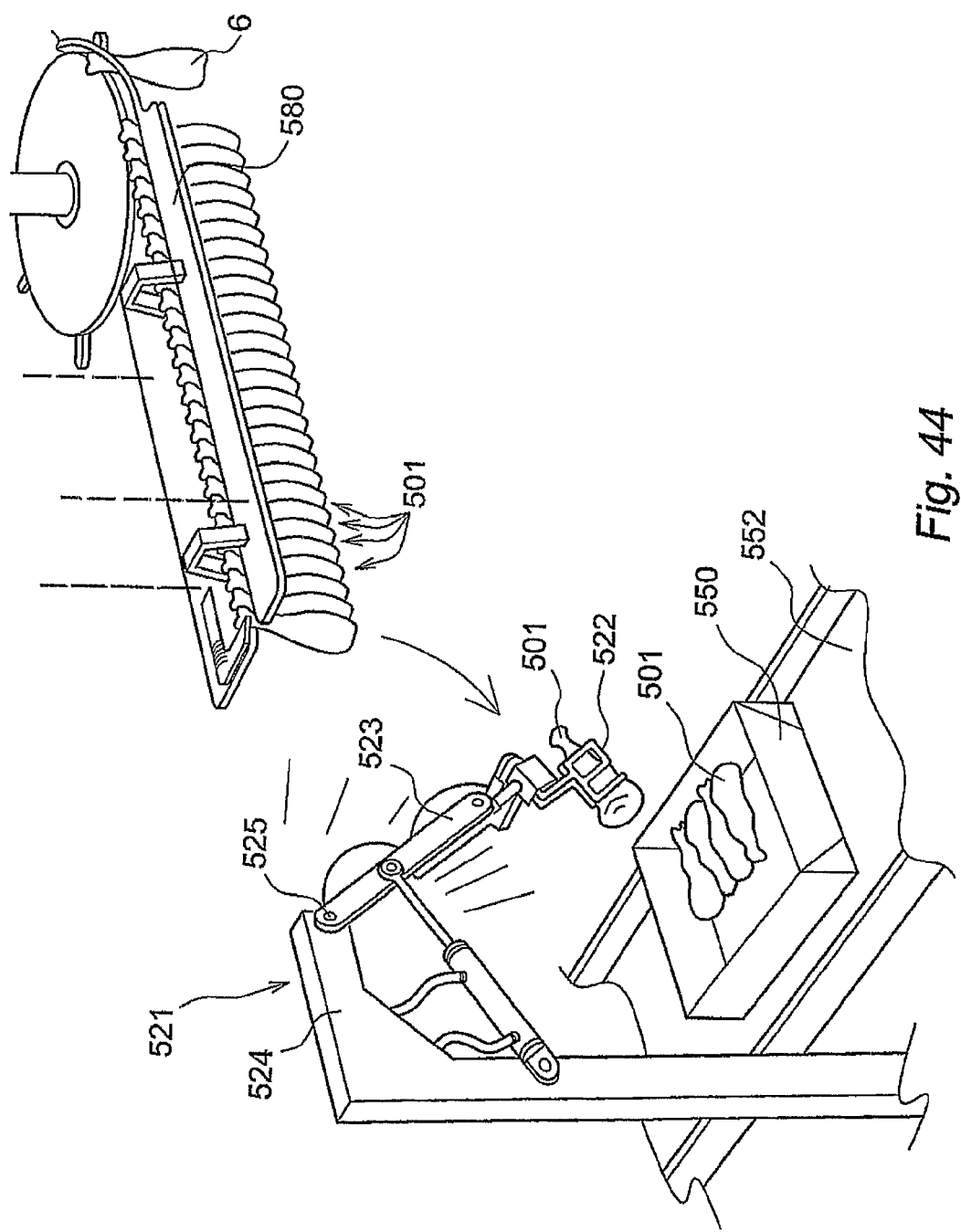
Figure 45:
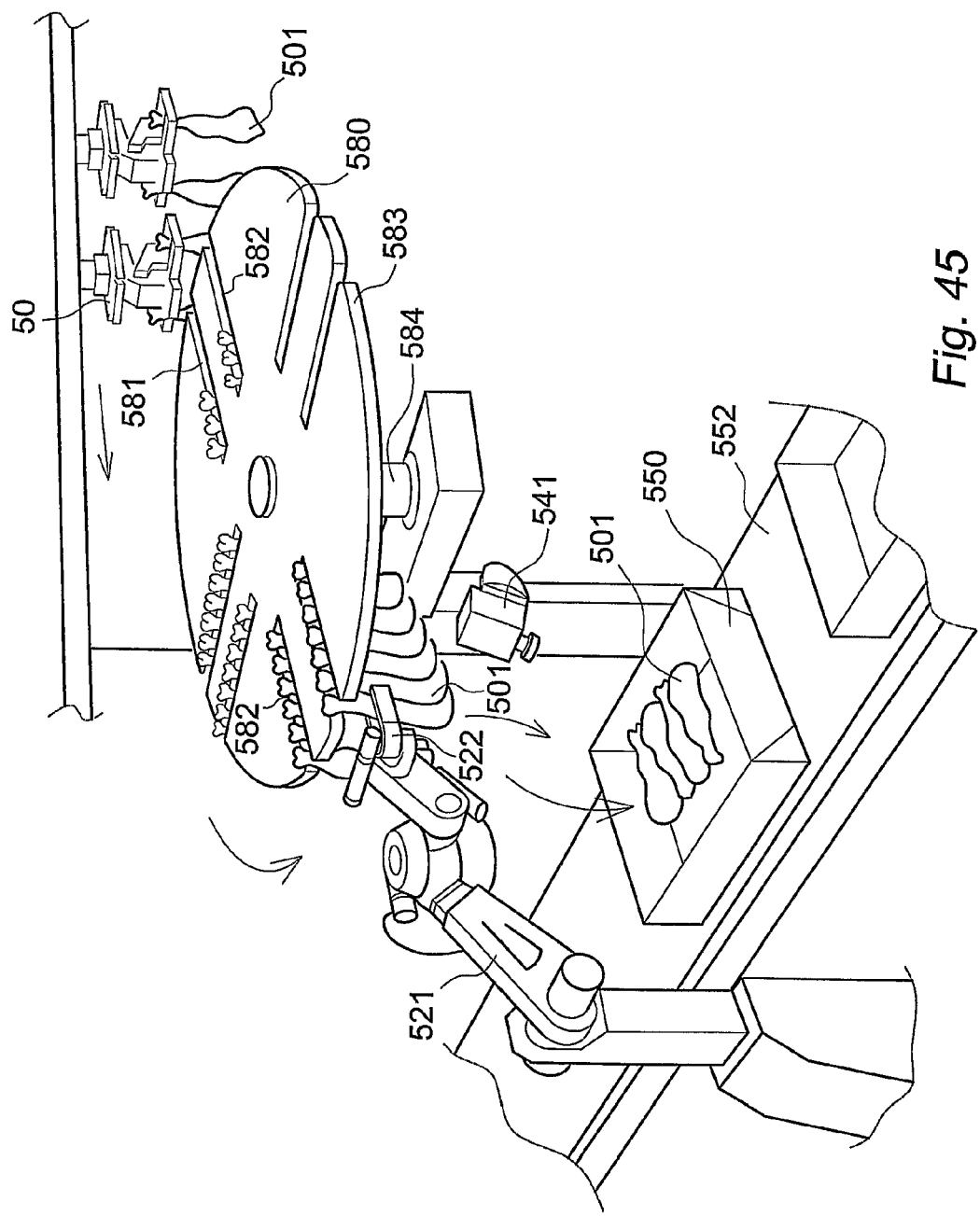
Figure 46:
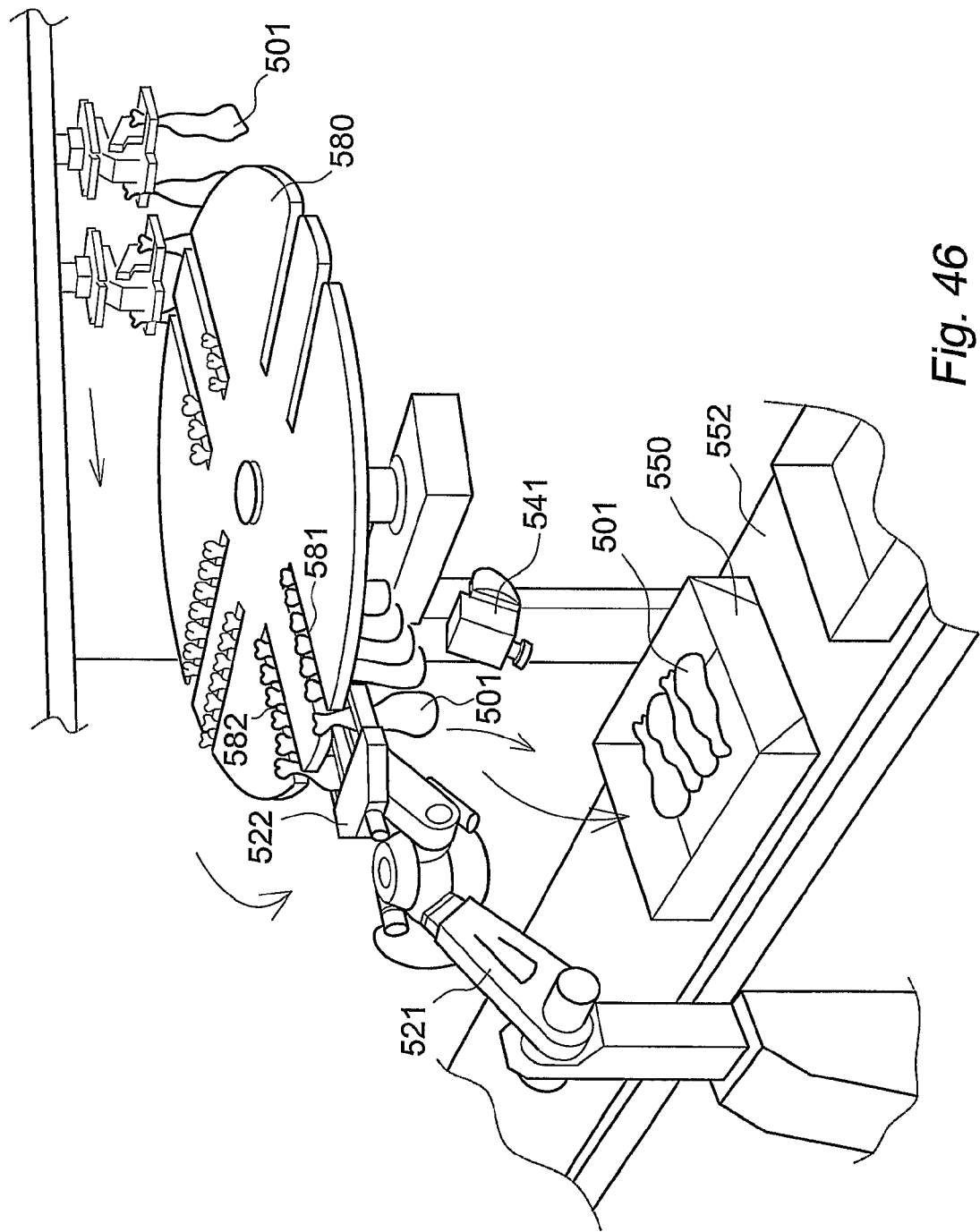
Figure 47:
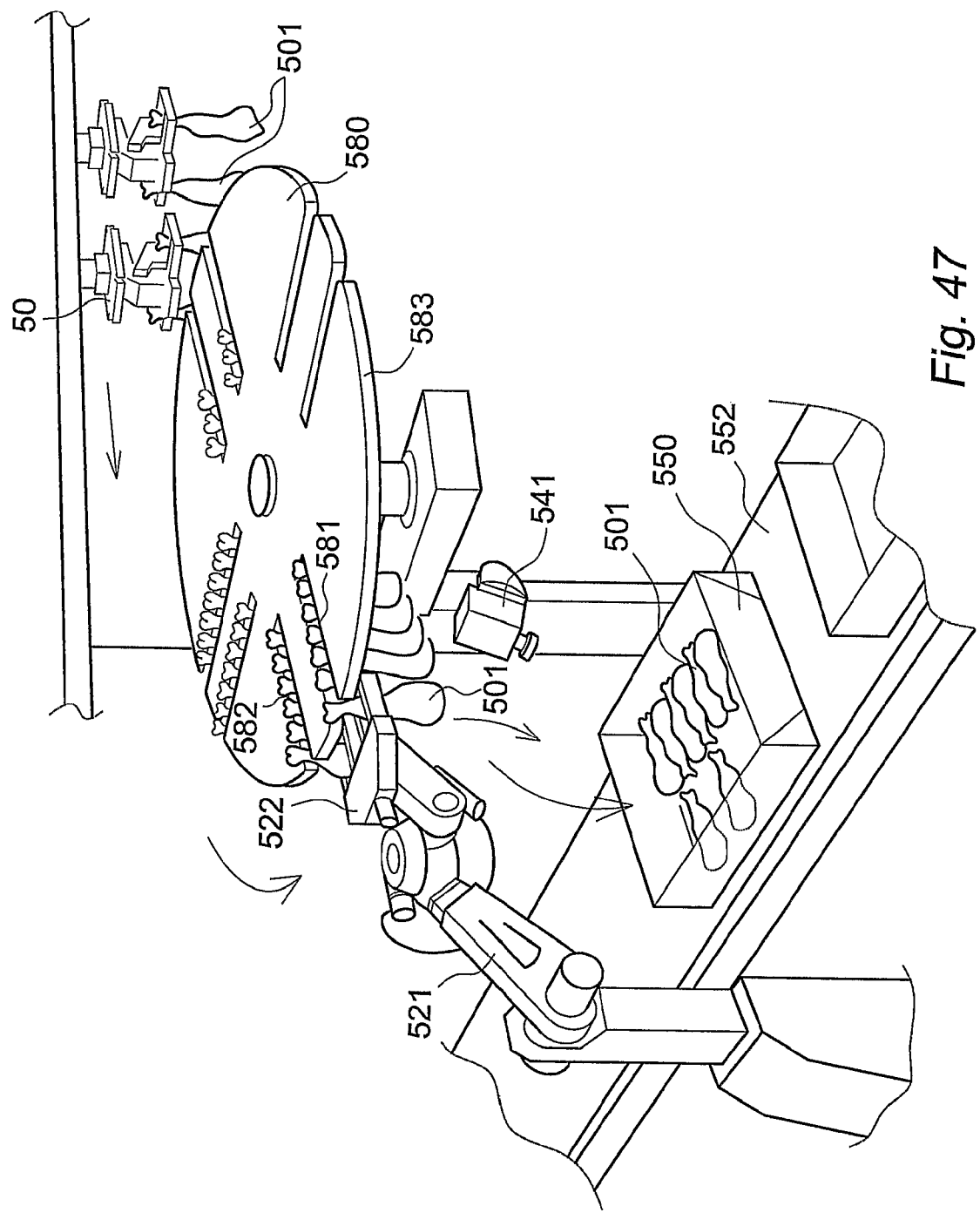
Figure 48:
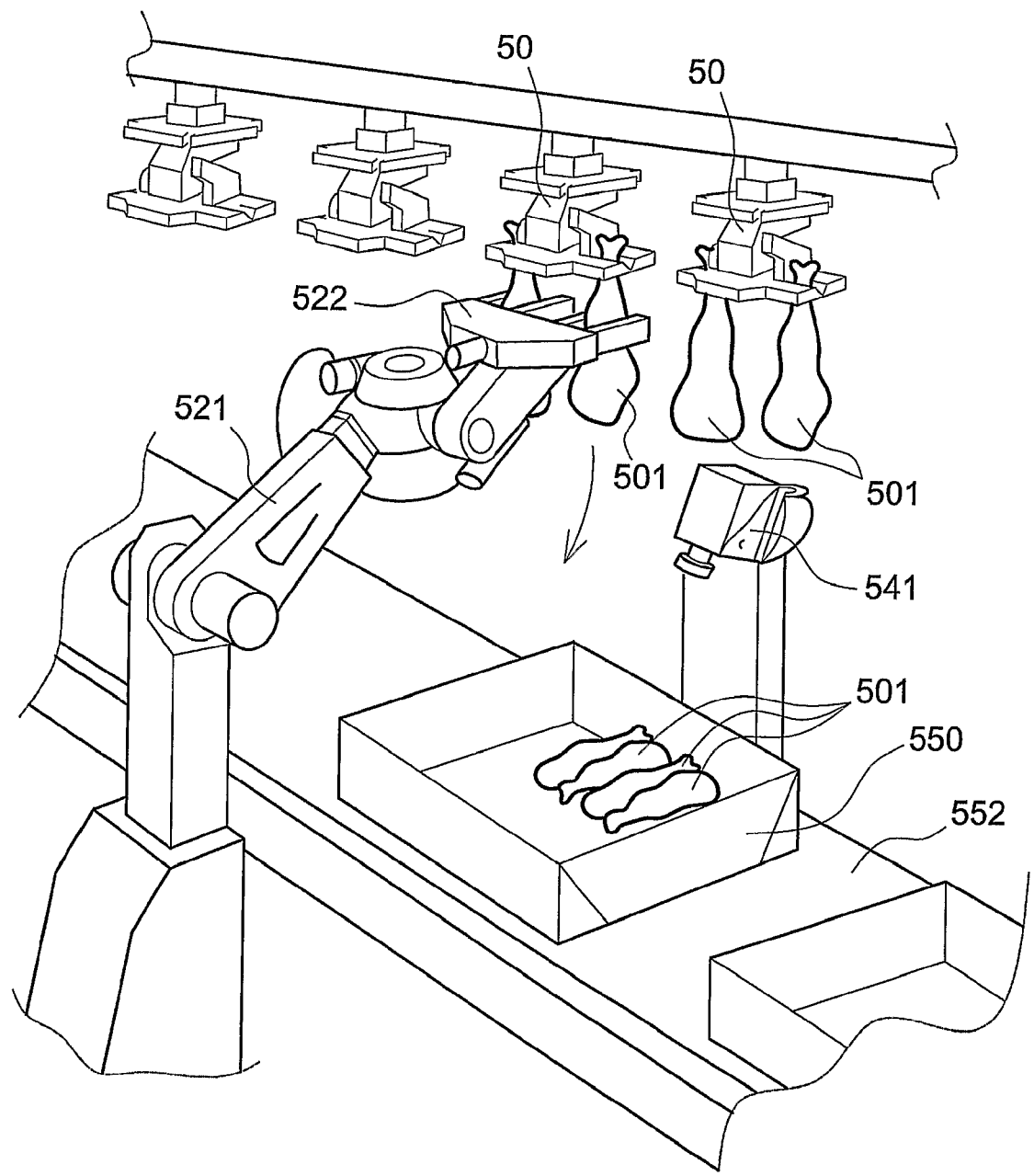
Figure 49:
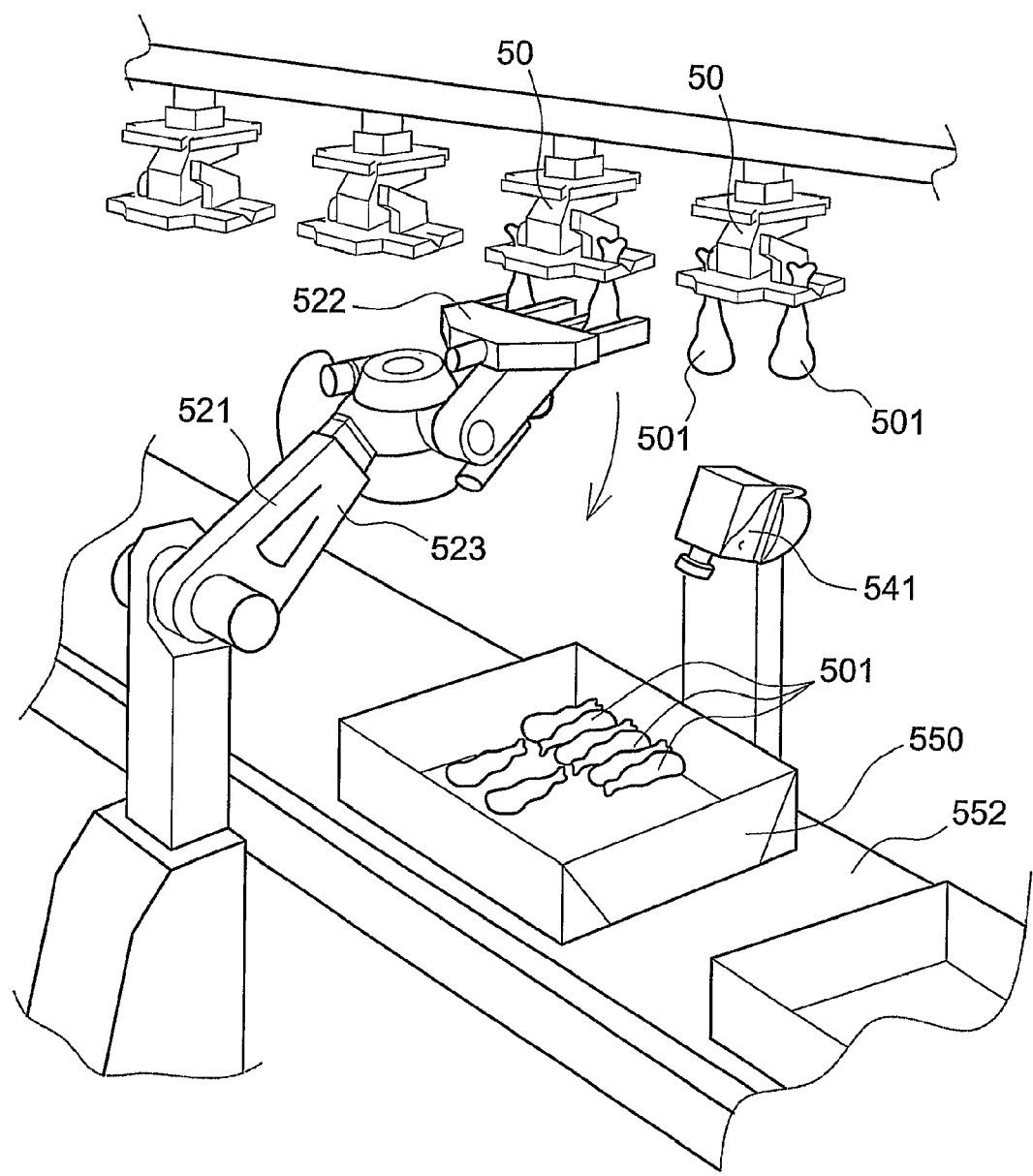
Figure 50:
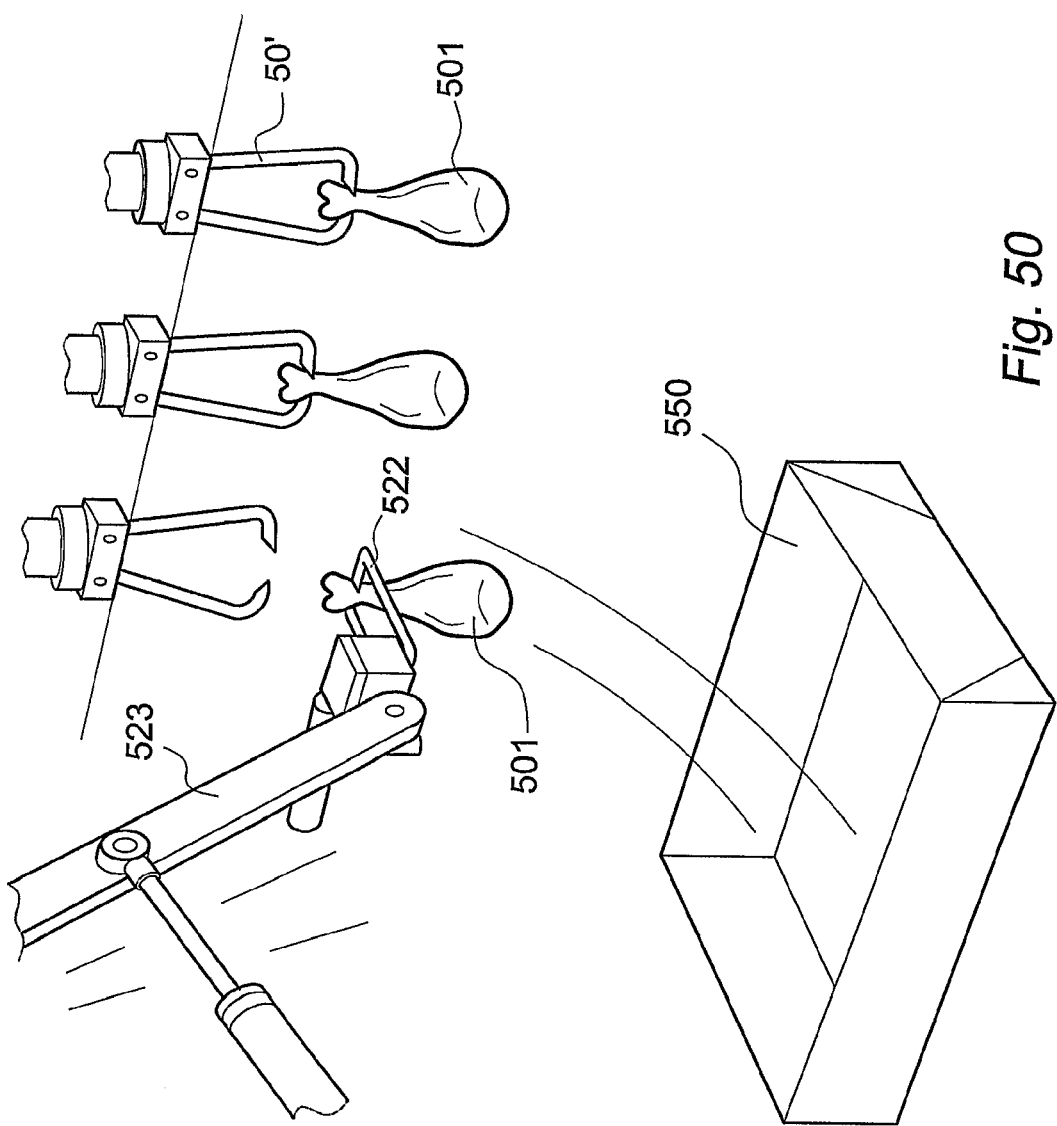
Figure 51:
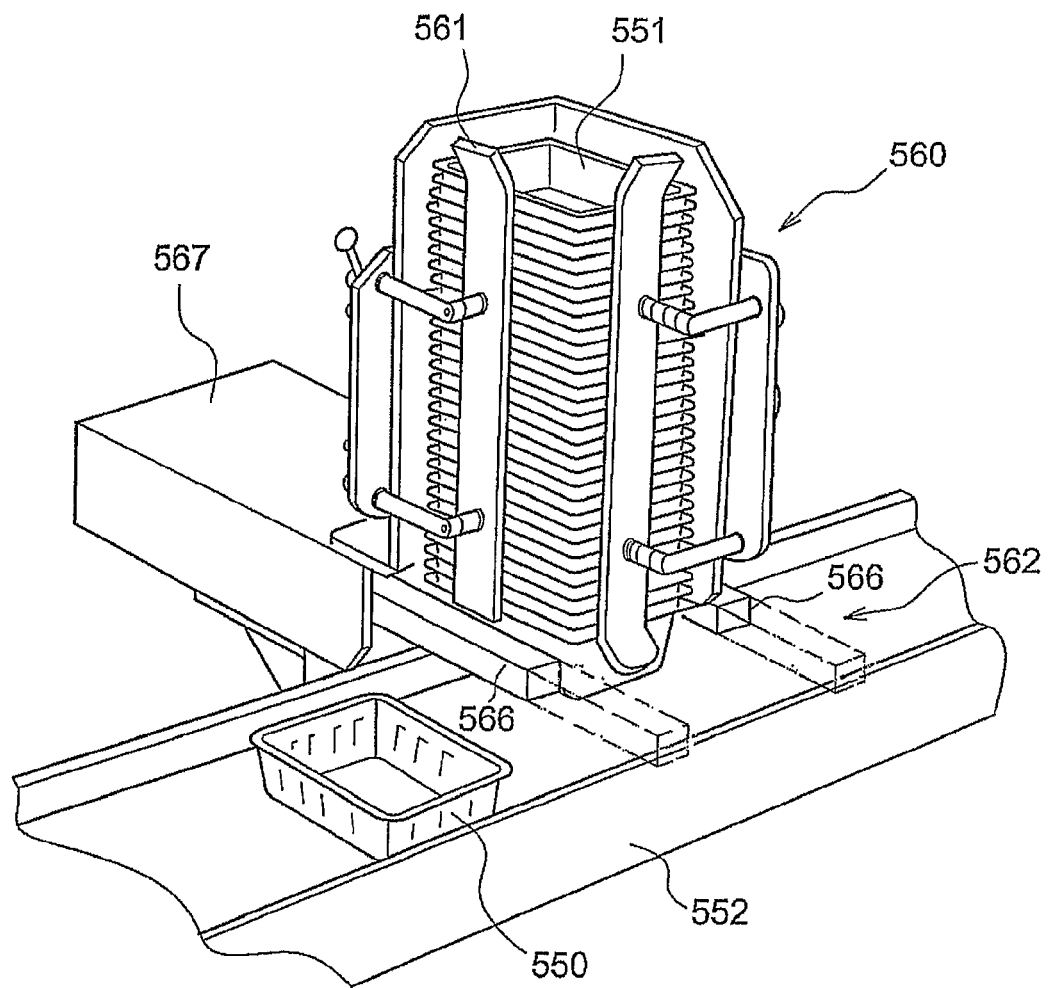
Figure 54:
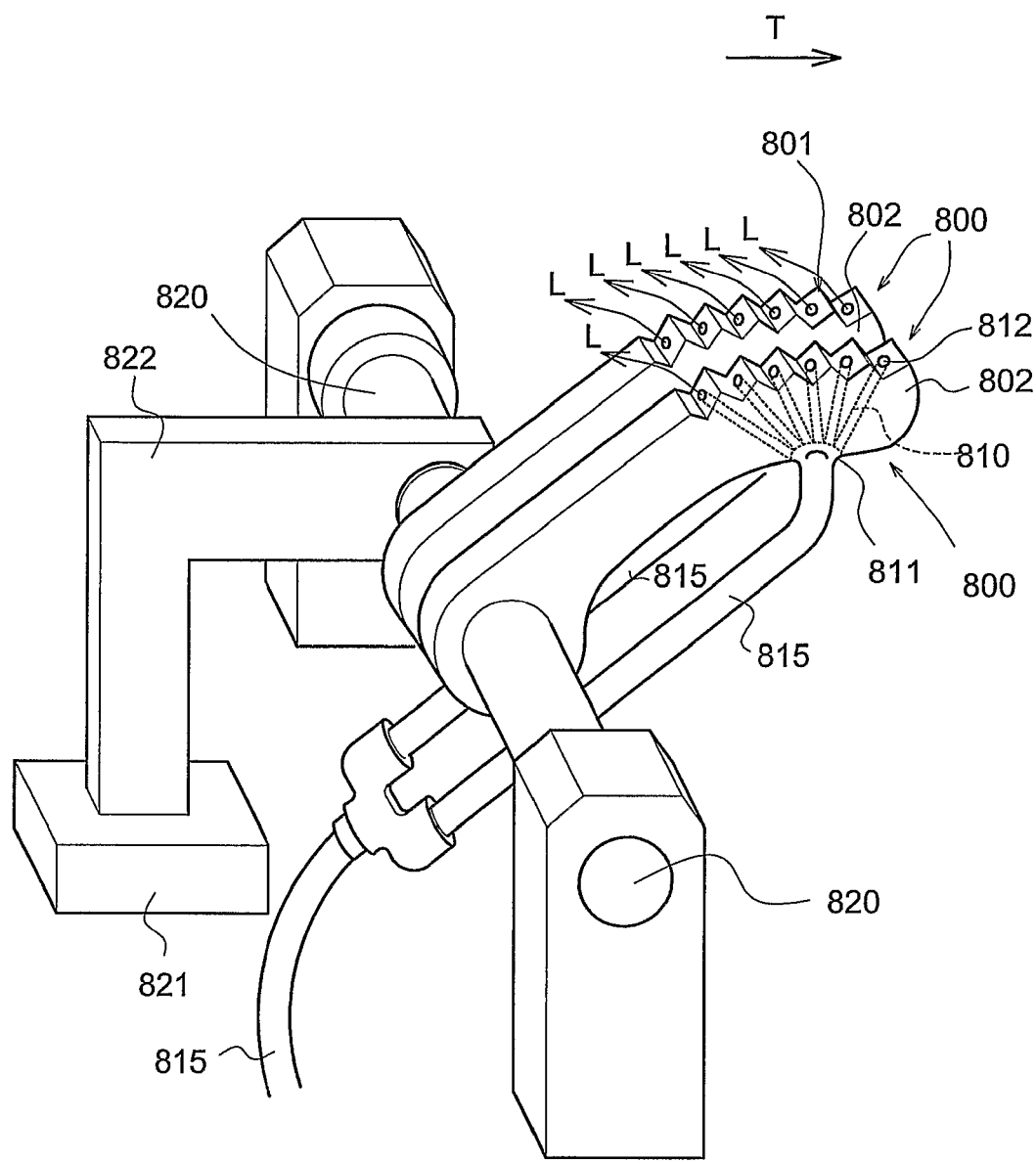
Figure 55:
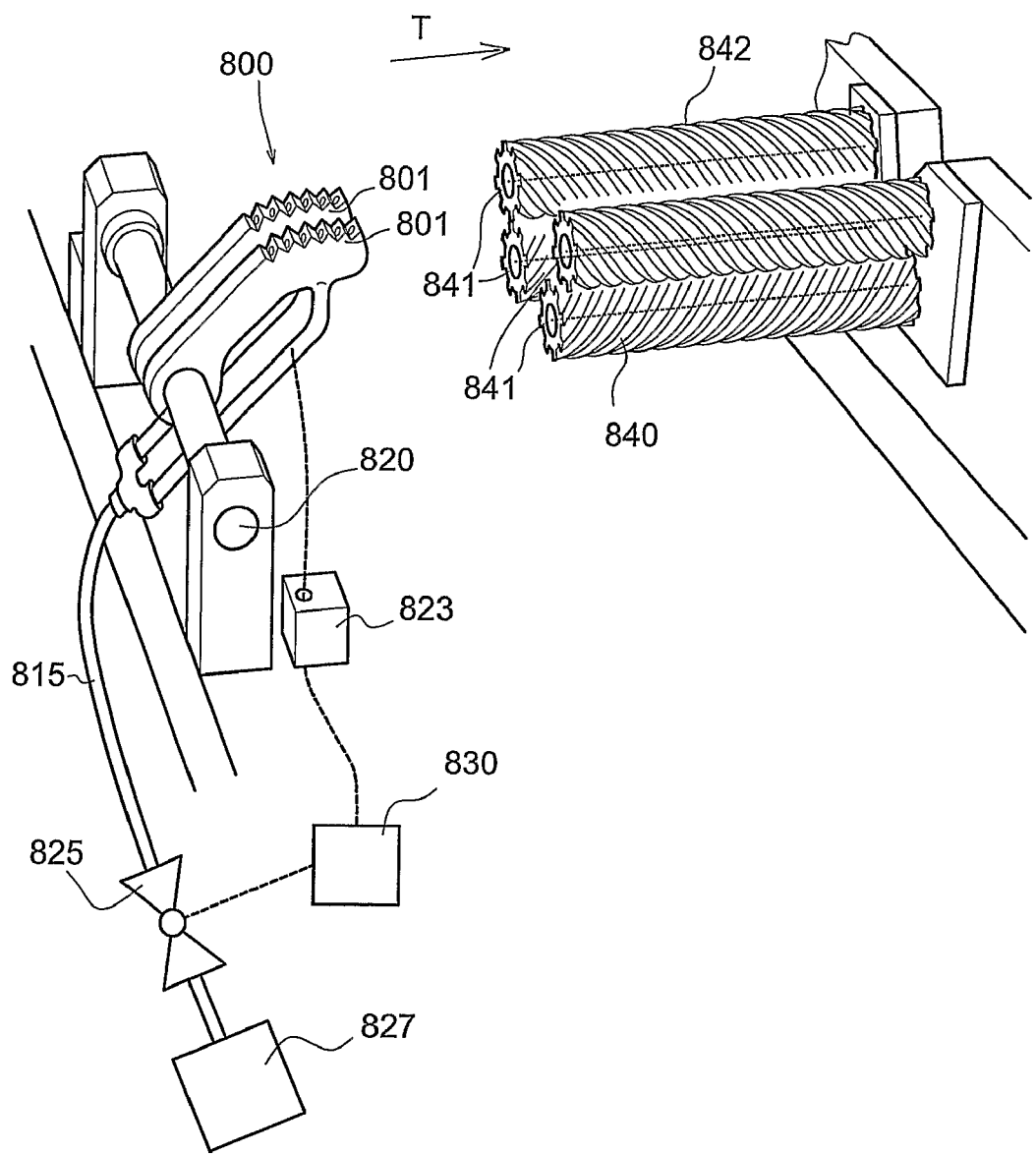
Figure 55A:
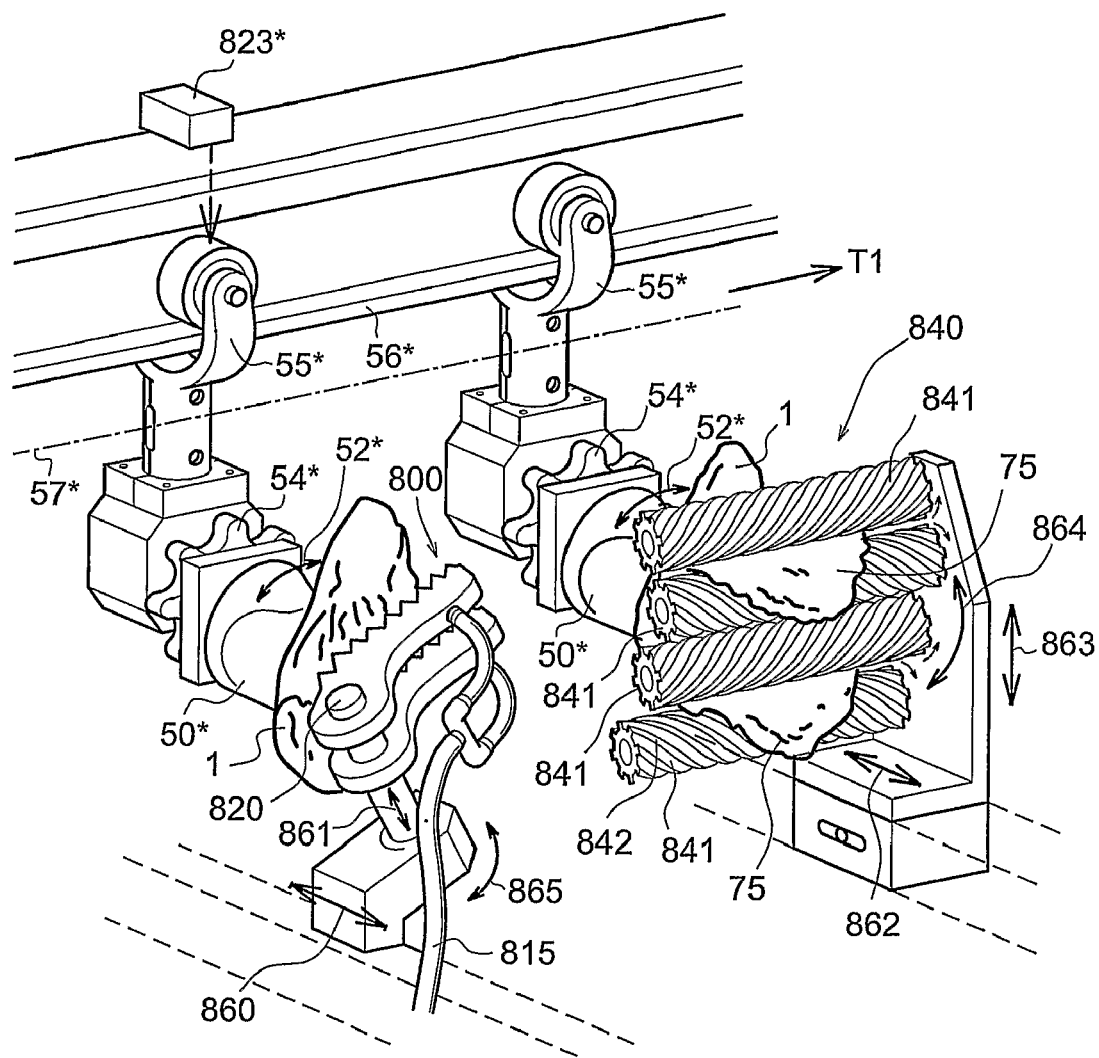
Figure 55B:
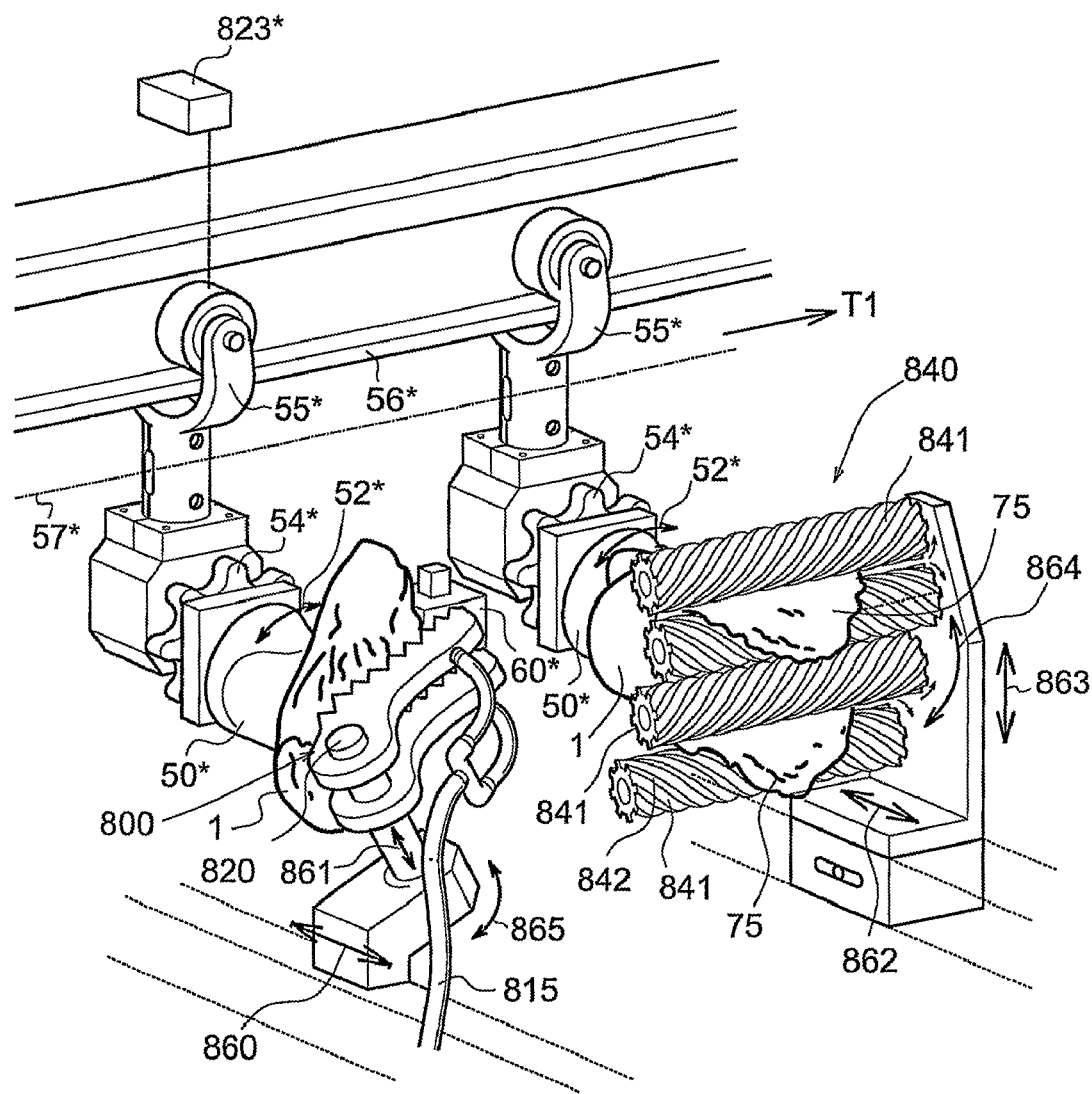
Figure 55C:
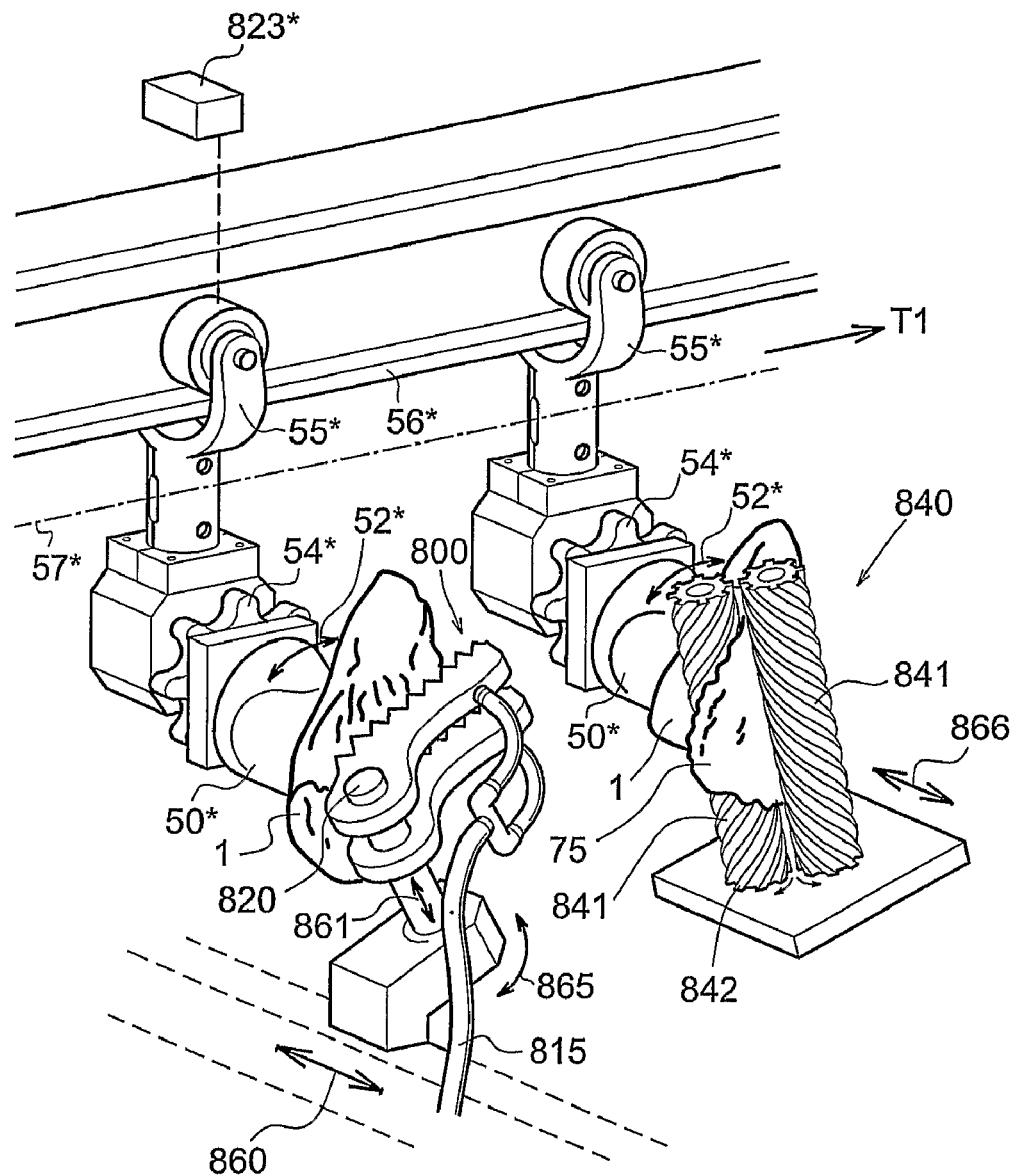

The drawing shows in:

FIG. 1 an example of a carcass part with an incision according to the first aspect of the invention, FIG. 1A an overview of the anatomy of a carcass part indicating the abdominal muscle tissue, FIG. 1B an overview of the anatomy of a carcass part indicating the delta bone, FIG. 1C a product carrier with a front half on it, FIGS. 1D and 1E the arranging of a breast cap on the product carrier, FIG. 1F an alternative product carrier, FIG. 1G the alternative product carrier of FIG. 1F with a breast cap with wings as the carcass part to be processed, FIG. 1H the alternative product carrier of FIG. 1F with a breast cap without wings as the carcass part to be processed, FIG. 2 a first example of a part of a method and device according to the first aspect of the invention, FIG. 3 a second exemplary embodiment of a part of the method and the device according to the first aspect of the invention, FIG. 4 a part of the device according to FIG. 3, FIG. 5 a diagrammatical depiction of a carcass part, FIG. 6 a first stage of the method according to the second aspect of the invention in a device according to the second aspect of the invention, FIG. 7 a second stage of the method according to the second aspect of the invention in a device according to the second aspect of the invention, FIG. 8 possible embodiments of incisions into a carcass part of slaughtered poultry, FIG. 9 a part of a first embodiment of the method and device according to the fifth aspect of the invention, in a first stage of the method according to the fifth aspect of the invention, FIG. 10 a part of a first embodiment of the method and device according to the fifth aspect of the invention, in a second stage of the method according to the fifth aspect of the invention, FIG. 11 a part of a first embodiment of the method and device according to the fifth aspect of the invention, in a third stage of the method according to the fifth aspect of the invention, FIG. 12 diagrammatically, peeling off the back meat from the back of the carcass part, FIG. 13 a first stage of a second embodiment of the method according to the fifth aspect of the invention, FIG. 14 a second stage of a second embodiment of the method according to the fifth aspect of the invention, FIG. 15 a part of a variation of the method and device according to the fifth aspect of the invention, FIG. 16 a part of a variation of the method and device according to the fifth aspect of the invention, in a somewhat later stage of the method according to the fifth aspect of the invention, FIG. 17 various stages in an example of the method according to the sixth aspect of the invention, FIG. 18 an overview of an embodiment of the device according to the sixth aspect of the invention, FIG. 19 making the preliminary incision on both sides of the sternum, FIG. 20 guiding the carcass part across the first scraper while being held by product carrier 50, FIG. 21 guiding the carcass part across the first scraper while being held by product carrier 50, FIG. 22 making the preliminary incision on both sides of the sternum, shown in section, FIG. 23 a cross section of the carcass part, the first scraper member and the guides during scraping, FIG. 24 a detail of the scraping by the first scraper, FIG. 25 a cross section of the scraping by the second scraper members, FIG. 26 a detail of scraping by the second scraper, FIG. 27 the inactive position of the actuatable blades, FIG. 28 an indication of the position of incisions and the parts of the breast fillet to be scraped loose in the carcass part, FIG. 29 an overview of a device according to the fourth aspect of the invention, FIG. 30 the device of FIG. 29, during execution of a first phase of the method according to the fourth aspect of the invention, FIG. 31 a cross section of the situation of FIG. 30, FIG. 32 the device of FIG. 29 during execution of a second phase of the method according to the fourth aspect of the invention, FIG. 33 the device of FIG. 29 during execution of a third phase of the method according to the fourth aspect of the invention, FIG. 34 a cross section of the situation of FIG. 33, FIG. 35 a scraper member according to a preferred embodiment of the fourth aspect of the invention in perspective elevation, FIG. 36 a side view of the scraper member according to FIG. 35, FIG. 37 a first embodiment of the method and the system according to the eighth aspect of the invention, FIG. 38 a variation of the system and the according to FIG. 37, FIG. 39 a second variation of the system and the method according to FIG. 37, FIG. 40 the system of FIG. 39, using a different product carrier, FIG. 41 a second embodiment of the system and the method according to the invention, FIG. 42 a third embodiment of the system and the method according to the invention, FIG. 43 a variation of the embodiment as shown in FIG. 42, FIG. 44 a fourth embodiment of the system and the method according to the invention, FIG. 45 a variation of the embodiment as shown in FIG. 44, FIG. 46 a variation of the system and the method as shown in FIG. 45, FIG. 47 a variation of the embodiment as shown in FIGS. 44-46, FIG. 48 a fifth embodiment of the system and the device according to the invention, FIG. 49 a variation of the system and the method according to FIG. 48, FIG. 50 a sixth embodiment of the system and the device according to the invention, FIG. 51 an embodiment of a suitable destacker, FIG. 52 a guide as used in the destacker of FIG. 51, FIG. 53 diagrammatically, trays being destacked, FIG. 54 a tucking-up means according to the third aspect of the invention, FIG. 55 an overview of a part of a device according to the third aspect of the invention, FIG. 55A an example of a device according to the third aspect of the invention in combination with the alternative product carrier of FIG. 1F, FIG. 55B an alternative embodiment of the device shown in FIG. 55A, FIG. 55C another alternative embodiment of the device shown in FIG. 55A

Figure 56:
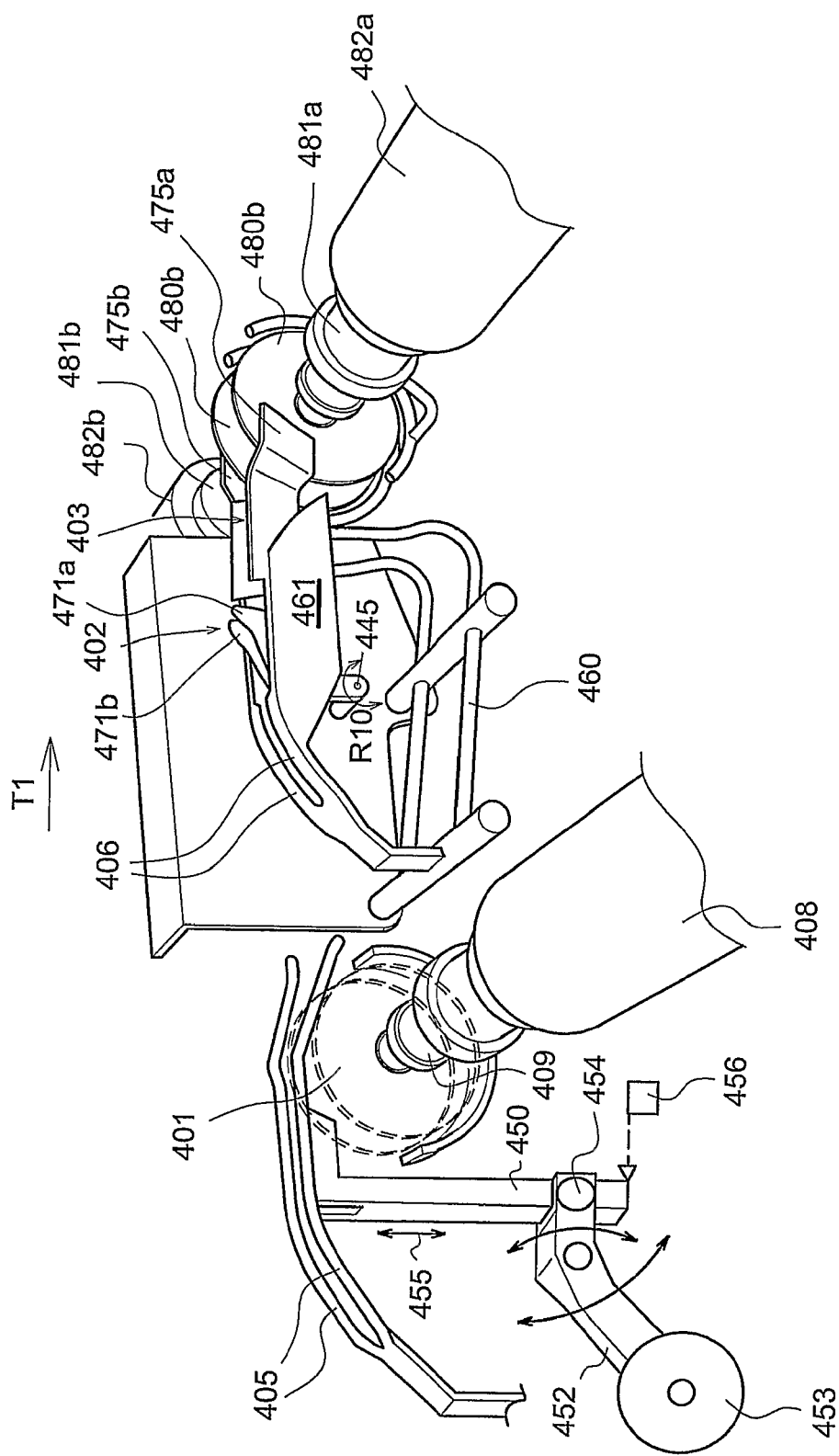
Figure 58:
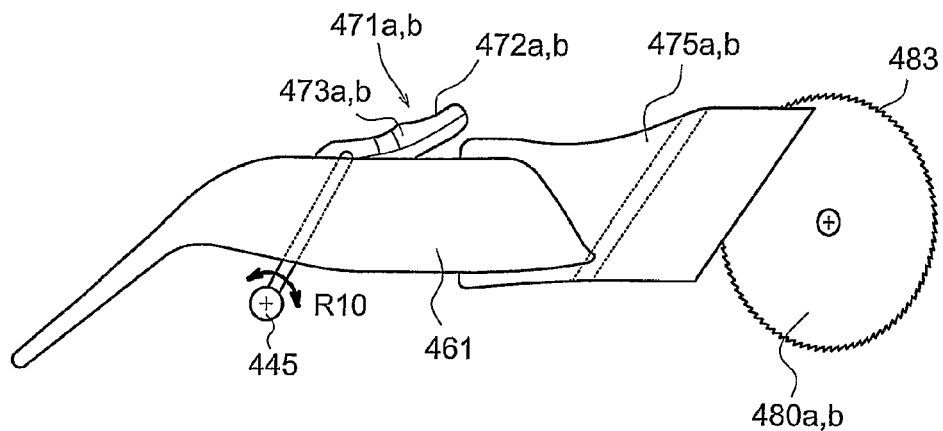
Figure 57:
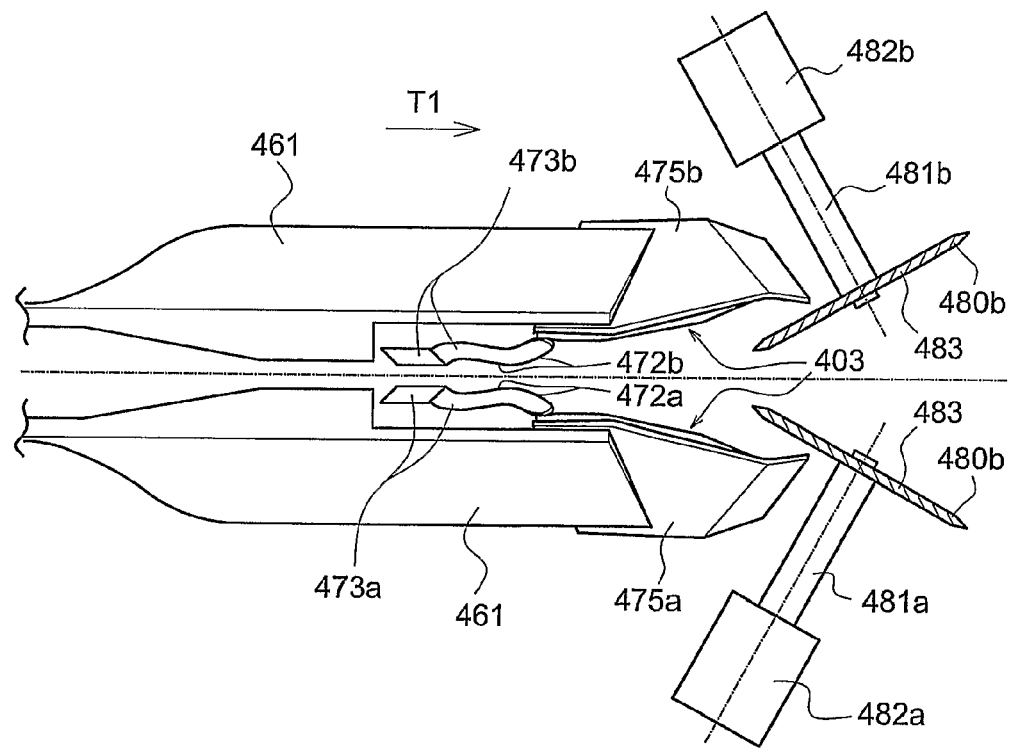
Figure 59A:
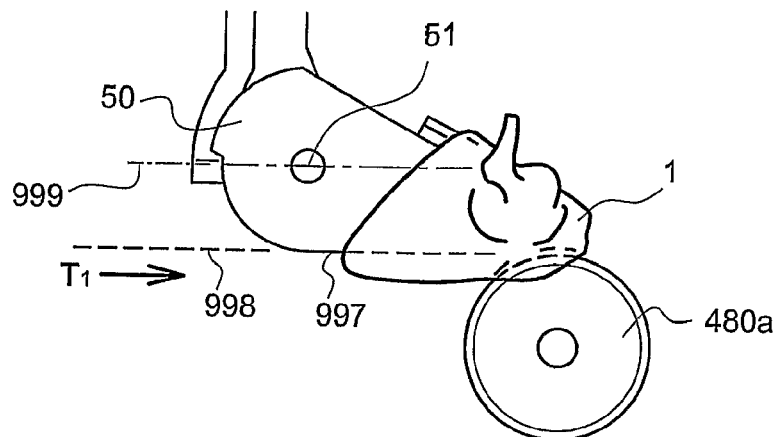
Figure 59B:
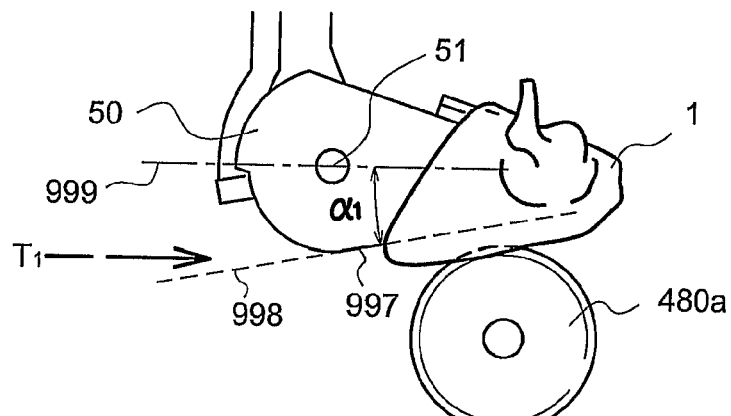
Figure 59C:
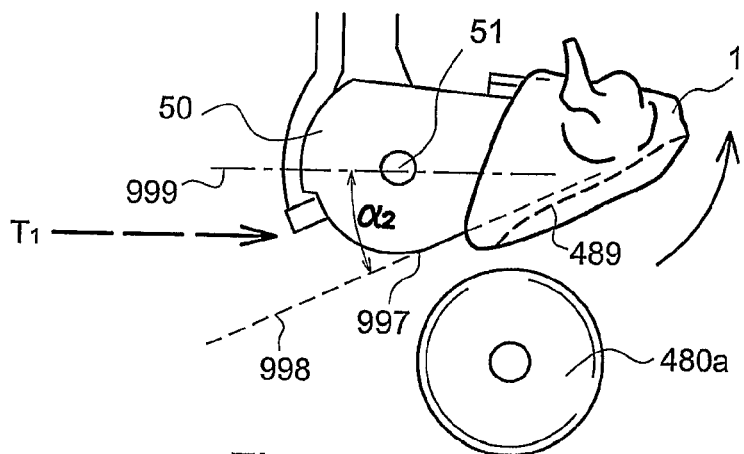
Figure 60:
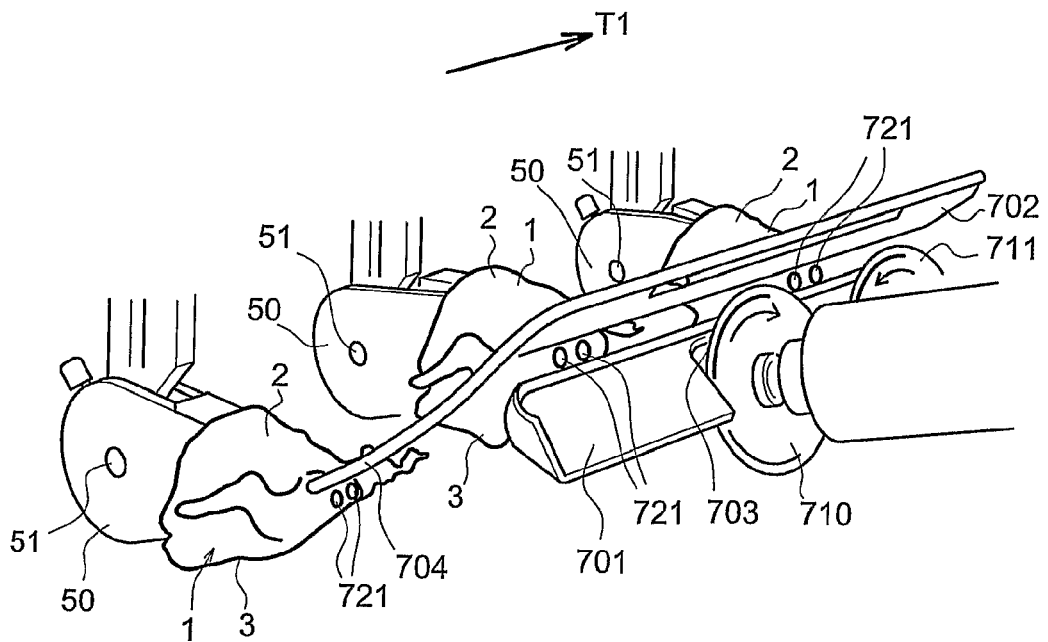
Figure 62:
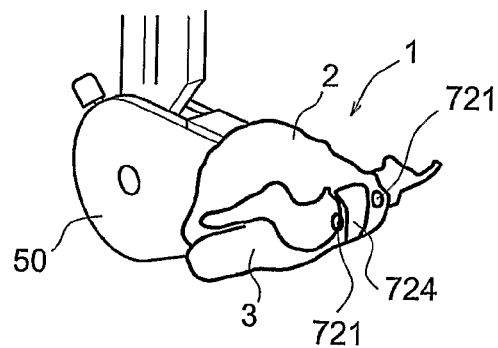
Figure 61:
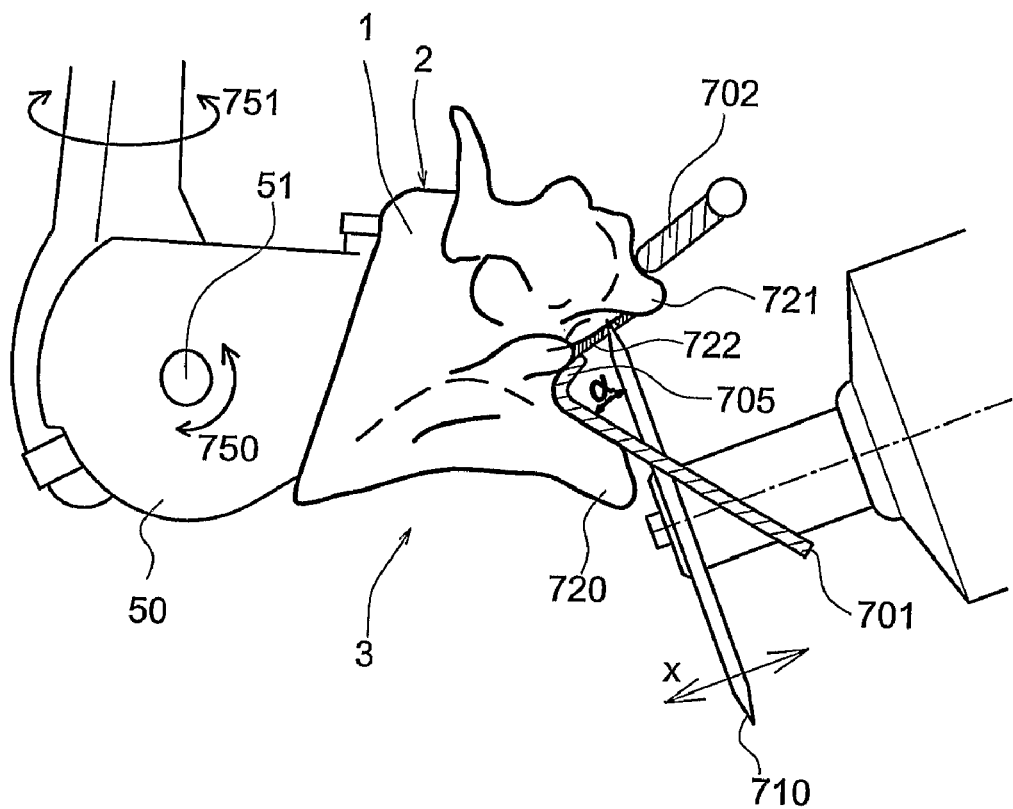
Figure 63:
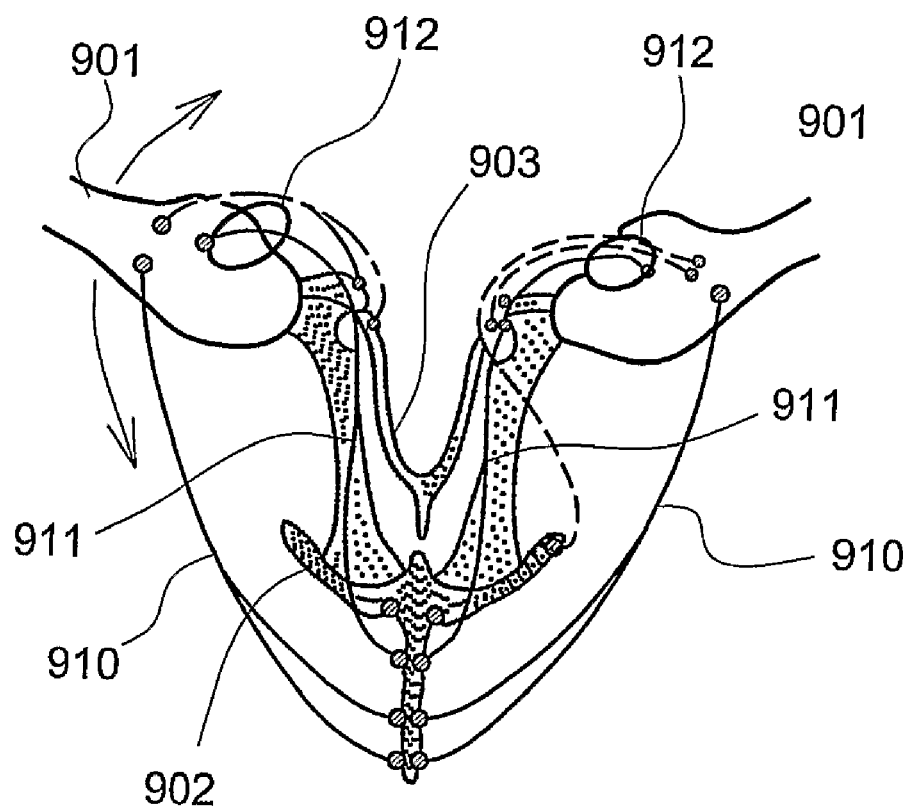
Figure 64:
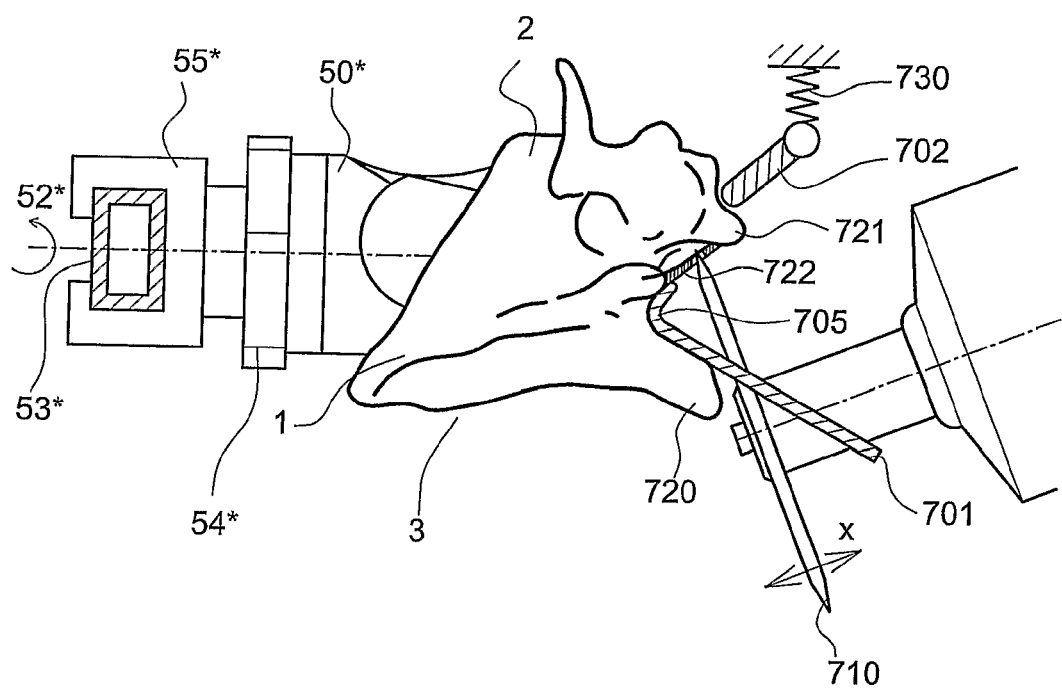

FIG. 56 an alternative embodiment of a device for carrying out the method according to the sixth aspect of the invention, FIG. 57 a part of the device according to FIG. 56 viewed from above, FIG. 58 a side view of a part of the device according to FIG. 56, FIG. 59 the relative movement of the carcass part relative to the rotating blades that are mounted in a V-shape during the performing of the method according to the sixth aspect of the invention using the device according to FIGS. 56-58, FIG. 60 an embodiment of a device according to the seventh aspect of the invention, FIG. 61 a side view of the embodiment according to FIG. 60, FIG. 62 the opening on the neck side of the carcass part after the wishbone has been removed, FIG. 63 the muscles in the area of the wing joints, FIG. 64 the device according to FIG. 61 in combination with the alternative product carrier of FIG. 1F.

FIG. 1 shows an example of a carcass part 1 with an incision 110 according to the first aspect of the invention. This carcass part 1 of slaughtered poultry comprises at least a part of the back 2. Not shown in FIG. 1, but present in the carcass part 1 in this example, are at least a part of the rib cage and a part of the spine. FIG. 1 shows that the carcass part 1 comprises at least a part of the meat that is naturally present on the back 2 and on the rib cage. The meat on the rib cage comprises at least a part of the meat on the breast 3, that is: at least a part of the breast fillet 8.

The carcass part 1 to be processed in the example in FIG. 1 is a front half. It is however also possible to process other types of carcass parts, such as breast caps for example, using the device and method according to the first aspect of the invention.

FIG. 1A and FIG. 1B show the anatomy of the torso of poultry. The hatched part in FIG. 1A shows the area in which the abdominal muscle tissue 11 lies. In some circles the muscle tissue in the hatched area in FIG. 1A is known in professional parlance as "ring muscle". The abdominal muscle tissue comprises at least the part of the m. obliquus externus abdominis, at least the part of the m. obliquus internus abdominis and at least the part of the m. transversus abdominis that fall within the hatched area of FIG. 1A. FIG. 1B shows the position of the delta bone 12.

FIG. 1A and FIG. 1B are based on figures from the book "Atlas de anatomía de las aves domesticas" [Atlas of the anatomy of domestic birds], ISBN 84-283-1138-2, published in 1981. The Latin names of the muscles shown in the figures have been included in a separate list that is appended to this application.

In the example shown in FIG. 1 the carcass part 1 also comprises both wings or least parts 4 of them. This is not, however, a requirement in order to implement the method according to the first aspect of the invention.

FIG. 1C shows a product carrier 50 with a front half that has been placed onto it. The product carrier 50 shown in FIG. 1C can pivot around axis 51 and around axis 52. A product carrier of this type is suitable for use in combination with all aspects of the invention that are described in this application. It is not, however, necessary to use a product carrier capable of this type of pivoting. In most cases the processing operations that are described in this application require a relative movement between the carcass part to be processed 1 and the parts of the device that directly engage on the carcass part 1 such as blades or scrapers for example. The desired relative movement can be achieved by having the product carrier that is holding the carcass part 1 move while having the processing components of the device remain in a mainly fixed position (naturally this is apart from any resilient moving of certain components and rotation of the rotating blades), but of course also by holding the carcass part 1 in a mainly fixed position while the processing components. Naturally, a combination of a movement of the carcass part 1 and a movement of the processing components of the device according to the various aspects is possible in order to achieve the desired relative movement between the carcass part and the device.

FIG. 1D and FIG. 1E show a breast cap being attached to the product carrier 50. The product carrier 50 in FIG. 1D and FIG. 1E is of the same type as shown in FIG. 1C. The product carrier is provided with a hook 53 that holds the breast cap securely on the product carrier 50. Naturally, a type of product carrier that does not have the pivoting capability of the product carrier shown can also be used when processing a breast cap.

FIG. 1F shows a side view of an example of an alternative product carrier 50*. In this example the product carrier 50* is based on the product carrier that is known from EP0254332. This product carrier is only rotatable according to arrow 52*. This rotation can be controlled by control elements that engage toothed wheel 54*. Product carrier 50* is moveable along path 53* in conveying direction T1. Each of the product carriers 50* is connected to a trolley 55* that can be guided across a profile 56*. The trolleys 55* are mutually connected by a (diagrammatically depicted) chain or cable 57*.

FIG. 1G shows the alternative product carrier of FIG. 1F provided with a breast cap with wings as the carcass part 1 to be processed. FIG. 1H shows the alternative product carrier of FIG. 1F provided with a breast cap without wings as the carcass part 1 to be processed. Processing of breast caps with or without wings can also take place using a product carrier 50 of the type as shown in FIGS. 1C, 1D and 1E. The other way around the product carrier 50* shown in FIGS. 1F, 1G and 1H can also be used for processing front halves with wings, front halves without wings and the like, for example.

In the method according to the first aspect of the invention an incision 110 is made through the meat that is present on the carcass part 1. This incision 110 extends substantially along the contour of the breast fillet 8 in the region between the back meat 15 and the breast fillet 8 and in the region between the abdominal muscle tissue 11 and the breast fillet 8. The depth of the incision is chosen such that the meat is cut into up to the bone parts of the carcass part (that comprises at least a part of the rib cage). As can be seen in FIG. 1, the incision runs on the side of the back along the region where the wing parts 4 are connected to the rest of the carcass part 1.

In an alternative embodiment, not shown, the incision 110 separates the breast fillet from the abdominal muscle tissue but not from the back meat. This embodiment uses the advantages of separating the abdominal muscle tissue and the back meat, while it still remains possible to harvest the back meat and the breast fillet as an integral piece of meat, using the method described in EP 1430780 for example.

FIG. 1 shows an incision 110 with a curved path. In this way the incision follows the anatomical shape of the breast fillet 8 relatively accurately. It is however also possible for the incision 110 to be straight. The shape of the breast fillet 8 is then still substantially followed.

FIG. 5 too shows a possible location for incision 110. With the location of incision 110 as shown in FIG. 5 the abdominal muscle tissue is fully separated from the breast fillet. It is however also possible for the user of the device and/or method according to the first aspect of the invention to decide to move the incision 110 slightly upwards, in the direction of arrow Y, resulting in incision 110* for instance.

FIG. 2 shows a first example of a part of a method and device according to the first aspect of the invention. In this exemplary embodiment the carcass parts 1 (for example, front halves as shown, or breast caps; front halves and breast caps with or without wings) are held by the product carriers 50 that engage on the inside of the carcass parts 1. The product carriers 50 move the carcass parts 1 along a predetermined path in a conveying direction T1. It is preferable that a number of processing devices are disposed along the path, each of which performs a process on the passing carcass parts 1.

In the exemplary embodiment shown in FIG. 2 the carcass parts 1 are cooled before they undergo the method according to the first aspect of the invention. Here it is advantageous if the carcass part 1 still also comprises wing parts 4, that the wings are stretched prior to processing in accordance with the method according to the first aspect of the invention. The advantage of this is that the position of the wing parts 4 is more or less known and they are not in the way while the processing operations according to the first and, where appropriate, the further aspects of the invention are being carried out. A wing stretcher fitted with plucking fingers, known per se, can be used to stretch the wing parts. Guides for the wings can be used as an alternative or an addition.

The part of the device according to the first aspect of the invention that is shown in FIG. 2 comprises two rotating blades 101, each of which is circular (disc-shaped) and each of which is rotatable around its centre point on an associated shaft 104. Each blade 101 is driven by an associated motor 103. The rotating blades 101 are disposed on either side of space 105, in which the device shown in FIG. 2 receives the product carriers 50 that securely hold a carcass part 1. Thus, the rotating blades 101 form the blade of the device.

FIG. 2 further shows the presence of guides 102, which preferably keep the wing parts 4 that have preferably been stretched before, outside of the reach of the rotating blades 101. In the example of FIG. 2 the carcass parts 1 are advanced through the device shown in FIG. 2 with the back 2 directed upward. Here the spine or the part of it that is present is oriented more or less horizontally, that is the direction of the spine or the part of the spine that is still present has a clear and purposely imposed deviation from the vertical. It is also possible that the carcass part 1 to be processed no longer has a spine, because the carcass part 1 to be processed is a breast cap for example. In this case the carcass part is oriented in such a way that the carcass part to be processed is oriented such that if a spine had still been present this spine would have a clear and purposely imposed deviation from the vertical.

The blades 101 cut up to the bone parts of the carcass part 1. Where product carriers 50 are used which engage on the inside of the carcass part 1, the result is that the blades 101 approach the product carriers 50 to a few millimeters. It is therefore also an advantage if the product carrier 50 is stable and displays little vibration or other uncontrolled movements. The product carrier that is known from EP1191852 in practice appears to be satisfactory. In addition, it is preferable that the position of each blade 101 is adjustable. In this way the variations in the average size of the carcass parts 1 between the various flocks to be slaughtered can be accommodated. Also, by adjusting the blades 101 the yield from the processing can be influenced and the position of the incision 110 in relation to the breast fillet can be determined. The blades can be adjusted in such a way that the incision 110 is next to the hatched area shown in FIG. 1A or runs through this area. The adjustment can be achieved by shifting the combination of the blade 101 and the associated motor 103 in relation to the path.

It is advantageous if the guides 102 are mounted resiliently. When the wing parts 4 are pushed away, downwards in the example shown in FIG. 2, the guides 102 then also push away all play in the product carrier 50 in the same direction. This means that the product carrier is more stable and there is less risk of the rotating blades 101 damaging the product carrier 50.

In an advantageous variation, not shown, each of the guides 102 is split into a first and a second part. The split between the first and the second part, as seen in the conveying direction T1, lies in upstream of the blades 101. It is preferable that the second part of each guide is then connected to the suspension on the motors 103. In this way it is easier to access the blades 101 and the associated motors 103 for maintenance work.

As shown in FIG. 2 the incision 110 can have a curved path. This can be achieved in a favourable manner in the structural design by arranging the rotating blades 101 in a pivotable way. The ability of the rotating blades to pivot relative to the product carriers 50 is shown in FIG. 2 by the arrows R2. The combination of the pivoting R2 of the rotating blades 101 and the conveyance of the carcass parts 1 by the product carriers 50 in direction T1 provides the desired curvature of the incision 110. Instead of the rotating blades 101 having a pivotable arrangement the product carriers 50 can also be pivotable like the product carrier known from EP1191852 for example. To this end, the product carriers are provided with a rotation axis 51. In this variation the rotating blades 101 can have a fixed mounting. The product carriers 50 then pivot the carcass parts 1 in direction R3 relative to the fixedly arranged rotating blades 101. It is also possible that both the rotating blades 101 and the product carrier 50 are pivotable.

It is preferable that the device as shown in FIG. 2 also comprises a device for removing the breast fillet 8 from the bone parts of the carcass part 1. This filleting device will be disposed downstream, as seen in the conveying direction T1, of the part of the device according to the invention that is shown in FIG. 2. The filleting device will then, on account of the conveying direction T1 of the product carriers 50 with the carcass parts 1, only become active after the incision 110 has been made by the rotating blades 101. The filleting device can have an operating principle that is based on scraping the breast fillet 8 loose from the bone parts of the carcass. As an alternative a filleting device as described in EP 1430780 A1 can also be used. This filleting device engages on the wing parts 4 that are present and exerts a tensile force on them. In this way the wing parts 4 are pulled off the bone parts of the carcass part, in particular from the rib cage, together with the breast fillet 8.

FIG. 3 shows a second exemplary embodiment of a part of the method and the device according to the first aspect of the invention. In this exemplary embodiment the carcass part also still comprises the leg parts 5 in addition to the parts that have already been described in relation to FIG. 2. In the example shown in FIG. 3 the product carrier 50 engages on these leg parts 5. The product carriers 50 convey the carcass parts 1 in the main conveying direction T1.

The device as shown in FIG. 3 once again comprises a space 105 for receiving the carcass parts 1. When entering the device shown in FIG. 3, the back 2 of the carcass part comes into contact with the support 107. In the example in FIG. 3 support 107 is a revolving conveyor belt. The support ensures that the spine or the part of the spine that is present in the carcass part 1 comes to lie substantially horizontally. The product carrier 50 advances the carcass part 1 to the rotating blades 101, which are disposed on either side of the space 105. The rotating blades make the incision 110. In this example too there is an incision 110 which also extends along the back meat and along the abdominal muscle tissue (as seen in the longitudinal direction of the abdominal muscle tissue) so that the breast fillet on the one hand and the back meat and abdominal muscle tissue on the other hand are separated from each other. Guides 102 ensure that the wing parts 4 that are present do not come within reach of the rotating blades 101.

FIG. 4 shows a part of the device shown in FIG. 3. In FIG. 4 the incision 110 which has been made by the rotating blades 101 can be seen.

FIGS. 3 and 4 clearly show that the carcass part 1 is now processed in a position whereby the breast is directed upwards. This is contrary to the embodiment shown in FIG. 2.

As well as the device and the method shown in FIG. 2 it is preferable for the device and method as shown in FIGS. 3 and 4 to also comprise a filleting device. This filleting device is intended to detach the breast fillet 8 from the carcass part 1, either with or without simultaneous removal of the wing parts 4. The filleting device can detach the breast fillet 8 by scraping, or by pulling on the wing parts 4, as described in relation to FIG. 2.

It is generally advantageous if the device according to the first aspect of the invention can be switched on and off for each passing carcass part 1. To this end the device is provided with a product detector 108. The product detector 108 detects whether there is a carcass part 1 on the product carrier 50 or whether the product carrier 50 is empty. Detection can take place in a number of ways, optically or mechanically for example. In the latter case for example a guide is pressed down by a passing carcass part 1, but not by an empty product carrier 50 passing by. The product detector 108 then detects whether or not the guide has been pressed down. If a carcass part 1 is detected the device according to the first aspect of the invention becomes active and the incision 110 is made. This can be done either by sending the blades 101 out to the carcass part for example or by having the product carrier 50 advance the carcass part 1 within range of the blades. If no carcass part 1 is detected, however, the blades 101 and the product carrier 50 are kept away from each other. The advantage of this is that the blades 101 cannot damage the empty product carrier 50 that is passing by.

The device and the method according to the first aspect of the invention, and therefore also the devices and the methods as shown in FIGS. 2, 3 and 4 also, can also be used for cutting a breast cap out of a front half. To this end the incision 110 is made so deep that the incision 110 also cuts through a part of the bone parts of the rib cage. This creates a breast cap, in which account is taken of the anatomy of the slaughtered poultry. The breast cap that is obtained in this way comprises no, or hardly any, meat that is not desired by the consumer.

The first aspect of the invention involves a method for processing a carcass part of slaughtered poultry, which carcass part comprises:
  bone parts with at least a part of the rib cage,
  at least a part of the breast fillet,
  other muscle tissue that does not form part of the breast fillet, for example at least a part of the back meat that is naturally present on the rib cage and the spine and/or at least a part of the abdominal muscle tissue,
this method comprising the following steps:
  making an incision through the meat at least up to the bone parts lying under the meat, which incision is made in an area between the breast fillet and the other muscle tissue that does not form part of the breast fillet, and which incision in that area substantially follows the shape of the breast fillet,
  detaching the breast fillet from the bone parts of the carcass part.

In a preferred embodiment of the method according to the first aspect of the invention, the carcass part comprises at least a part of the abdominal muscle tissue and at least a part of the back meat that is naturally present on the rib cage and the spine, and in method which the incision extends between the abdominal muscle tissue and the breast fillet and between the back meat and the breast fillet.

In a preferred embodiment of the method according to the first aspect of the invention, the incision runs on the side of the back past that location on the carcass part where the wing joint would be if a wing or a part thereof were present on the carcass part.

In a preferred embodiment of the method according to the first aspect of the invention, the incision has a curved path, and preferably:
  a product carrier supports the carcass part and
  the incision is made by a blade of a cutting device and
  the curvature of the incision is achieved by a relative movement of the product carrier and the blade.

In a preferred embodiment of the method according to the first aspect of the invention, the breast fillet is detached from the bone parts by scraping, or the carcass part further comprises at least a part of a wing and the breast fillet is detached from the bone parts of the carcass part by pulling on the wing.

In a preferred embodiment of the method according to the first aspect of the invention, the direction of the spine in the carcass part or the direction of the spine if it had been present in the carcass part is substantially oriented in the horizontal direction while the incision is being made.

In a preferred embodiment of the method according to the first aspect of the invention, a product carrier supports the carcass part and the product carrier engages on the inside of the carcass part, or
the carcass part further comprises at least a part of at least a leg and the product carrier engages on the leg part and in this way supports the carcass part.

In a preferred embodiment of the method according to the first aspect of the invention, the incision also cuts through at least a part of bone parts of the rib cage.

The first aspect of the invention also involves a device for processing a carcass part of slaughtered poultry, which carcass part comprises:
  bone parts with at least a part of the rib cage,
  at least a part of the breast fillet,
  other muscle tissue that does not form part of the breast fillet, for example at least a part of the back meat that is naturally present on the rib cage and the spine and/or at least a part of the abdominal muscle tissue,
this device comprising:
  a blade for making an incision through the meat at least up to the bone parts lying under the meat, which incision is made in an area between the breast fillet and the other muscle tissue that does not form part of the breast fillet, and which incision in that area substantially follows the shape of the breast fillet,
  an actuator for realizing a relative movement between blade and carcass part, this relative movement leading to an incision that extends substantially along the contour of the breast fillet.

In a preferred embodiment of the device according to the first aspect of the invention, the device also comprises at least one wing guide for keeping any wing parts present on the carcass part away from the blade.

In a preferred embodiment of the device according to the first aspect of the invention, the device also comprises:
  a product carrier for supporting a carcass part to be processed, this product carrier pivotable around one or more axes,
  a control element for controlling the pivoting of the product carrier relative to the blade.

In a preferred embodiment of the device according to the first aspect of the invention, the device also comprises a filleting device for detaching the breast fillet from the bone parts of the carcass.

In a preferred embodiment of the device according to the first aspect of the invention, the filleting device comprises at least a scraper member.

In a preferred embodiment of the device according to the first aspect of the invention, the carcass part to be processed comprises at least a wing part and the filleting device is adapted to engage a wing part and to detach the breast fillet from the bone parts of the carcass part by exerting a tensile force on one or more wing parts.

In a preferred embodiment of the device according to the first aspect of the invention, the blade is adapted to also cut through at least a part of the bone parts of the rib cage.

FIG. 5 shows a carcass part 1, that comprises: bone parts with at least a part of the rib cage and a part of the spine, at least a part of the back meat that is naturally present on the rib cage and the spine, and at least a part of the abdominal muscle tissue. In the example shown the carcass part 1 is a front half with wing parts 4. On the carcass part 1 there is at least a part of the breast fillet 8 and a part of the back meat 15 present. For the location of the abdominal muscle tissue 11 and that of the delta bone 12, referral is made to FIG. 1A and FIG. 1B.

FIG. 5 diagrammatically indicates the position of incision 110 and that of an incision 210 according to the second aspect of the invention. Incision 110* indicates an alternative to incision 110. If incision 110* is used then incision 210 is preferably limited by incision 110*. The location of incision 210 will be explained in more detail below. FIG. 5 shows an incision 110 that separates the breast fillet 8 from the back meat 15 and from the abdominal muscle tissue 11.

FIGS. 6 and 7 show a method and device according to the second aspect of the invention. In the example shown a carcass part 1 is held by a product carrier 50. This product carrier 50 conveys the carcass part in a conveying direction T1 relative to the device according to the second aspect of the invention.

In the example in FIGS. 6 and 7 an incision 110 according to the second aspect of the invention has already been made in the carcass part 1 according to the first aspect of the invention. This is an advantage but it is not a requirement for implementing a method. In this example incision 110 separates the breast fillet from both the back meat and from the abdominal muscle tissue. This is not however a requirement for combining the first aspect of the invention with the second aspect of the invention.

The device according to the second aspect of the invention comprises in the exemplary embodiment shown in FIGS. 6 and 7 a space 205 for receiving the carcass part 1. Two rotating blades 201 are arranged on either side of this space 205. These two rotating blades make an incision 210 in the carcass part up to the bone parts of the carcass part. This incision separates the abdominal muscle tissue 11 from the back meat 15 in such a way that the abdominal muscle tissue 11 remains attached to the delta bone 12. The device shown in FIGS. 6 and 7 further comprises guides 202 that ensure that the wing parts 4 remain out of reach of the rotating blades 201. There is also a guide 206 present in this example. This ensures that the carcass part is centred relative to the rotating blades 201.

In an alternative embodiment, not shown, the carcass part 1 to be processed is stationary and the blades 201 move along the carcass part 1 to be processed.

At least one of the guides can be provided with a product detector 208. In the example shown in FIG. 6 this is the centring guide 206. This guide 206 is resiliently mounted, for example, by means of a compression spring which ensures that the guide 206 can move in the vertical direction. When a product carrier 50 with a carcass part 1 attached passes by, the guide 206 is displaced somewhat in the vertical direction. This displacement is detected by the product detector which generates a signal that a carcass part 1 is present on the product carrier 50. However, should an empty product carrier 50 pass by, the guide 206 is not pushed away vertically. In order to prevent an empty product carrier 50 being damaged by the rotating blades 201 the product carrier and the blades 201 are, in this case, kept away from each other, by rotating the product carrier 50 away around rotation axis 51 for example so that the product carrier advances above the blades 201 instead of between them. As an alternative the product detector can also be an optical sensor that directly detects the presence of a carcass part on the carrier 50, or that detects the vertical displacement of guide 206.

As in the first aspect of the invention, the blades 201 cut up to the bone parts of the carcass part 1. Where product carriers 50 are used which engage on the inside of the carcass part 1, the result is that the blades 101 approach the product carriers 50 as close as a few millimeters. It is therefore also advantageous if the product carrier 50 is stable and displays little vibration or other uncontrolled movements. In practice the known product carrier that is described in EP1191852 appears to perform satisfactory.

Further, it is preferable that the position of each blade 201 is adjustable. In this way the variations in the average size of the carcass parts 1 between the various flocks to be slaughtered can be accommodated. Also by adjusting the blades 201 the yield of the final removal of the meat can be influenced.

It is advantageous if the guides 202 are mounted resiliently. When the wing parts 4 are pushed away, downwards in the examples shown in FIGS. 6 and 7, the guides 202 then also push away all play from the product carrier 50 in the same direction. This means that the product carrier is more stable and there is less risk of the rotating blades 201 damaging the product carrier 50.

Instead of being carried out by one or more rotating blades 201 the incising operation for separating the back meat 15 and the abdominal muscle tissue 11 can also be performed by one or more static blades.

In the example shown in FIGS. 6 and 7 the incision 210 is made in such a way that it runs substantially perpendicular to the bone parts of the carcass part. In the example the incision 210 runs in the immediate vicinity of the connection of the back meat 15 to the rib cage. Of course, the incision then lies so that the back meat 15 to be harvested is severed from this connection. In practice this means that the incision lies between the attachment of the back meat 15 to the rib cage and the location of the neck of the carcass part 1.

It is advantageous if the incision is shaped such that the incision 210 follows the contour of the abdominal muscle tissue 11 as closely as possible. In this way the greatest possible amount of desired back meat 15 can be harvested. Making a curved incision, which takes as much account as possible of the anatomy of the carcass part of the slaughtered poultry, can be achieved by a relative pivoting of the blade 201 and the carcass part 1. This can be achieved by a pivotable arrangement of the blade 201 or by using a product carrier 50 that is pivotable around pivot axis 51. A combination of both is also possible.

FIGS. 8a and 8b show possible embodiments of incisions in a carcass part of slaughtered poultry. FIG. 8a shows a combination of the first and the second aspect of the invention. In the example shown in FIG. 8 an incision 110 is first made in the transition area between the back meat 15 and the breast fillet 8 according to the first aspect of the invention. Then an incision 210 is made according to the second aspect of the invention. Making incision 110 first and then making incision 210 is the most practical sequence. It is however also conceivable for the sequence of these incisions to be reversed.

FIG. 8b shows a combined incision 215. This incision has a first part 215a in a part of the transition area between the breast fillet and the back meat 15. The second part of the incision 215b separates the abdominal muscle tissue 11 from the back meat 15. Combining these two incisions into a single incision 215 achieves the effect, on the one hand, that the abdominal muscle tissue 12 remains connected to the bone parts of the carcass part 1 and does not come along with the harvested meat and on the other hand that the back meat and the breast fillet can be harvested together as a single piece of meat as described in EP 1430780 A1.

The second aspect of the invention involves a method for processing a carcass part of slaughtered poultry, which carcass part comprises:
  bone parts with at least a part of the rib cage and a part of the spine,
  at least a part of the back meat that is naturally present on the rib cage and the spine,
  at least a part of the abdominal muscle tissue,
  this method comprising the following steps:
  making a first incision through the back meat near the abdominal muscle tissue at least up to the underlying bone parts of the carcass part,
  detaching the back meat from the bone parts of the carcass part.

In a preferred embodiment of the method according to the second aspect of the invention, the carcass part also comprises at least a part of the breast fillet. In this embodiment, the method also comprises a step of making a second incision through the meat at least up to the bone parts lying under the meat, which second incision is made in an area between the breast fillet and the other muscle tissue that does not form part of the breast fillet, and which second incision in that area substantially follows the shape of the breast fillet.

In a preferred embodiment of the method according to the second aspect of the invention, the carcass part also comprises at least a part of the breast fillet. In this embodiment, the method also comprises the step of making a second incision through the meat at least up to the bone parts lying under the meat, which second incision is made in an area between the breast fillet and the back meat, and which second incision in that area substantially follows the shape of the breast fillet.

In a preferred embodiment of the method according to the second aspect of the invention, the carcass part also comprises at least a part of the breast fillet. In this embodiment, the method also comprises the step of making a second incision through the meat at least up to the bone parts lying under the meat, which second incision is made in an area between the breast fillet and the abdominal muscle tissue, and which second incision in that area substantially follows the shape of the breast fillet.

In a preferred embodiment of the method according to the second aspect of the invention, at least the first incision runs substantially perpendicular to the underlying bone parts of the carcass part.

In a preferred embodiment of the method according to the second aspect of the invention, the first incision runs closely above the connection of the back meat to the underside of the rib cage.

In a preferred embodiment of the method according to the second aspect of the invention, the incision in the transition area between the back meat and the breast fillet substantially follows the contour of at least the part of the abdominal muscle tissue that connects the back meat with the bone parts on the back of the carcass.

In a preferred embodiment of the method according to the second aspect of the invention, the incision along the back meat and the incision in the transition area between the breast fillet and the abdominal muscle tissue are integrated into a single, continuous incision.

The second aspect of the invention also involves a device for processing a carcass part of slaughtered poultry, which carcass part comprises:
bone parts with at least a part of the rib cage and a part of the spine,
at least a part of the back meat that is naturally present on the rib cage and the spine,
at least a part of the abdominal muscle tissue,
this device comprising:
a cutting device with a blade for making a first incision through the back meat next to the abdominal muscle tissue at least up to the underlying bone parts of the carcass part.

In a preferred embodiment of the device according to the second aspect of the invention, the blade is a rotating blade or a static blade.

In a preferred embodiment of the device according to the second aspect of the invention, the blade is also adapted to make a second incision through the meat at least up to the bone parts lying under the meat, which second incision is made in an area between the breast fillet and the back meat, and which second incision in that area substantially follows the shape of the breast fillet.

In a preferred embodiment of the device according to the second aspect of the invention, the device further comprises a second blade, which second blade is adapted to make a second incision through the meat at least up to the bone parts lying under the meat, which second incision is made in an area between the breast fillet and the back meat, and which second incision in that area substantially follows the shape of the breast fillet.

FIG. 54 and FIG. 55 show a part of a device according to the third aspect of the invention.

FIG. 54 shows a tucking-up means 800. This tucking-up means 800 has a toothing 801. In the side view the teeth 802 of the toothing 801 are not arranged in a straight line but around an arc.

Air ducts 810 have been accommodated into the tucking-up means 800. Each of these air ducts 810 has an inlet 811 and an outlet 812. The inlets 811 are all connected to a common air supply 815. B4 the air supply, air can be supplied to the air ducts 810 at a higher pressure than the ambient pressure. This air exits the air ducts via the outlets 812 that have been introduced into the teeth 802 of the toothing 801 (see arrows L in FIG. 54).

The airflows L blow off any contamination that has been left behind on the toothing 801 such as skin and/or fat.

The tucking-up means 800 is pivotable around pivot axis 820. If a carcass part is guided over the tucking-up means 800 in conveying direction T, the tucking-up means 800 is pressed downwards by the resistance caused by the tucking-up means in combination with the position of the toothing 801 (which engages the passing carcass part) relative to the pivot axis 820.

Counterweight 821 is suspended from arm 822 and exerts a moment on the pivot axis which, as regards its direction, is opposite to the moment that is exerted on the pivot axis when a carcass part is being engaged by the toothing 801. After the carcass part has passed, the moment that is exerted by the counterweight 821 on arm 822 takes the tucking-up means back to its starting position.

As an alternative for the construction using the counterweight 821 a spring could also be used to return the tucking-up means to its starting position. This can be achieved, for example, by placing the tucking-up means on a compression spring. A carcass part that is to be processed then presses the tucking-up means down against the compression force while it is passing (and therefore while the skin is being tucked up). Once the carcass part has passed, the compression force of the compression spring ensures the tucking-up means once again moves up to its starting position.

The arrangement of the teeth 802 along an arc has the advantage that the teeth continue to be in good engagements with the skin while the tucking-up means 800 pivots when the carcass part 1 passes the tucking-up means.

If the skin does not have to be tucked up on a specific carcass part 1 then that carcass part is guided past the tucking-up means without the tucking-up means coming into contact with the carcass part. This can be achieved by having the product carrier with the carcass part 1 concerned turn away from the tucking-up means, by moving the tucking-up means away from the path of the product carriers or by a combination of both.

In order for the tucking-up means to achieve a good engagement on the carcass part, a product carrier 50 can be used which presses the carcass part 1 against the tucking-up means, for example by pivoting around axis 51. As an alternative the tucking-up means can also be moved towards the carcass part 1. A combination of these possibilities can, of course, also be used.

FIG. 55 shows an overview of a part of the device according to the third aspect of the invention.

FIG. 55 shows a skinning means 840 which itself is already known, which comprises two pairs of conjointly operating skinning rollers 841. Each of the skinning rollers 841 has a helical profile 842. The example in FIG. 55 shows the skinning rollers 841 arranged with their longitudinal axis in the conveying direction. As an alternative it is also possible for the skinning rollers to be arranged with their longitudinal axis substantially perpendicular to the conveying direction T. It is preferable that that the skinning rollers are mounted mainly horizontally, but vertical mounting is also possible.

The embodiment of FIG. 55 further comprises a valve 825 in the air supply 815. Air supply 815 can be connected to, or disconnected from, a source 827 of air that is under an increased pressure, an air bottle or compressed air supply for example, by means of valve 825. The valve 825 opens the air supply 815 from the source 827 when the tucking-up means 800 is in its starting position, that is: when the tucking-up means 800 is not being pressed down by a passing carcass part. In this way contamination is blown off the teeth in between the passing of two successive carcass parts.

The embodiment of FIG. 55 further comprises a sensor 823 that detects the position of the tucking-up means 800. The sensor 823 can be an optical sensor for example, an ultrasound detector or a mechanical sensor with a feeler.

When the tucking-up means rises after the carcass part has passed, this is detected by sensor 823. Sensor 823 then transmits a signal to control unit 830 which, in its turn, transmits a signal to the valve 825 whereupon the valve 825 is opened and an airflow is directed to the outlets 812 of the air ducts 810. Because no carcass part is present above the tucking-up means at that time the contamination can simply be blown away.

When the tucking-up means 800 is subsequently pressed down by a passing carcass part this is detected by sensor 823. As a result of this the sensor 823 transmits a signal to control unit 830. Thereupon, control unit 830 transmits a signal to the valve 825 to close it. Valve 825 closes and no air flows from the air supply 815 to the outlets 812 of the air ducts 810.

After carcass part 1 has passed by, the tucking-up means rises up again. This restarts an airflow to the outlets 812 of the air ducts 810 as described above.

In a variation the control unit 830 builds in a time delay between the receipt of a signal from sensor 823 and transmitting a signal to valve 825.

In an alternative embodiment the valve 825 is actuated mechanically, by the product carriers for example which actuate the valve while passing the device according to the third aspect of the invention. In an advantageous embodiment the product carriers are fitted with a rotation mechanism that allows rotation around the vertical axis. Such a rotation mechanism can be provided with a Maltese cross or set of discs. The valve 825 can then be directly actuated mechanically by the passing rotation mechanisms of the product carriers. It is also possible for the passing of the rotation mechanisms and/or product carriers to be detected by one or more sensors, which then actuate valve 825 via a control unit.

In a further alternative embodiment the air supply is controlled based on the timing of the passage of the product carriers. In the slaughterhouse control system the speed of the overhead runway conveyor can be used to control the airflow to the outlets 812 of the air ducts 810.

Not supplying air continuously to the outlets 812 of the air ducts limits the energy used by the device.

A variation of the device according to the third aspect of the invention can be further provided with a system that creates an underpressure in the air ducts 810 when a carcass part 1 presses the tucking-up means down. The underpressure in the air ducts makes it possible for the tucking-up means to take a more powerful grip on the skin as a result of which tucking-up can be done more effectively. The underpressure can be achieved in a manner known to the skilled person, using a pump for example.

Such a variation can be provided with a three-way valve. Actuation of this valve can for example occur in one of the manners described above.

In this variation an underpressure is created in the air ducts 810 when a carcass part is guided over the tucking-up means. In this step the three-way valve is in its first position. Between the passage of two successive carcass parts an airflow is created to the outlets 812 of the air ducts to blow contamination off the teeth. In this step the three-way valve is in its second position. When the three-way valve is in the third position the air ducts are closed.

FIG. 55A shows an example of a device according to the third aspect of the invention in combination with the alternative product carrier shown in FIG. 1F. In the example shown in FIG. 55A the carcass part 1 to be processed is a breast cap without wings. A device according to FIG. 55A, 55B or 55C can, however, also be used for processing for example breast caps with wings, front halves without wings or front halves with wings.

In the device according to FIG. 55A the carcass parts 1 to be processed, in this example breast caps without wings, are held securely by product carriers 50*. Each of the product carriers 50* has a rotatable connection to a trolley 55* that can move in conveying direction T1 over profile 56*. The trolleys 55* are connected to each other by a chain or cable 57*.

The product carriers 50* are rotatable relative to the associated trolley as indicated by arrow 52*. This rotation is controlled by control elements, which are disposed along the path that the product carriers follow, that engage on toothed wheel 54* of the product carrier 50*. It is preferable that the control elements can be switched on and off so that a decision can be made for each passing product carrier individually whether or not it should be rotated.

When the product carriers 50* convey the carcass parts 1 to be processed past the device according to FIG. 55A the carcass parts 1 first encounter the tucking-up means 840. This tucking-up means is of the type as previously described in conjunction with FIGS. 54 and 55.

The tucking-up means 800 is pivotable also here around pivot axis 820. The tucking-up means 800 is therefore also provided with air ducts (not shown) that discharge into the teeth of the tucking-up means. Air under increased pressure can be conducted to the teeth of the tucking-up means 800 from the air supply 815 (implemented as a flexible air hose for example), or an underpressure can be created as described above to tuck up the skin more effectively.

As the product carrier 50* of the type according to FIG. 1F is pivotable around fewer axes than the product carrier 50 of the type according to FIG. 1C it is advantageous if, in this embodiment of the device according to the third aspect of the invention, the device itself is moveable in one or more directions relative to the passing product carriers 50*.

In the example of FIG. 55A it is, for example, favourable if the tucking-up means is moveable according to by arrows 860, 861 and/or 865. This moveability can be realized by a possibility to adjust the position of the tucking-up means 800 in relation to the product carrier at a time when no carcass parts 1 need to be processed. In this way account can be taken, for example, of the anticipated size of the next flock that is to be processed, or of the shape of the carcass parts to be processed when switching from breast caps to front halves for example, or vice versa.

It is however preferable that the device is designed in such a manner that movement of the tucking-up means 800 can also take place during processing of the carcass parts 1, by actuation using a pneumatic or hydraulic cylinder for example, or by one or more servomotors (not shown). The advantage of this is that the combination of the movements of product carrier 50* (bearing carcass part 1) and of the tucking-up means 800 can achieve an optimum relative movement between the carcass part 1 and the tucking-up means 800 without having to use the relatively complex product carrier 50 of the type shown in FIG. 1C.

After having passed the tucking-up means 800 the carcass part 1 to be processed arrives at the skinning means. In the example shown in FIG. 55A the skinning means 840 comprises four skinning rollers 841 of a type that is known per se. The skinning rollers are all provided with a helical profile 842 and in operation rotate in pairs in opposite directions. The collective movement of the skinning rollers in the direction of arrow 862 presses the skinning rollers 841 against the carcass part 1 to be processed. As a result, the profiles 842 engage the tucked up skin and the combination of the rotation of the skinning rollers 841 and the movement of the product carrier 50* relative to the skinning rollers 841 in the conveying direction T1 detaches the skin 75 (in this example: the breast skin) in one or more pieces from the carcass part to be processed. De-rinding rollers can also be used as an alternative to the skinning rollers 841 shown.

In the example of FIG. 55A the skinning rollers are mounted with their longitudinal axis substantially in the conveying direction T1. As an alternative the rollers can also be mounted horizontally or vertically substantially perpendicular to the conveying direction T1.

There is also a conceivable variation in which the rollers are arranged substantially horizontally, but then at an angle to conveying direction T1, and then preferably such that the spacing of the skinning rollers relative to the path of the carcass parts 1 to be processed is greater at the upstream end of the skinning rollers 841 than the downstream end of the skinning rollers 841. This promotes the correct entry of the carcass parts to be processed into the skinning means 840. In a simple embodiment of the device according to FIG. 55A such an arrangement of the skinning rollers 841 can render movement of the skinning rollers 841 in direction 862 partly or entirely redundant.

In order to optimize the relative movement between the carcass part 1 to be processed and the skinning rollers 841 the skinning rollers can also be made to move in the direction of one or more of arrows 863, 864, or the skinning rollers 841 can be adjustable in one or more of these directions.

In the example of FIG. 55A a sensor 823* is used for the control of and the timing for opening and closing the air supply, and, where appropriate, the underpressure in the air ducts of the tucking-up means. As opposed to sensor 823 of the example of FIG. 55 that detects the position of the tucking-up means 800, sensor 823* detects the passage of the trolley 55* with the product carrier 50* for the control and for the timing of the opening and closing of the air supply and, if necessary, for applying the underpressure in the air ducts of the tucking-up means.

FIG. 55B shows a variation of the device according to FIG. 55A. Corresponding reference numbers indicate corresponding parts. In the variation shown in FIG. 55B a control element 60* has been arranged between the tucking-up means 800 and the skinning means 840. This control element 60* engages toothed wheel 54* of the product carrier 50* when the product carrier 50* passes the control element 60* in order to effect a rotation according to arrow 52*. This engagement ensures that the product carrier 50* rotates so that the carcass part 1 for example rotated over 45 or 90 degrees is guided past the skinning means 840. The position of the carcass part 1 relative to the skinning rollers 841 can be optimized by using one or more control elements 60*.

FIG. 55C shows a further variation of the device shown in FIGS. 55A and 55B. In this variation a pair of skinning rollers 841 is applied, each having a helical profile 842. In this example the skinning rollers 841 are mounted at a slight angle to the vertical. A fully vertical arrangement is however also possible. Here too the skinning rollers 841 can be moved collectively, preferably at least according to arrow 866 and preferably also during operation.

It will be evident to the skilled person that combinations of those shown in FIGS. 55, 55A, 55B and 55C are also possible.

The third aspect of the invention involves a device for processing a carcass part, which carcass part comprises at least meat with skin attached,
this device comprising:
a skinning means for detaching the skin from the meat of the carcass part,
a tucking-up means to tuck up the skin before the skinning means detaches the skin from the meat of the carcass part, which tucking-up means is provided with teeth for engaging the skin of the carcass part to be processed, characterized in that, the tucking-up means is provided with an air duct with an inlet and an outlet, where an air supply can be connected to the inlet of the air duct, and where the outlet of the air duct is located in or in the immediate vicinity of the teeth, in such a way that an airflow through the air duct can blow away any contamination that may be present on the teeth.

In a preferred embodiment of the device according to the third aspect of the invention, the tucking-up means comprises several air ducts, such that an air duct outlet is present in each tooth.

In a preferred embodiment of the device according to the third aspect of the invention, the tucking-up means is provided with a pivot axis to allow pivoting of the tucking-up means under the influence of forces that are exerted on the tucking-up means while the skin is being tucked up. In this embodiment, preferably the device comprises a valve to open and close the supply of air to the outlet of one or more air ducts, which valve is actuated by the pivoting of the tucking-up means.

FIG. 29 shows an overview of a device according to the fourth aspect of the invention. This device comprises the guide 602, which in the exemplary embodiment shown comprises two parallel plates 602a,b. The plates 602a,b are substantially elongated, and extend in the conveying direction T1 of the carcass part 1. The plates 602a,b are positioned at some distance from each other, by which the space 604 is created between the two plates. It is also possible to have a connection 604* between the plates 602a,b so that the plates 602a,b and the connection 604* form a trough. Then there is only a space 604 between the plates 602a,b at the blades 601.

The guide 602 rests on support 620 and, together with this support 620, can move vertically as shown by arrow T3. Support 620 is connected to a lever 622 by a hinge 621. Lever 622 has a pivot point 623. A counterweight 624 is attached to the lever 622. The counterweight 624 is arranged on the side of the pivot point 623 opposite to hinge 621. As a result of this design the guide 602 can spring vertically. A spring can be used as an alternative to the lever design with counterweight. The advantage of the lever design with counterweight is however that it is more robust.

The guide 602 can be adjusted such that it is displaced in a vertical direction when a product carrier 50 with carcass part 1 passes by, but not if an empty product carrier passes. The vertical displacement of guide 602 can then be registered by a product detector 625 which can be designed as an optical sensor or a proximity switch for example. If an empty product carrier 50 passes by then the product detector is not actuated and scraper 605 does not become active. Also, the product carrier 50 can be turned away from the rotating blades 601 and the scraper 605. In this way damage to an empty product carrier 50 is prevented.

The device according to the exemplary embodiment of FIG. 29 comprises two rotating blades 601. Each of the rotating blades 601 is disc-shaped and is rotatable around an associated shaft 603. The rotating blades 601 extend into the space 604 between the parallel plates 602a,b such that each can make an incision into a passing carcass part 1. In an alternative embodiment static blades can be used instead of rotating blades.

The scraper 605 is positioned directly adjacent to and behind the blades 601. In this example the shape of the rear edge of the plates 602a,b has been adapted to the shape of the scraper 605.

The scraper 605 comprises two scraper members 606a,b which in respect on their shape are mirror images of each other. The scraper members, like the plates 602a,b, are positioned at some distance from each other. The scraper members 606a,b are resilient around an axis that coincides with the rotation shaft 603 of the rotating blades 601. In order to achieve this each of the scraper members 606a,b is connected to the rotation shaft 603 by a coupling plate 611. The coupling plate 611 is rotatable relative to the rotation shaft 603.

The scraper members 606a,b can move inwards and outwards transverse to the conveying direction T1. The advantage of this is that in this way they are even better able to follow the shape of the bone parts of the carcass part. In this way the scraper members 606a,b can be moved outwards, for example, to allow the relatively broad part of the carcass part near the wing joints to pass without damaging the wing joints. In the example shown of FIG. 29 the inwards and outwards movement of the scraper members 606a,b is achieved by the control mechanisms 610a,b, each of which is connected to one of the scraper members 606a,b. Each control mechanism 610 is actuated by a pneumatic cylinder 612a,b.

It is preferable that control of the cylinders 612a,b and therewith of the control mechanisms 610a,b is linked to the signal from the product detector 625. In this way it is possible to assign the scraper members 606a,b an active and an inactive position. In the active position the scraper members 606a,b process a passing carcass part 1, but if the scraper members 606a,b are in their inactive position they will not process any passing carcass part. In practice the scraper members 606a,b in their inactive position will stand further to the outside than in their active position. With a coupling of the control of the control mechanisms 610a,b to the product detector 625, the scraper members can be for example sent to their active position only when a carcass part 1 actually arrives. Additionally, or as an alternative, the scraper members 606a,b can be sent to their inactive position if an empty product carrier 50 is approaching.

The control mechanism 610a,b in the examples shown uses one or more levers. It will be evident to the skilled person that other embodiments of the control mechanism are also possible.

FIG. 30 shows the device shown in FIG. 29 during performance of a first phase of the method according to the fourth aspect of the invention. The control mechanisms 610a,b are only shown in part.

A product carrier 50 carries a carcass part 1 and conveys this carcass part in conveying direction T1 relative to the device. In the example shown the incision 110 has been made in the carcass part according to the first aspect of the invention. This is advantageous, but not a necessary for using the fourth aspect of the invention. If necessary the incision 210 according to the second aspect of the invention can already have been made also.

In the stage of FIG. 30 the carcass part 1 is being guided and positioned relative to the device through the guide 602, particularly relative to the rotating blades 601 and the scraper members 606a,b. To this end the plates 602a,b in this example are positioned at an angle to the horizontal plane (see FIG. 31). This in fact creates a trough, which effectively positions the carcass part.

The product carrier 50 conveys the carcass part 1 further in conveying direction T1 relative to the device according to the fourth aspect of the invention. When the carcass part has been positioned by the guide 602, the rotating blades 601 come into contact with carcass part 1. The rotating blades 601 each make an incision in the carcass part 1, on either side of the spine. It is preferable that this incision cuts up to the bone parts of the carcass part.

FIGS. 31A and B show the situation of FIG. 30 in cross section. Here, FIG. 31B is a partial enlargement of FIG. 31A. In FIG. 31 it can be seen that the blades 601 make an incision in the carcass part on either side of the spine.

FIG. 32 shows the device of FIG. 29 during performance of a second phase of the method according to the fourth aspect of the invention. The control mechanisms 610a,b are only shown in part.

The incisions along the spine have been made, and scraping has started. The scraper members 606a,b have such a shape, and are aligned relative to the blades 601 in such a manner that the scraper members 606a,b protrude into the incisions that have been made by the blades 601. So they start their scraping action from these incisions.

The scraper members 606a,b are each provided with a sharp leading edge 607. This cutting edge detaches the back meat in the first instance by cutting through the connective membrane between the back meat 15 and the bone parts of the carcass part.

In FIG. 32 it can be clearly seen that each of the scraper members 606a,b includes a recess 608. These recesses 608 ensure that the wing joints of the carcass part 1 to be processed, which protrude a little in relation to the other bone parts of the carcass part 1, are able to pass the scraper members undamaged. This is shown in cross section in FIG. 34.

Further, the raised lip 609 can be clearly seen in FIG. 32. This lip is particularly suited for scraping loose the connection between the back meat and the scapula.

FIG. 33 shows the device of FIG. 29 during performance of a third phase of the method according to the fourth aspect of the invention. The control mechanisms 610a,b are only shown in part.

The carcass part 1 is advanced further relative to the device. The scraper members 606a,b thereby progressively scrape more back meat loose. In the embodiment shown, however, the meat in the area that is indicated by "A" in FIG. 33 remains connected to the bone parts of the carcass part. In practice area A will be larger and will extend further in the direction of the sternum if the incision 210 has not been made prior to the performing of the method according to the fourth aspect of the invention.

By not detaching the back meat entirely from the bone parts of the carcass part 1, processing according to the fourth aspect of the invention is a good preparation for processing according to the fifth aspect of the invention.

If the incisions 110 and 210 have been made in the carcass part 1, the part of the back meat 15 that is to be detached by the scraper members 606a,b is clearly defined. The area of the carcass part 1 within which the back meat 15 is to be detached is limited by the incisions 110 and 210. In order to prevent the scraper members 606a,b trying to detach meat from the bone parts of the carcass part beyond the incision 210 the scraper members 606a,b are moved away from the carcass part 1 as soon as they reach the incision 210. In the example of FIGS. 29-33 this is achieved using the control mechanism 610. They can also be moved to the outside earlier so that meat remains attached over a greater area, such as the area that is indicated by "B" for example. This is particularly advantageous if the method according to the fourth aspect of the invention is used in preparation for the method according to the fifth aspect of the invention.

It is also, for that matter, possible to apply the method and the device according to the fourth aspect of the invention if the incisions 110 and/or 210 have not been made. In practice, for those cases where the method according to the fourth aspect of the invention is used in preparation for the method according to the fifth aspect of the invention, it has proved favourable to make incision 110 prior to the method according to the fourth aspect of the invention and incision 210 thereafter.

The method and device according to the fourth aspect of the invention could also be applied such that the back meat 15 is separated from the bone parts of the carcass part 1 in its entirety.

FIG. 34 shows the situation shown of FIG. 33 in cross section. The control mechanisms 610a,b are shown only in part. In FIG. 34 it can be clearly seen that the recesses 608 on the scraper members 606a,b make it possible for the wing joints 31 to pass the scraper members 606a,b without being damaged. It can also be seen from FIG. 34 that the back meat remains partly connected to the bone parts of the carcass part 1.

FIGS. 35 and 36 show a scraper member according to a preferred embodiment of the fourth aspect of the invention. In these figures the rising cutting edge 607 with its curved shape, the recess 608 and the raised lip 609 can be clearly seen. The curved shape of the hollow 615 is adjusted to the shape of the blade 601, as indicated in FIG. 36.

It will be evident to the skilled person that where there is mention above of a movement of the carcass part to be processed relative to the processing components of the device that are engaging the carcass part while processing is being carried out, this relative movement can be achieved by having the carcass part move relative to the processing components of the device, by having the processing components of the device move relative to the carcass part, or by a combination of both.

The fourth aspect of the invention involves a method for processing a carcass part of slaughtered poultry, which carcass part comprises:
    bone parts with at least a part of the back of the rib cage and the spine,
    at least a part of the back meat that is naturally present on the back of the rib cage and the spine, this method comprising the following steps:
    making two incisions on the back side of the carcass part, which incisions extend on either side of the spine and which incisions separate the back meat from the spine on either side of the spine,
    detaching at least a part of the back meat that is naturally present on the carcass part using a scraper, which scraper has a cutting edge with a curved shape in a plane that substantially extends perpendicular to the direction of the spine, which curved shape substantially matches the side of the back of the contour of the bone parts of the carcass part from which the back meat must be detached, as seen in the direction of the spine, which cutting edge is sharp so that the connection between the back meat and the bone parts of the carcass part is cut through, in which detachment of the back meat by the scraper starts from the incisions along the spine, and in which the carcass part and the scraper move relative to each other while the meat is being detached.

In a preferred embodiment of the method according to the fourth aspect of the invention, the back of the carcass part is directed downwardly during processing.

In a preferred embodiment of the method according to the fourth aspect of the invention, the carcass part is supported by the scraper while the scraper is detaching the back meat.

The fourth aspect of the invention also involves a device for processing a carcass part of slaughtered poultry, which carcass part comprises:
    at least a part of the back,
    at least a part of the meat that is naturally present on the back,
this device comprising:
    a guide for guiding and positioning the carcass part to be processed in relation to the device,
    at least one blade for making two incisions on the back side of the carcass part, which incisions extend on each side of the spine and which incisions separate the back meat from the spine on either side of the spine,
    a scraper for detaching at least a part of the back meat that is present on the carcass part, which scraper has a cutting edge with a curved shape in a plane that extends substantially perpendicular to the direction in which the spine extends, which curved shape matches substantially the side of the back of the contour of the bone parts of the carcass part from which the back meat must be detached, as seen in the direction of the spine, which cutting edge is sharp and directly adjacent to the blade in such a way that the detaching of the back meat by the scraper starts from the incision along the spine.

In a preferred embodiment of the device according to the fourth aspect of the invention, the guide comprises two parallel plates that are positioned at some distance from each other. Preferably, the parallel plates are elongated and extend substantially in the direction which is during operation the direction of the relative movement between the carcass part and the scraper.

In a preferred embodiment of the device according to the fourth aspect of the invention, the blade comprises two rotating blades mounted parallel to each other.

In a preferred embodiment of the device according to the fourth aspect of the invention, the cutting edge of the scraper rises in the upstream direction of the relative movement of the carcass part in relation to the scraper. Preferably, the cutting edge has a curved shape, as seen in the direction transverse to the direction of the relative movement of the carcass part in relation to the scraper.

In a preferred embodiment of the device according to the fourth aspect of the invention, the scraper is resiliently mounted.

In a preferred embodiment of the device according to the fourth aspect of the invention, the blade comprises two rotating blades mounted parallel to each other, the scraper is resiliently mounted and the scraper is resilient such that the resilient movement takes place around a rotation axis that coincides with the rotation axis of the rotating blades. In a preferred embodiment of the device according to the fourth aspect of the invention, the scraper comprises two scraper members, each of which is adapted to detach at least a part of the back meat from the bone parts of the carcass part on one side of the spine, which scraper members are formed as mirror images of each other. Preferably, the scraper members are positioned at some distance from each other.

The fourth aspect of the invention also involves a scraper member, suitable for use in this preferred embodiment of a device according to the fourth aspect of the invention, which scraper member is adapted to detach at least a part of the back meat from the bone parts on one side of the spine on the carcass part, which scraper member has a cutting edge with a curved shape in a plane that extends substantially perpendicular to the direction of the spine, which curved shape matches substantially the side of the back of the contour of the bone parts of the carcass part from which the back meat must be detached, as seen in the direction of the spine, which cutting edge is sharp.

In a preferred embodiment of the device according to the fourth aspect of the invention, the scraper has at least one raised lip to scrape loose the connection between the back meat and the scapula.

In a preferred embodiment of the device according to the fourth aspect of the invention, the scraper has a recess to allow passage of the wing joint.

The fourth aspect of the invention also involves a scraper, suitable for use in a device according to the fourth aspect of the invention, the scraper having a cutting edge with a curved shape in a plane that extends substantially perpendicular to the direction in which the spine extends, which curved shape matches substantially the side of the back of the contour of the bone parts of the carcass part from which the back meat must be detached, as seen in the direction of the spine, which cutting edge is sharp.

The fourth aspect of the invention also involves a scraper member as shown in FIGS. 35 and/or 36.

FIG. 9 up to and including 14 relate to the fifth aspect of the invention, harvesting the back meat 15.

FIGS. 9 and 10 show a part of a first embodiment of the method and device according to the fifth aspect of the invention. Here a carrier 50 holds the carcass part 1. The product carrier 50 engages on the inside of the carcass part. The carcass part comprises at least a part of the back and at least a part of the meat that is naturally present on the back. In this example the carcass part also comprises at least a part of the breast fillet and at least a part of the wings 4.

FIGS. 9, 10 and 11 show various stages of the method according to the fifth aspect of the invention.

The incisions 110 according to the first aspect of the invention and the incision 210 according to the second aspect of the invention have been made in the carcass part. Instead of the incisions 110 and 210 a combined incision 215 as shown in FIG. 8b may also have been made for example. For the invention it is not a requirement that one or more of the incisions 110, 210, 215 are made. It is however advantageous if this is the case.

As the first step in the method according to the fifth aspect of the invention the back meat 15 is partly detached from the bone parts of the carcass part 1. This can be achieved, for example, by the device and/or the method according to the fourth aspect of the invention.

When the product carrier 50 has advanced the carcass part 1 up to the part of the device that is shown in FIG. 9, the product carrier 50 holds the carcass part in such a position that the detached parts of the back meat 15 hang free of the bone parts of the carcass part 1 (see FIG. 9). In the example the carcass part 1 enters the device with the back directed downwardly, so that the detached parts of the back meat 15 hang down.

In the example shown in FIGS. 9, 10 and 11 the back meat 15 is still connected to the bone parts of the carcass part 1 near the incision 210, while on the neck side of the carcass part 1 (that is: the side of the carcass part where the neck was attached) it has already been detached from the bone parts of the carcass part.

The product carrier 50 conveys the carcass part further in the main direction T1. As soon as the free-hanging parts of the previously detached part of the back meat 15 are within range of the rollers 321, 322, 323 and 324 a profile 325 that has been applied to the rollers 321-324 engages the free-hanging part of the back meat 15. It is preferable that the product carrier moves the carcass part 1 upwards and downwards somewhat. This ensures that the loose-hanging back meat is engaged by the rollers in a reliable manner.

The rollers 321-324 are positioned relatively to each other in such a manner that there is space between the profiles 325 of the various rollers. This space prevents the back meat 15 being crushed between the profiles of adjacent rollers. Because of the distance between the rollers the structure of the back meat 15 removed remains intact.

As soon as the profile has engaged the free-hanging parts of the back meat 15, the rollers peel the back meat 15 off the bone parts of the carcass part (see FIG. 10). The rollers exert a peeling force on the back meat, so that the back meat is detached from the bone parts of the carcass part in a gradual manner. This peeling force is created on account of the loose-hanging part of the back meat 15 being forced in a direction opposite to the conveying direction.

Here, it is advantageous if the product carrier 50 continues to convey the carcass part 1 in the conveying direction T1. In this process it is even more advantageous if the profile 325 of the rollers 321-324 has such a hand that it forces the detached part of the back meat 15 in a direction T2 which is opposite to T1. It is, of course, obvious that the rollers have to rotate around their longitudinal axis to ensure correct operation of the device. This is shown in FIG. 10.

FIG. 11 shows the stage in which the back meat 15 has been removed by the rollers 321-324.

Four rollers are applied in the exemplary embodiment of FIGS. 9, 10 and 11. It is, however, also possible to carry out the invention using two rollers. It is preferable that the rollers, be it four or two, are resiliently mounted. Consequently the rollers can press against the carcass part with pre-tensioning and they can follow the natural variation in the dimensions of the various carcass parts 1 to be successively processed.

In the exemplary embodiment shown in FIGS. 9, 10 and 11 the rollers are provided with a helical profile in the form of a rib. It is however also possible for the rollers to be provided with multiple projections that engage the previously detached part of the back meat 15. These projections can possibly be arranged along a helical line.

It is advantageous if the mutual positions of the rollers, as seen in the longitudinal direction of the rollers, substantially follow the contour of the part of the carcass part 1 that is guided over the rollers.

When peeling the back meat 15 off the carcass part the rollers exert a force on the back meat 15 that they are engaging on. In order to optimize the direction of the force it is advantageous if the carcass part 1 and the rollers 321-324 can pivot in relation to each other. In the design this is easiest to achieve by pivoting the product carrier 50 around pivot axis 51.

FIG. 12 diagrammatically depicts the back meat 15 being peeled off the back 2 of the carcass part 1. The profile 325 of the rollers 321-324 grips the free-hanging part of the back meat 15. During this process the rollers 321-324 rotate as indicated in FIG. 11. Consequently they pull the back meat 15 loose from the bone parts of the carcass part 1. Because of the arrangement of the rollers, the rollers exert a force in such a direction that the back meat 15 is peeled off the bone parts of the carcass part.

There is a space 326 between the rollers 321 and 323. A similar space 326 exists between rollers 322 and 324. Because of the presence of these spaces 326 the back meat 15 is not crushed between the rollers, but retains its structure of quality meat to a high degree.

FIGS. 13 and 14 show successive stages of a variation of the method according to the fifth aspect of the invention. In FIG. 13 the carcass part 1 is approaching the rollers 321-324. A part of the back meat 15 has already been detached and is hanging free so that it can easily be engaged by the rollers 321-324. FIG. 14 shows that the rollers 321-324 peel the back meat 15 off the bone parts of the carcass part 1. The hand of the helical profile 325 on the rollers is selected such that the profile forces the back meat that is peeled off in a direction T2, which direction T2 is opposite to that of the main conveying direction T1 in which the product carriers 50 convey the carcass parts 1. FIG. 14 shows that the back meat 15 has been detached from the bone parts of the carcass part 1.

In the embodiment of the FIGS. 9, 10 and 11 the product carrier 50 holds the carcass part 1 to be processed by engaging on the inside of the carcass part 1. If the carcass part 1 still comprises leg parts 5, however, a product carrier 50 that engages on the leg parts 5 can also be used. This is shown in FIGS. 13 and 14. In this embodiment the product carrier itself cannot pivot the carcass part in such a way that the spine or the part of it that is still present in the carcass part comes to lie mainly horizontally. In the embodiment of the FIGS. 13 and 14 the carcass part is therefore supported on the back by the rollers 321-324. Guides 330 hold the carcass part in the correct position sideways. It is envisaged that in a variation, not shown, of the embodiment shown in FIGS. 13 and 14 for an additional guide is present that presses the back of the carcass part 1 firmly against the rollers 321-324.

FIGS. 15 and 16 show a variation of a part of the device and the method according to the fifth aspect of the invention. In this variation the axial direction of the rollers 321-324 makes a preferably acute, angle ☐ with the main conveying direction T1 in which the product carriers 50 convey the carcass parts.

In the variation shown in FIGS. 15 and 16, further the rollers 321-324 are positioned in such a way in relation to each other that the carcass part 1 to be processed is moved at least partly in between of the rollers 321-324.

Because of this arrangement of the rollers the back meat is peeled off the bone parts of the carcass part more or less in a sideways direction.

In this variation it is preferable that the product carrier 50 is pivotable relative to rollers 321-324, around pivot axis 51 for example. In this way the direction of the force exerted on the back meat 15 by the rollers 321-324 can be optimized.

The embodiment of the FIGS. 15 and 16 has proven very effective in practice.

The variation shown in FIGS. 15 and 16 is also particularly suitable for processing front halves without wings.

In general it is advantageous if the device according to the fifth aspect of the invention is fitted with a product detector. The product detector detects whether a carcass part 1 is present on the product carrier 50 or whether the product carrier 50 is empty. Detection can occur in various ways, optically or mechanically for example. In the latter case a guide is pressed in by a passing carcass part 1 for example but not by a passing empty product carrier 50. The product detector then detects whether the guide has been pressed in or not. If a carcass part 1 is detected the device according to the fifth aspect of the invention becomes active and the back meat is removed. This can for example be achieved by having the product carrier 50 bring the carcass part 1 within range of the rollers. However, if no carcass part 1 is detected then the rollers and the product carrier 50 are kept away from each other. The advantage of this is that the rollers cannot damage a passing empty product carrier 50.

It will be evident to the skilled person that where in the above a movement of the carcass part to be processed is involved relative to the processing components of the device that are engaging the carcass part while processing is being carried out, this relative movement can be achieved by having the carcass part move relative to the processing components of the device, by having the processing components move relative to the carcass part, or by a combination of both.

The fifth aspect of the invention involves a method for processing a carcass part of slaughtered poultry, which carcass part comprises:

bone parts with at least a part of the back of the rib cage and the spine, at least a part of the meat that is naturally present on the back of the rib cage and the spine, this method comprising the following steps:

detaching a part of the back meat from the underlying bone parts of the carcass part, engaging at least a part of the detached back meat, and then peeling the back meat off the bone parts of the carcass part.

In a preferred embodiment of the method according to the fifth aspect of the invention, the back meat is engaged by at least two rotating rollers, each of which is provided with a profile, which rollers, also peel the back meat off the bone parts of the carcass.

In a preferred embodiment of the method according to the fifth aspect of the invention, the carcass part is advanced in a conveying direction in relation to the rollers during engaging and/or peeling-off. Preferably, the rotating rollers move the back meat in a direction that is opposite to the conveying direction. Preferably, the carcass part is moved at least partly between the rollers.

In a preferred embodiment of the method according to the fifth aspect of the invention, during engaging of the back meat, the carcass part is oriented such that the previously detached part of the back meat hangs free from the bone parts of the carcass part. Preferably, in this preferred embodiment or in the previously mentioned preferred embodiment, the carcass part is pivoted around an axis that lies substantially perpendicular to the carcass part's plane of symmetry while the back meat is peeled off.

In a preferred embodiment of the method according to the fifth aspect of the invention, the carcass part is arranged onto a product carrier and the product carrier engages on the inside of the carcass part.

The fifth aspect of the invention also involves a device for processing a carcass part of slaughtered poultry, which carcass part comprises:
- bone parts with at least a part of the back of the rib cage and the spine,
- at least a part of the back meat that is naturally present on the back of the rib cage and the spine, which back meat has been partly detached from the bone parts of the carcass part, this device comprising:
- a gripper for engaging on at least a part of the previously detached back meat, and
- a peeler for peeling the back meat off the bone parts of the carcass.

In a preferred embodiment of the device according to the fifth aspect of the invention, the device comprises at least two rotatable rollers, each of which rollers is provided with a profile on the outer periphery, in which the rollers form part of both the gripper and the peeler. Preferably, the profile on the rollers is helical. Preferably, the rollers are mounted substantially parallel. Preferably, during operation, the carcass parts are moved in a conveying direction relative to the rollers, and the axial direction of the rollers and the conveying direction of the carcass part form a relative angle at the location of the rollers. Preferably, the rollers are positioned at some from each other and more preferably the distance between the rollers has such dimensions that it allows the carcass part to move at least partly in between of the rollers. Preferably, the rollers are resiliently mounted.

Preferably, use is made of four substantially parallel rollers, each of the rollers being provided with a profile for engaging the back meat and peeling the back meat off the bone parts of the carcass, preferably the profile is helical. Preferably, the rollers are arranged relative to each other in such a manner that, as seen in the axial direction of the rollers, they approximate the contour of the carcass part as seen in the direction of the spine.

FIG. 17 shows various stages in an example of the method according to the sixth aspect of the invention.

FIG. 17A shows a cross section of a part of the carcass part 1 to be processed before processing according to the sixth aspect of the invention has started. The rib cage 20, the sternum 21, the inner fillets or second fillets 23 and the outer fillets 22 are depicted diagrammatically in FIG. 17A. Between the outer fillets 22 and across the sternum 21 the tendon connection 25 is still present.

FIG. 17B shows the preliminary incision being made on either side of the sternum 21. The incision that is made does not extend up to the rib cage 20 as in the known methods. Because the incision is not so deep, the membrane around the inner fillets remains intact. This membrane provides amongst other things the connection between the inner fillet 23 and the outer fillet 22. Because the membrane remains intact the connection between the inner fillet 23 and the outer fillet 22 also remains intact. The tendon connection 25 between both outer fillets 22 however is cut through.

The blades 401 that make the preliminary incision on either side of the sternum are in this example arranged such that they cut as closely alongside the sternum 21 as possible.

FIG. 17C shows the next step in the method: scraping loose the meat lying on either side of the sternum 21, the inner fillets 23 in particular. A first scraper 402 that comprises two first scraper members 412a,b detaches the inner fillets 23 from the sternum 21. To this end the scraper members 412a,b move as closely as possible along either side of the sternum 21. Because of the preliminary incision the scrapers can easily and effectively localize the sternum 21.

In the example the scraper members 412a,b are not provided with a cutting edge, so the risk of the membrane around the inner fillet 23 being damaged is limited.

In order to follow the contour of the sternum 21 as closely as possible in its transverse direction it is preferable that the scraper members 412a,b are resiliently mounted in the transverse direction of the sternum 21. The scraper members 412a,b already press the meat on either side of the sternum (the inner fillets and therefore the outer fillets too) slightly away from the sternum 21. The shape of the scraper members 412a,b is specially adapted to do this, particularly on their ends on the downstream side. It is preferable that the ends concerned stand a little further away from the place where the sternum passes than the front edge of the scraper members 412a,b do. Consequently the ends bring the detached meat to a somewhat greater distance from the sternum.

FIG. 17D shows that the connection between the sternum 21 and the meat that is directly adjacent to it is broken by the passage of the first scraper 402.

FIG. 17E shows the situation after the passage of the second scraper 403, which also comprises two scraper members 413a,b without cutting edges. The scraper members 413a,b of the second scraper 403 largely have scraped the inner fillets 23 loose from the rib cage 20. Mainly only the membrane connection 24 between the inner fillet 23 and the rib cage 20 remains.

This membrane connection 24 is relatively strong. The most reliable method of breaking this membrane connection 24 without also causing unwanted damage to the connection between the inner fillet 23 and the outer fillet 22 is therefore to cut through this connection. This is shown in FIG. 17F. The cutting through of this membrane is carried out by two blades 404. From the prior art it is known to pull the membrane connection loose. This however results in the membrane remaining partly or fully connected to the bone parts of the carcass part 1 while the membrane is torn loose from the fillets. Because the membrane also connects the inner fillet and the outer fillet to each other this separates the inner fillet and the outer fillet from each other. Using the known method and device it was therefore not possible to harvest the inner fillet and the outer fillet together. The device and method according to the sixth aspect of the invention now make this possible.

After the membrane 24 has been cut loose it is possible to detach each outer fillet 22 from the rib cage 20 together with the associated inner fillet 23. Harvesting the fillets 22, 23 while they are still connected to each other yields a relatively large piece of meat (that comprises both an inner fillet and an outer fillet) of good quality. It is preferable that the harvesting of the fillets is carried out according to the method described in EP 1430780 A1.

FIG. 18 shows an overview of an embodiment of the device according to the sixth aspect of the invention.

The device according to FIG. 18 has a first part with a double rotating blade 401 to make the preliminary incision on either side of the spine. Each rotating blade is disc-shaped and rotates around an associated shaft.

In the first part also first guide 405 is provided to support and position the carcass part 1 while it is advanced over the rotating blades 401. The first guide 405 rests on support 450 and, together with this support 450, can move vertically as shown by arrow 455. Support 450 is connected to lever 452 via a hinge 454. Lever 452 has a pivot point 451. Counterweight 453 is attached to lever 452. The counterweight 453 is arranged on the side of pivot point 451 opposite to hinge 454. As a result of this design the first guide 405 can spring vertically. A spring can be used as an alternative to the lever design with counterweight. The advantage of the lever design with counterweight is however that it is more robust.

The guide 405 can be adjusted such that it is displaced in a vertical direction when a product carrier 50 with carcass part 1 passes by, but not if an empty product carrier passes. The vertical displacement of guide 405 can then be registered by a product detector 456 which can be designed as an optical sensor or a proximity switch for example. If an empty product carrier 50 passes by then the product detector is not actuated and second scrapers 403 and actuatable blades 404, both in the second part of the device, do not become active for example. In addition, the product carrier 50 can be turned away from the rotating blades 401 and the scrapers 402, 403 in the second part of the device. In this way damage to an empty product carrier 50 will be prevented.

It is preferable that the rotating blades 401 are mounted together on a single driveable shaft 409. In this way the blades 401 are driven by a single motor 408. As an alternative two rotating blades 401 can obviously also be used, each of which is mounted on its own shaft, and driven by its own drive. Instead of rotating blades static blades can also be present to make the preliminary incision.

The second part of the device shown in FIG. 18 comprises the first scraper 402. This scraper comprises two, substantially parallel scraper members 412a,b. The scraper members 412a,b have a non-cutting design, i.e. no sharp functional cutting edge is present. The scraper members 412a,b are resiliently mounted so that they can move in the horizontal and vertical planes, both relative to the rest of the device and relative to each other. This way, the shape of the sternum and its variations within a flock can be closely followed.

The device shown in FIG. 18 further comprises at least second guide 406 to support and position the carcass part 1 while it is advanced over the first scraper 402. The second guide 406 is attached to support 460. A shielding plate (not shown) can also be attached to this support 406 to shield the device for safety reasons.

For the sake of clarity guide plate 461 with projection 462 is shown by a dashed line in FIG. 18. This guide plate 461 is connected to the second guide 406, is at an angle to the horizontal and extends in the transverse direction of the device. The guide plates extend in the longitudinal direction of the device (that is the same direction as conveying direction T1 of the carcass parts 1 during operation) from a point in front of the first scraper 402 up to adjacent to at least a part of the second scraper 403. There are two such guide plates 461 present in the device, and these are on either side of the scraper 402. The guide plates make that the previously detached parts of the meat are kept out of the vicinity of the scrapers 402, 403. The projection 462 on each guide plate 461 continues this function by guiding the detached meat a little way further.

The third part of the device shown in FIG. 18 comprises the second scraper 403. Here too the scraper again comprises two scraper members 413a,b that are mounted substantially parallel to each other. The scraper members 413a,b of the second scraper are also of a non-cutting design and resiliently mounted.

Two actuatable blades 404 are connected to the second scraper 403. These blades 404 are each actuated by control element 407. In this example each control element 407 is designed as a pneumatic cylinder.

The rotating blades 401, the first scraper 402 and the second scraper 403 are arranged relative to each other in such a way that a carcass part 1 that is guided through the device shown in FIG. 18 by a product carrier 50 first encounters the rotating blades 401, then the first scraper 402 and then the second scraper 403 with the actuatable blades 404.

FIG. 19 shows a carcass part 1 that is being held by a product carrier 50. It is preferable that the product carrier 50 advances the carcass part along a line through a number of processing stations. A number of product carriers move along the line as can be seen in FIGS. 19-21. The product carrier 50 moves the carcass part 1 that the product carrier 50 is holding in main conveying direction T1 relative to the device according to the sixth aspect of the invention.

In this case the carcass part 1 still comprises at least a part 4 of each wing.

FIGS. 19 and 22 show the preliminary incision being made on either side of the sternum 21. The guides 405 position the sternum and the meat that is adjacent to it relative to the rotating blades 401. FIG. 22 clearly shows that the rotating blades 401 do not cut down all the way to the rib cage 20. The rotating blades make an incision on either side of the sternum 21 and this is done as closely as possible along the sternum 21.

FIG. 20 shows that the carcass part 1, held by product carrier 50, is guided over the first scraper 402. The product carrier 50 moves the carcass part 1 in the main conveying direction T1 relative to the first scraper 402. The first scraper comprises scraper members 412a, 412b that are mounted substantially parallel to each other. The scraper members 412a, 412b are resiliently arranged relative to each other in a substantially horizontal plane and in a substantially vertical plane. In principle, other planes could also be chosen, whereby it is favourable if both planes are substantially perpendicular to each other.

The scraper 402 is pivotable around axis 445 in the direction shown by arrow R10. This makes it possible to switch the scraper 402 on and off. When switched on the scraper 402 is in an active position whereby a passing carcass part 1 is processed by the scraper 402. When switched off the scraper 402 is in an inactive position. Even if a carcass part 1 were to pass by then this carcass part 1 would not be processed by the scraper 402. It is advantageous to combine this option with a product detector 456. It is then possible to switch on scraper 402 only if a product carrier 50 with a carcass part 1 passes by. In case of an empty product carrier to the scraper then remains in its inactive position for an empty product carrier 50. This prevents the scraper 402 damaging an empty product carrier 50 that is passing by. The pivoting of the scraper from its inactive position to its active position and vice versa can be driven by, for example, a pneumatic cylinder (not shown).

FIG. 23 shows a cross section of the carcass part 1, the scraper members 412a,b and the guides 406 during scraping. The scraper members 412a,b scrape the meat on either side of the sternum 21 loose from the sternum 21. The guides 406 guide the carcass part 1 such that the sternum arrives in the correct position relative to the scraper members 412a,b. As a secondary effect the guides 406 in an advantageous embodiment support the carcass part 1 during this process. Guide plates 461, which guide the breast meat aside so that the scraper members 412a,b of the scraper 402 have easy access, can also be seen.

FIG. 24 shows a detail of the scraping by the first scraper 402. For the sake of clarity the wing parts 4 and the guide plates 461 are not shown in FIG. 24.

FIG. 21 shows that the carcass part 1, held by product carrier 50, is guided over the second scraper 403. The product carrier 50 moves the carcass part 1 in the main conveying direction T1 relative to the second scraper 403. The second scraper comprises the scraper members 413a, 413b that are arranged substantially parallel to each other.

The scraper 403 is pivotable around axis 440 in the direction shown by arrow R11. This makes it possible to switch the scraper 403 on and off. When switched on the scraper 403 is in an active position whereby a passing carcass part 1 is processed by the scraper 403. When switched off the scraper 403 is in an inactive position. Even if a carcass part 1 were to pass by then this carcass part 1 would not be processed by the scraper 403. It is advantageous to combine this option with a product detector 456. It is then possible to switch on scraper 403 only if a product carrier 50 with a carcass part 1 passes by. In case of an empty product carrier to the scraper then remains in its inactive position. This prevents the scraper 403 damaging an empty product carrier 50 that is passing by. The pivoting of the scraper 403 from its inactive position to its active position and vice versa can be driven by, for example, a pneumatic cylinder 446.

Additionally or as an alternative the scraper members 413a, 413b can be arranged such so that they can move resiliently in the vertical direction.

It is preferable that the scraper members 413a, 413b are connected to each other by a connection plate in the transverse direction (relative to the conveying direction of the carcass parts). It is preferable that the connection plate is pivotable relative to each of the scraper members. This allows variations in the carcass parts to be successfully accommodated as the scrapers can mutually correct each other's movements.

FIG. 25 shows a cross section of the scraping by the second scraper members 413a,b. FIG. 26 shows a detail of the scraping by the second scraper 403. For the sake of clarity the wing parts 4 of the carcass part are not shown.

Blades 404 are provided in order to detach the strong membrane connection 24 between the inner fillet 23 and the rib cage 20. Each of the blades has a cutting edge 414. Each blade 404 is pivotably mounted on one of the scraper members 413a,b as shown in FIG. 26. The position of the blades 404 relative to the respective scraper members 413a,b to which they are attached can be altered by control element 407. In the example in FIG. 22 and FIG. 26 the control element 407 comprises two pneumatic cylinders, each of which controls a blade 404.

The blades 404 have an active and an inactive position. FIG. 26 shows the blades 404 in their active position, FIG. 27 shows them in their inactive position. In the inactive position the cutting edge 414 of each of the blades 404 is more or less in line with the top edge of the scraper members 413a,b to which the blade 404 concerned is attached. In the active position the cutting edge is raised relative to the top edge of the relevant scraper member 413a,b. The blades 404 are brought from their inactive position to their active position when the membrane 24 comes within range of the blades 404.

In an alternative embodiment, not shown, the blades 404 and their control element 407 are not present. Cutting through the membrane 24 can then be done manually for example.

FIG. 28 indicates the position of the incisions and the parts of the breast fillet 8 to be scraped loose on the carcass part 1. In FIG. 28 the back 2, the wing 4 and the breast fillet 8 are depicted diagrammatically. In addition, the rib cage 20, the delta bone 12 and the sternum 21 are shown.

Preliminary incision 431, made by the rotating blades 401, extends along the sternum 21. The first scraper 402 detaches the meat of the breast fillet 8 in area 432. Next the second scraper 403 detaches the meat in area 433. Finally the actuatable blades 404 cut through the membrane 24 with incision 434.

After the method according to the sixth aspect of the invention has been carried out the meat is removed from the bone parts of the carcass part. It is preferable that this is done by pulling on the wings as described in EP 1430780 A1.

FIG. 56 shows an alternative embodiment of a device for implementing the method according to the sixth aspect of the invention. FIG. 57 shows a part of the device according to FIG. 56 viewed from above and FIG. 58 shows a side view of a part of the device according to FIG. 56.

The first part of the embodiment according to FIGS. 56-58 is the same as the first part of the embodiment according to FIG. 18. Here too rotating blades 401 are provided as well as a resiliently mounted guide 405 and a product detector 456. The way in which the first part of the embodiment according to FIGS. 56-58 works is the same as the way in which the first part of the embodiment according to FIG. 18 works.

The second part of the embodiment according to FIGS. 56-58 is largely the same as the second part of the embodiment according to FIG. 18. In the example according to FIGS. 56-58A a different form of the first scraper members 471a,b is applied. In the example of FIGS. 56-58 the downstream end of the scraper members 471a,b is positioned higher than the upstream end. Here "downstream" and "upstream" are related to the main conveying direction T1 of the carcass parts to be processed. FIG. 57 and FIG. 58 show the shape of the scraper members 471a,b applied in this example in greater detail. The scraping edge 471a,b is designed as non-cutting (that is, there is no sharp functional cutting edge present) and the side surfaces 473a,b slope diagonally down. The scraper members 471a,b are tiltable around axis 445 according to arrow R10. Scraper members 471a,b can be switched on and off just like scraper members 412a,b. It is preferable that switching the scraper members 471a,b on and off is controlled based on signals from the product detector 456.

The scraper members 471a,b are resiliently mounted so that they can move in the horizontal and vertical planes, both relative to the rest of the device and relative to each other. In this way they can easily follow the shape of the sternum and the variations therein within a flock.

The scraper members 471a,b as according to FIGS. 56-58 can also be used in the device shown in FIG. 18. The other way around, the scraper members 412a,b according to FIG. 56-58 can also be used in the device according to FIG. 56.

The device according to FIGS. 56-58 further comprises at least second guide 406 for supporting and positioning the carcass part 1 while it is advanced over the first scraper 402. The second guide 406 is attached to support 460. A shielding plate (not shown) can also be attached to this support 460 to shield the device for safety reasons.

Also, the second part of the device shown in the exemplary embodiment of FIGS. 56-58 comprises a guide plate 461. This guide plate 461 is connected to the second guide 406, is at an angle to the horizontal and extends in the transverse direction of the device. The guide plates extend in the longitudinal direction of the device (that is, the same direction as the conveying direction T1 of the carcass parts in operation) from a point in front of the first scraper 402 to adjacent to at least a part of the second scraper 403. There are two such guide plates 461 present in the device, and these are on either side of the scraper 402. The guide plates make that the previously detached parts of the meat are kept out of the vicinity of the scraper 402.

In the example of FIGS. 56-58 the design of the third part of the device is different to that in FIG. 18. In the example of FIGS. 56-58 the second scraper 403 with the actuatable blades 404 from FIG. 18 has been replaced by scraper members 475a,b and rotating blades 480a,b. Scraper members 475a,b together form the second scraper 403.

As can be clearly seen in FIG. 57 the rotating blades 408a,b are arranged in a V-shape. Upstream the rotating blades 480a,b are further apart than downstream. Further it is advantageous if the rotation axis of the rotating blades is at an angle to the horizontal. In this way an accurate incision can be made which takes good account of the anatomy of the carcass part.

The rotating blades 480a,b are therefore not arranged parallel to each other. Each rotating blade 480a,b is therefore attached to its own shaft 481a resp. 481b with its own motor 482a resp. 482b to provide the drive. The rotating blades 480a,b are disc-shaped and can have a smooth cutting edge or a serrated edge 483. The application of a serrated edge 483 generally provides a better grip on the carcass part to be processed.

In order to ensure that when using the exemplary embodiment of FIGS. 56-58, the rotating blades 480a,b do not cut too deeply it is preferable that the product carrier 50 pivots the carcass part in the vertical plane while passing the rotating blades 480a,b. This pivoting is shown in FIG. 59. For the sake of clarity FIG. 59 only shows the rotating blade 480a and the remainder of the device according to FIGS. 56-58 has been omitted.

FIG. 59a shows the entry of the carcass part 1. Carcass part 1 is attached to product carrier 50, which holds the carcass part with the breast directed downwardly in a substantially horizontal position. Surface 997 is held substantially parallel to the horizontal 999, as indicated by line 998 (which lies in line with surface 997 of product carrier 50).

When the carcass part 1 advances further relative to the rotating blades 480a,b in the main conveying direction T1, as shown in FIG. 59b, the product carrier 50 raises the carcass part 1. Line 998 and the horizontal 999 now enclose an angle □1.

When the carcass part 1 advances even further relative to the rotating blades 480a,b in the main conveying direction T1, as shown in FIG. 59C, the product carrier 50 raises the carcass part 1 even further. Line 998 and the horizontal 999 now enclose a larger angle □2.

The desired depth and the desired shape of the incision 489 to be made by the rotating blades can be achieved by adjusting the pivoting of carcass part 1 by the product carrier 50 while passing the rotating blades 480a,b. Pivoting of the carcass part 1 can be achieved by pivoting the product carrier 50, to which the carcass part 1 has been attached, around axis 51.

It will be evident to the skilled person that where there is mention above of a movement of the carcass part to be processed relative to the processing components of the device that are engaging the carcass part while processing is being carried out, this relative movement can be achieved by having the carcass part move relative to the processing components of the device, by having the processing components move relative to the carcass part, or by a combination of both.

The sixth aspect of the invention involves a method for processing a carcass part of slaughtered poultry,
which carcass part comprises:
- bone parts with at least a part of the rib cage, and at least a part of the sternum,
- at least a part of the meat that is naturally present on the rib cage, which meat comprises at least a part of the outer fillet and at least a part of an inner fillet,
- at least a part of the membrane that is naturally present between the inner fillet and the outer fillet, this method comprising the following steps:
- making an preliminary incision on both sides of the sternum, which preliminary incision leaves the part of the membrane that is present between the inner fillet and the outer fillet intact,
- scraping loose the meat that lies against the sternum on either side using a first scraper,
- scraping at least a part of the meat of the inner fillet loose from the rib cage using a second scraper,
- cutting through the membrane connection between the inner fillet and the rib age,
- removing the outer fillet and the inner fillet from the bone parts of the carcass part, in which the connection between the inner fillet and the outer fillet remains intact.

In a preferred embodiment of the method according to the sixth aspect of the invention, while the meat that lies against the sternum on either side is being scraped loose, that meat is pressed outwards.

In a preferred embodiment of the method according to the sixth aspect of the invention, the carcass part comprises at least a wing part, and the outer fillet and the inner fillet are removed together from the bone parts of the carcass part by pulling on the wing part.

The sixth aspect of the invention also involves a device for processing a carcass part of slaughtered poultry,
which carcass part comprises:
- at least a part of the rib cage,
- at least a part of the sternum,
- at least a part of the meat that is naturally present on the rib cage, which meat comprises at least a part of the outer fillet and a part of at least an inner fillet, this device comprising:
- a blade for making a preliminary incision on either side of the sternum, which preliminary incision leaves the membrane between the inner fillet and the outer fillet intact,
- a first scraper for scraping loose the meat that lies against the sternum on either side,
- a second scraper from the rib cage for scraping loose a part of the meat of the inner fillet that is naturally present on the rib cage,
- a second blade to cut through the membrane connection between the inner fillet and the rib cage.

In a preferred embodiment of the device according to the sixth aspect of the invention, the first scraper comprises two scraper members, each of which is suitable to work on one side of the sternum. Preferably, the scraper members of the first scraper have a non-cutting design.

In a preferred embodiment of the device according to the sixth aspect of the invention, the first scraper is resiliently mounted. Preferably, the first scraper is resiliently moveable in two directions, these two directions being mainly perpendicular to each other.

In a preferred embodiment of the device according to the sixth aspect of the invention, the second scraper comprises two scraper members, each of which can work on one side of the rib cage. Preferably, the scraper members of the second scraper have a non-cutting design. Preferably the scraper members of the second scraper are connected to each other.

In a preferred embodiment of the device according to the sixth aspect of the invention, the second scraper is resiliently mounted.

In a preferred embodiment of the device according to the sixth aspect of the invention, the second blade for cutting through the membrane connection between the inner fillet and the rib cage is an actuatable blade which is integrated into the second scraper, which actuatable blade cuts through the membrane connection between the inner fillet and the rib cage. Preferably, the actuatable blade is resiliently mounted.

In a preferred embodiment of the device according to the sixth aspect of the invention, the device comprises two rotatable, disc-shaped blades for cutting through the membrane connection between the inner fillet and the rib cage, which two blades have a greater distance between them downstream than upstream. Preferably, the rotatable blades are each provided with a serrated edge.

FIG. 63 shows the muscles in the wing joint area. FIG. 63 is based on an illustration from the book "Lehrbuch der Anatomie de Haustiere" [Textbook of the anatomy of domestic animals], Vol. V "Vögel" [Birds], ISBN 3-489-57616-0.

The bone in the wing is indicated by reference number 901, 902 is the sternum and 903 is the wishbone.

Reference number 910 indicates the M. pectoralis. This is the large muscle that pulls the wing down during flight. This muscle forms the outer fillet.

Reference number 911 indicates the M. supracoracideus. This is the small muscle that pulls the wing up during flight. This muscle forms the inner fillet.

The seventh aspect of the invention concerns cutting through the tendon that connects the M. supracoracideus to the wing joint. This tendon is in the area indicated by 912 in FIG. 63.

FIG. 60 shows an embodiment of a device according to the seventh aspect of the invention. An outer fillet guide 701, a clavicle guide 702 and rotating blades 710 and 711 can be recognized in FIG. 60. The outer fillet guide includes a recess for the rotating blades 710, 711.

Product carriers 50 move the carcass parts 1 past the device in the conveying direction T1. Entry guide 704 ensures the smooth entry of the carcass parts 1. As can be seen in FIG. 60 the breast 3 of the carcass parts 1 is turned down and the back 2 is turned upwards. The carcass parts 1 are held by the product carriers in such a way that the spine (insofar as it is present or had the spine been present) runs substantially horizontally and extends substantially transverse to the conveying direction. The guides 701, 702 extend in the main conveying direction T1.

It is preferable that the rotating blades rotate in opposite directions during operation as shown in FIG. 60. It is more preferable that the first blade 710 exerts a force on the tendon to be cut through in the main conveying direction T1 and the second blade 711 exerts a force in a direction opposite to the main conveying direction T1. It is preferable that the rotating blades 710, 711 have a serrated edge. A serrated edge increases the grip of the blades 710, 711 on the tendon or tendons to be cut through.

FIG. 61 shows a side view of the embodiment shown in FIG. 60. Carcass part 1 is on product carrier 50. Product carrier 50 is pivotable around axis 51 in direction 750. Product carrier 50 is also rotatable as shown by arrow 752. Before the carcass part 1 to be processed enters the device shown in FIG. 60 and FIG. 61 the product carrier 50 moves the carcass part 1 into the position shown in FIG. 60 and FIG. 61 by pivoting as shown by arrows 751 and 752.

The wishbone has been removed from the carcass part 1 before the carcass part 1 arrives at the device shown in FIG. 60 and FIG. 61. Consequently, a relative large opening 724 is created on the neck side in carcass part 1. This opening 724 is shown in FIG. 62. As this opening 724 is large the outer fillet 720 is relatively flexible near this opening 724. In addition, because the wishbone has been removed two free ends 721 are also created on the clavicle. This considerably increases the mobility of the clavicle.

On entering the device shown in FIG. 60 the product carrier 50 lifts the carcass part 1 so far that the free ends of the clavicle meet the bottom of the entry guide 704. This lifting is achieved by pivoting the product carrier 50 around axis 51. While passing the entry guide 704 the free ends 721 of the clavicle are kept in contact with the bottom of this entry guide 704. The entry guide ensures pre-positioning of the carcass part 1 relative to the device.

At the end of the entry guide 704 (as seen in the main conveying direction T1) the clavicle guide 702 takes over. The product carrier 50 once again presses the free ends 721 of the clavicle against the bottom of the guide 702. This can be clearly seen in FIG. 61.

Because the product carrier 50 presses the free ends 721 of the clavicle against the bottom of the clavicle guide 702 the free ends 721 of the clavicle assume a defined position relative to the device. This defined position is designated as "the second position".

After the carcass part 1 has been pre-positioned by the entry guide 704 the carcass part 1 and its outer fillet 720 come into contact with the outer fillet guide 701. The outer fillet guide 701 presses the flexible part of the outer fillet, which was created by the removal of the wishbone, away from the free ends 721 of the clavicle, i.e. downwards in the example shown in FIG. 60 and FIG. 61.

In this way the guides 702, 701, in combination with the position of the product carrier 50, thereby ensure that the free ends 721 of the clavicle and the neck-side part of the outer fillet 720 are pulled apart. This exposes the tendon 722 which connects the inner fillet to the wing joint. This makes tendon 722 accessible for a blade.

In an advantageous embodiment the outer fillet guide 701 has a rounded edge 705 on the side that engages the outer fillet. Such an edge prevents the outer fillet guide 701 damaging the outer fillet.

In the example of FIG. 60 and FIG. 61 the free ends 721 of the clavicle and the neck-side part of the breast fillet 720 are moved so far apart from each other that the tendon 722 is placed under tension. This simplifies the cutting through of the tendon 722.

Further both inner fillets and both wing joints are present on the carcass part 1 to be processed in the example of FIG. 60 and FIG. 61. Consequently, there is a tendon 722 present on both sides of the carcass part 1. In the device shown in FIG. 60 and FIG. 61 both tendons 722 are exposed and cut through.

Two rotatable, disc-shaped blades 710, 711 are provided for cutting through the tendon or tendons 722 present in the carcass part. The blades are arranged next to each other, as seen in the main conveying direction T1. The rotation axis of the blades is substantially perpendicular to the path that the carcass parts follow while passing the device according to FIG. 60, FIG. 61. In the example given the blades 710, 711 rotate in opposite directions, and then in such a manner that the blades 710, 711 on the side on which the free ends 721 of the clavicle pass rotate towards each other.

Using two rotating blades after to each other ensures a high degree of reliability in cutting through the tendon or tendons 722. A single rotating blade or a static blade can, however, also be used as an alternative.

The rotating blades 710, 711 protrude through a recess 703 in the outer fillet guide 701. This ensures that the blades are able to reach the tendon 722. It is preferable that the arrangement of the blades 710, 711 can be adjusted so that the angle ☐ between blades 710, 711 and the outer fillet guide 701 can be varied. It is preferable that the distance from the blades to the outer fillet guide 701 can also be adjusted, by making a displacement along the arrow X possible for example. The adjustability of the position and orientation of the blades 710, 711 makes it possible to select the location at which the tendon 722 is cut through, close to the inner fillet for example.

In an advantageous embodiment the blades 710, 711 have a serrated edge. A serrated edge ensures a better grip on the slippery tendon tissue while cutting it through.

While the tendon or tendons 722 is/are being cut through the clavicle guide 702 ensures that the free ends 721 of the clavicle are held in the desired second position.

In an advantageous embodiment the device is provided with a product detector which detects whether there is a carcass part 1 present on a product carrier 50 before the product carrier concerned comes within range of the entry guide 704. If the presence of a carcass part 1 is detected the product carrier 50 is brought into the position shown in FIG. 60 and FIG. 61. If detection reveals that no carcass part 1 is present on the product carrier 50 concerned the product carrier 50 is kept away from the blades 710, 711, for example by having the product carrier 50 pivot around axis 51 into a vertical position. This prevents an unwanted contact between the blades 710, 711 and the product carrier 50 so that no damage occurs.

It will be evident to the skilled person that where there is mention above of a movement of the carcass part to be processed relative to the processing components of the device that are engaging on the carcass part while processing is being carried out, this relative movement can be achieved by having the carcass part move relative to the processing components of the device, by having the processing components of the device move relative to the carcass part, or by a combination of both.

In the first up to and including the seventh aspect of the invention described advantageously a product carrier as described in EP1191852 can be applied. This product carrier is pivotable around a number of axes and can be locked in a number of desired positions. It is however possible for the lock to be released unintentionally and for the product carrier to approach a processing device for example, one of the types described in one of the aspects of the invention, in a position that would make the product carrier collide with one or more components of the processing device. This can, of course, lead to damage to the product carrier or the processing device.

In order to avoid this unwanted situation, it is preferable that a lock monitoring device is installed next to the path followed by the product carriers. This lock monitoring device is positioned upstream of the processing device. The lock monitoring device comprises a contact element that is positioned in the path of the product carriers in such a way that that an unlocked product carrier, which is therefore hanging down, hits the contact element but a locked, raised product carrier does not.

In passing, the unlocked product carrier pushes the contact element aside. Here, the contact element preferably pivots around an axis, which preferably extends substantially perpendicular to the path of the product carriers. The movement of the contact element actuates a locking device. This locking device engages the member on the product carrier that provides locking of the product carrier and makes that the product carrier is locked once again.

A product carrier according to EP0254332 for example can also be applied as an alternative to the product carrier according to EP1191852, in the variation shown in FIG. 1F for example. This type of product carrier does not have the pivoting capabilities of a product carrier according to EP1191852. This can, however, be compensated by having the components of the devices that carry out the processes on the carcass parts move relative to the product carrier with the carcass part to be processed.

FIG. 64 shows the device according to FIG. 61 in combination with the alternative product carrier shown in FIG. 1F. Corresponding reference numbers show corresponding parts.

As product carrier 50\* is only pivotable around shaft 52\* the product carrier cannot push the free ends of the clavicle 721 against the bottom of the guide 702. In this example, however, the guide 702 is fitted with a compression spring 730, which pushes the guide 702 against the free ends of the clavicle 721.

The seventh aspect of the invention involves a device for processing a carcass part of slaughtered poultry,
which carcass part, at the start of the process, comprises:
  bone parts with at least a part of the rib cage, at least a part of the clavicle, and at least a part of the wing joint,
  at least a part of the outer fillet, where the part of the outer fillet that is present is connected to the part of the rib cage that is present,
  at least a part of the inner fillet,
  at least a tendon that connects the inner fillet to the wing joint,
this device comprising:
  an outer fillet guide to maintain at least a part of the outer fillet in the first position,
  a clavicle guide to hold the free ends of the wishbone in the second position,
  at least one blade to cut through the tendon.

In a preferred embodiment of the device according to the seventh aspect of the invention, this device comprises two rotatable, disc-shaped blades to cut through the tendon. Preferably, the two rotatable blades are positioned one behind the other in the conveying direction. Preferably, the blades rotate in opposite directions during operation.

In a preferred embodiment of the device according to the seventh aspect of the invention, the blade is provided with a serrated edge.

The seventh aspect of the invention also involves a method for processing a carcass part of slaughtered poultry using a device according to the seventh aspect of the invention, which carcass part, at the start of processing, comprises:
  bone parts with at least a part of the rib cage, at least a part of the clavicle, and at least a part of the wing joint,
  at least a part of the outer fillet, where the part of the outer fillet that is present is connected to the part of the of the rib cage that is present,
  at least a part of the inner fillet,
  at least a tendon which connects the inner fillet to the wing joint,
this method comprising the following steps:
  exposing the tendon by pushing away at least a part of the outer fillet up to a first position away from the free ends of the clavicle, using an outer fillet guide and by pushing the free ends of the clavicle up to a second position away from the outer fillet using a wishbone guide and,
  cutting through the tendon while the outer fillet is in the first position and the free ends of the clavicle are in the second position.

In a preferred embodiment of the method according to the seventh aspect of the invention, the connection on the carcass part between the outer fillet and the wishbone on the one hand, and the wing joint on the other hand has previously been broken.

In a preferred embodiment of the device according to the seventh aspect of the invention, the carcass part is moved along a path during processing, in which the longitudinal direction of the carcass part extends substantially transverse to the path.

FIG. 37 shows a first embodiment of the system and the method according to the eighth aspect of the invention. In this exemplary embodiment carcass parts 1 are arranged on product carriers 50 such as those that are known according to EP1191582 for example. The product carriers are advanced in conveying direction T1 along a path determined by rail 39. Each carcass part comprises at least one harvestable part 501. In this exemplary embodiment the harvestable part comprises breast fillet 8 and wing parts 4. At the start of the process according to the embodiment shown in FIG. 37 the harvestable part 501 of the carcass part 1 is still connected to the bone parts that are present in the carcass part 1, to the rib cage in particular.

A product carrier 50 feeds a carcass part 1 to a processing device 510. In this case the processing device 510 is a filleting device as described in EP 1430780 A1. In this processing device the breast fillet 8 is pulled loose from the rib cage of the carcass part 1 by pulling on the wing parts 4. The processing device 510 then conveys the harvestable part 501, which comprises the breast fillet 8 and the wing parts 4 in this exemplary embodiment, to a pair of rotating blades 511 which separate the wing parts 4 from the breast fillet 8.

The form of the product carrier 50 is such that the carcass part 1 to be processed only fits on it in one way. Also, guides in the processing device 510 ensure that each carcass part enters the processing device 510 in the same orientation. Consequently, each carcass part 1 that is processed by the processing device 510 arrives in the processing device in the same, predefined orientation in relation to this processing device. Also during processing of the carcass part 1 by processing device 510 the orientation of carcass part 1, and particularly that of its harvestable part 501 remains known and the same as a predefined orientation. The result of this is that the harvestable parts 501 of successive carcass parts 1 always leave the processing device 510 in the same orientation in relation to this processing device.

In the exemplary embodiment shown in FIG. 37 the removed breast fillets 8 are received on conveyor 530. In practice it has been found that all breast fillets actually leave the processing device 510 and arrive on the conveyor 530 in the same orientation. The orientation of the breast fillets 8 on the conveyor 530 is thus known and defined in advance. This known orientation is used in the subsequent packaging of the breast fillets 8. In the exemplary embodiment shown in FIG. 37 the conveyor 530 discharges onto a drop conveyor 531. This is a conveyor with a variable length in the conveying direction T2 of the conveyor. The breast fillet to be packaged arrives on the drop conveyor 531. The drop conveyor 531 conveys the breast fillet to the end of the drop conveyor 531 in its extended position. Then the drop conveyor quickly retracts so that the fillet 8 lands in a tray 550 that is present under the drop conveyor 531. It is preferable that a discharge conveyor 552 is disposed under the drop conveyor. This discharge conveyor 552 feeds trays 550 to the location where the breast fillets 8 are placed in trays 550. Once a tray 550 has arrived in this location, it is preferable that it is restrained by a moveable stop 553 that holds the tray in its place until drop conveyor 531 has deposited a fillet 8 in it. When a drop conveyor 531 is applied this location will therefore be under the retracting part of the drop conveyor 531.

Because the orientation in which the breast fillets 8 arrive on the conveyor 530 closely matches the manner desired for presentation in a tray 550 the fillets 8 can be deposited directly from the conveyor 530 into the trays 550.

It is preferable that the conveyor 530 is positioned such that it passes a short distance from the discharge point 512, where the fillets leave the processing device 510. Further, it is advantageous if the conveyor 530 comprises a part 530a that is arranged at an incline in the immediate vicinity of the discharge point 512, as shown in FIG. 37. This inclined part 530a slopes downwards in the downstream direction. In practice it has been found that the fillets 8 already hang downwards in the processing device under the force of gravity. Consequently, with a conveyor that is positioned at an incline almost the full length of the fillet comes into contact with the conveyor at almost the same time. It has been found in practice that in this way the inclined part 530a of the conveyor makes receiving the fillets in a fixed orientation more reliable.

It is preferable that the trays 550 are the known shallow trays in which the fillets 8 are offered to the consumer in the supermarket. For sealing the individual packages the shallow trays can be conveyed by conveyor 552 to a station where a preferably transparent plastic foil is applied over each filled tray. As an alternative the fillets can also be received into a larger tray or crate which for example is used for transportation to a shop.

It is preferable that the trays 550 are supplied from a destacker 560. This is of course positioned upstream relative to the drop conveyor 531.

It is not only the fillets 8 that leave the processing device 510 in a reproducible manner; this also applies to the wing parts 4. The wing parts 4 therefore also come to lie on the conveyor 530' in a predefined, reproducible manner. The known orientation of the wing parts 4 on the conveyor 530' too can be used when packaging the wing parts. The principle behind this does not differ from packaging the breast fillets 8.

FIG. 38 shows a variation of the method and the system shown in FIG. 37. In this variation the conveyor 552 feeds the trays 550 directly to the location where the breast fillets 8 leave the processing device 510, the filleting device in this case. This example uses the filleting device known from EP1430780A1, which is suitable for use in combination with the invention. In this variation the conveyor 530 and the drop conveyor 531 are therefore no longer required.

Also in the variation shown in FIG. 38 it is preferable that the trays 550 are fed from a destacker 560.

FIG. 39 shows a second variation of the embodiment shown in FIG. 37 and FIG. 38. Also in this variation a processing unit 510 removes the breast fillet 8 and the wing parts 4 from carcass part 1. The rest of the carcass part 502 remains held by product carrier 50. Product carrier 50 conveys the rest 502 of the carcass part 1 to a subsequent processing station. This is, for that matter, also the case in the embodiments shown in FIGS. 37, 38 and 40.

In the variation shown in FIG. 39 too the breast fillets 8 arrive on the conveyor 530 in a reproducible and predefined manner. This conveyor 530 conveys the fillets 8 to robot 520. This robot comprises a first arm 523 and a second arm 524. The arms 523, 524 are arranged pivotably relative to each other. At the end of the first arm 523 there is a gripper 522. This gripper takes the breast fillet 8 and deposits it in the tray 550. A conveyor 552 supplies trays from the destacker 560 to the robot 521. Stop 553 makes that an empty tray 550 cannot pass the robot before a fillet 8 has been deposited in it. As the fillets 8 always arrive at the gripper 522 with the same orientation the robot can always perform the same movement to deposit the fillet 8 in the tray 550 in the desired manner.

It is preferable that the gripper 522 is made from stainless steel and is preferably arranged eccentrically and rotatable relative to the longitudinal axis of the arm 523. In the example shown the gripper 522 grips the breast fillets 8 using one or more suction pads. As an alternative the gripper 522 could in essence take the form of a hand.

In the variation shown in FIG. 39 the system also comprises a checking device 450. This checking device can comprise an X-ray device for example, to check that no unwanted bone parts remain in the fillets 8. Instead of the checking device 450, the system can also comprise an inspection station to visually inspect the harvestable part. Such an inspection system can have a camera that is connected to an image analysis system. In this way the harvestable parts 501, breast fillets 8 in this case, can be visually inspected for deviations. In this regard, consider, for example, bruises or pieces of skin that have not been successfully removed.

In the variation shown in FIG. 39 too the wing parts 4 that are separated from the breast fillet 8 are fed to conveyor 530'. Again the wing parts come to lie on the conveyor 530' in a predefined and reproducible manner. In the case of the wing parts this means however that all left wings come to lie on the conveyor in a similar manner and all right wings in a similar manner. In the system shown in FIG. 39 the right wings and the left wings do not, however, lie on the conveyor 530' in the same manner. This does not, however, have to be a problem during packaging. Good packaging methods are known where the wings lie alternately so that the total forms an attractive presentation. In addition a robot can be used to deposit the wing parts 4 in trays 550, during which process the robot takes into account the difference in orientation between left wings and right wings. This is, of course, also the case in the embodiments shown in FIGS. 37 and 38.

FIG. 40 shows a variation of the embodiment shown in FIG. 3. In this variation the product carrier does not engage on the inside of the carcass part 1 but engages on the legs, which are still present on the carcass part in this variation.

FIG. 41 shows a second embodiment of the system and the method according to the invention. In this embodiment the carcass part 1 to be processed is a leg. In the embodiment of FIG. 41 product carriers 50 advance the carcass parts 1 to be processed to a processing device 510. The legs hang next to each other in the product carrier 50, two-by-two. The product carrier holds the legs just below the tarsal joint.

The processing device 510 comprises two rotating blades 511. These rotating blades 511 cut the carcass parts 1 in such a way that the thigh pieces are removed and the drumsticks remain hanging in the product carrier. In this case the thigh pieces, that are also sold as skinless thighs, form the harvestable parts 501 and the drumsticks form the rest 502 of the carcass part.

In the embodiment of FIG. 41 a feed device 520 is provided that comprises a robot 521. In this example the robot comprises a first arm 523 that is pivotable in a direction that is perpendicular to the longitudinal direction of the robot arm 523. A gripper 522 has been fitted to the robot arm 523. This gripper already grips the thigh piece 9 of the carcass part before the thigh piece 9 is separated from the drumstick 6. When the rotating blade 511 separates the thigh piece 9 from the drumstick the gripper prevents the thigh piece dropping down. As the carcass parts 1 hang in the product carriers in a known, predefined orientation the orientation of the thigh piece 9 relative to the gripper is also directly and thereby unequivocally defined. The robot can now deposit the thigh piece 9 in a fed tray 550 with a single rotation of the robot arm 523. As the orientation of the thigh piece 9 is unequivocally defined relative to the gripper, and the robot arm always carries out the same movement, the orientation in which the thigh piece 9 is deposited in the tray 550 is always unequivocally fixed. This consequently achieves an unequivocal presentation of the thigh piece in the tray.

It is preferable that the trays 550 are supplied empty and removed full by a conveyor 552.

In the embodiment of FIG. 41 two carcass parts 1 are arranged next to each other in a single carrier 50. The system according to FIG. 41 therefore comprises two rotating blades 515 disposed opposite to each other and two feed devices 520 that are arranged opposite each other. Of course, two conveyors 552 that are arranged next to each other are then also present. The rotating blades, feed devices and conveyors are positioned in mirror image relative to each other.

FIG. 42 and FIG. 43 show an overview of the systems and methods according to a third variation of the invention, where various operations are carried out in succession on a carcass part 1 in various processing devices 510. Each processing device 510 is provided with a robot which feeds the harvested part 501 to a tray 550 during the operation concerned. The trays 550 are supplied empty via a conveyor 552 and removed full. The entire system is controlled by a control system 570. The conveyors 552 can be arranged perpendicular to the conveying direction T1 of the carcass parts 1 and/or product carriers 50. An arrangement that is parallel to conveying direction T1 is also possible. Other mutual dispositions are of course also possible, depending on the layout of the entire process. The described embodiments of the systems and methods according to the invention can be used in the set-up shown in FIG. 42 and FIG. 43.

FIG. 44 shows a fourth embodiment of the system and the method according to the invention. In the embodiment of FIG. 44 the harvestable parts 501, in this case drumsticks 6 for example, are placed in a buffer 580 in a predefined orientation. A robot 521 extracts the harvestable parts 501 one by one from the buffer and deposits them in a tray 550 in a predefined orientation. The robot 521 is provided with a gripper 522 for this purpose. The robot 521 also comprises a robot arm 523. This arm can rotate around an axis 525. Should the mutual positions of the buffer 580 and the tray 550 make it necessary, the arm 523 can also have a variable length.

In the example of FIG. 44 a number of drumsticks 6 are deposited into a single tray 550. An attractive and efficient method of depositing a number of drumsticks 6 into a single tray 550 is to lay the successive drumsticks in the tray alternately rotated 180° relative to each other. In the embodiment according to FIG. 44 this is achieved by making the gripper 522 rotatable relative to the robot arm 523.

The robot 521 in the embodiment of FIG. 44 also has a second arm 524. However, it has a fixed mounting relative to the fixed world.

FIG. 45 shows a variation of the embodiment of FIG. 44. In the variant shown in FIG. 45 two harvestable parts 501 are carried by a single product carrier. In this example the harvestable parts are parts of the leg. The product carriers slide the harvestable parts into two adjacent slots 581, 582 of a buffer plate. In this example the buffer plate 538 comprises a plurality of such slots. When the slots have been partly or fully filled the buffer plate is rotated around an axis 584 so that the harvestable parts 501 come within reach of the robot 521. The robot 521 is provided with a gripper 522 which can take one harvestable part 501 out of a slot 581, 582 each time. The robot then takes the extracted harvestable part 501 to a tray 550. In this example the tray 550 can receive multiple harvestable parts 501. It is, of course, also possible for the tray to receive only one harvestable part 501. In the example shown in FIG. 45 the harvestable parts are each deposited in the tray rotated 180° relative to each other. Naturally another configuration can also be chosen. However, the more complicated the configuration, the greater the number of degrees of freedom the robot 521 requires.

In the example of FIG. 45 the system is provided with a camera 541. This camera can be used, for example, to check that the harvestable parts 501 come to lie in the correct position in the tray 550. It is preferable that the camera 541 is linked to an image analysis system.

A conveyor 552 supplies empty trays 550 and removes filled trays 550.

The variation of FIG. 46 strongly resembles the one of FIG. 45. In the variation of FIG. 46 the gripper is, however, equipped in such a manner that it can extract two harvestable parts 501 simultaneously from adjacent slots 581, 582.

The embodiment of FIG. 47 expands on this concept. In this embodiment the gripper also simultaneously extracts two harvestable parts 501 from adjacent slots in the buffer disk 583. The robot now however places the simultaneously extracted harvestable parts 501 in the tray 550 at some distance from each other. The distance at which the harvestable parts 501 are placed in the tray relative to each other provides the space to deposit one of the two harvestable parts from a next duo of harvestable parts 501 in the tray between the two previously deposited harvestable parts. In this way a good presentation of the harvestable parts 501 in the tray 550 can be prepared.

FIG. 48 shows a fifth embodiment of the system and the method according to the invention. In this system a gripper extracts two leg parts from a product carrier 50 at the same time. Then the extracted leg parts 501 are again deposited in a tray 550, in the manner that has already been discussed in connection with FIG. 10 or 11 for example. In this embodiment too it is preferable that a camera 541 checks that the harvestable parts 501, in this case the legs, have arrived in the tray in the desired manner.

FIG. 49 shows a variation of the system that can be used for extracting and packaging drumsticks. The construction of the system of FIG. 49 is the same as the system of FIG. 48.

FIG. 50 shows the application of the system and the method in combination with a harvestable part 501 that has been coated. The presence of the coating requires the use of special product carriers 50' that damage the coating as little as possible. In this variation it is preferable that the gripper 522 that is mounted on the end of a robot arm 523 is based on the same holding principle as the special product carrier 50'.

FIGS. 51-53 relate to a destacker that is suitable for use within the method and the system according to the invention.

FIG. 51 shows an overview of the destacker 560, in which a stack 551 of trays 550 is stacked in a container 561 intended for this purpose. The stack of trays 551 is held by a support 562 that comprises two guides 566. The guides 566 can move simultaneously in a direction that is substantially perpendicular to the vertical direction of the stack of trays. The destacker is provided with a drive 567 to control the guides.

To each guide 566 three bearing plates 562, 563, 564 are attached. The front bearing plate 563 and the back bearing plate 565 are arranged at approximately the same height as the guide 566; the middle bearing plate 564 is arranged higher. When fitted in the destacker the bearing plates of both guides point towards each other as can be seen in FIG. 53.

Destacking takes place in the following manner: in the initial situation the stack 551 of trays 550 rests on the first bearing plate 563 (see FIG. 53A). Next both guides 566 are simultaneously moved in their longitudinal direction. The magnitude and direction of this movement are such that the middle bearing plate 564 comes to lie under the container 561. As the middle bearing plate 564 is arranged higher than the first or front bearing plate 563 the bottom tray 550 of the stack 561 is no longer supported; the middle bearing plate now supports the tray one from the bottom of the stack 551. The bottom tray 550 falls onto the conveyor 552 that is positioned under the destacker.

Next the guides 566 simultaneously move further so that the stack 551 is supported by the third or back bearing plate 565. To this end the guides 566 are moved further such that the back or third bearing plate 565 moves under the container 561. On the subsequent move of the guides 566 in the opposite direction a tray 550 is once again released from the stack. In this way a tray is released on each stroke (that is a movement of the guides in a single direction).

In practice not every tray will fall from the stack under the influence of gravity. The trays in the stack are sometimes pressed so tightly against each other that the tray on the bottom of the stack remains in position even though it is no longer supported by a bearing plate. In order to achieve reliable operation of the destacker even in these circumstances the second, middle, bearing plate, in an advantageous embodiment, has an edge 568, 568' that presses the bottom tray of the stack downwards when the second bearing plate is moved under the stack. Two variations of the edge 568, 568' are shown in FIG. 52B and FIG. 52C.

In the variation shown in FIG. 52B the edge 568 extends in the axial direction of the guide 566. The inclined parts of the edge 568 press the bottom tray in the stack down when the second bearing plate 564 starts to support the stack (except the bottom tray). In the variation shown in FIG. 52C the sides of the second bearing plate 564 that extend transverse to the axial direction of the guide 566 are provided with an inclined edge 568'. This inclined edge 568' can easily be formed by bending down the relevant edges of the bearing plate 564.

In an alternative embodiment each guide 566 comprises only bearing plates 563 and 564. After the release the guides 566 in this embodiment are not moved further in the same direction, but are moved back in an opposite direction in such a way that the stack which was first resting on the second bearing plate 564 now comes to rest on bearing plate 563 again. A subsequent movement of the guides then again releases the next tray 550. In this embodiment a tray is not released on each stroke but with each forward-and-back movement (so once every two strokes).

The drive 570 of both guides can be realized in different ways. In practice it has been found that suitable results can be achieved using a pneumatic drive. Other drives, an electric motor combined with a toothed wheel-gear rack for example, are also conceivable.

The eighth aspect of the invention involves a method for processing a carcass part of slaughtered poultry,
this method comprising the following steps:
performing a process on the carcass part using a processing device, in which the carcass part has a predefined position and orientation in relation to the processing device, during which processing at least a harvestable part of the carcass part is separated from the rest of the carcass part,
conveying the harvestable part to a tray using a feed device, where the orientation of the harvestable part relative to the feed device is known beforehand based on the orientation of the harvestable part relative to the processing device,
depositing the harvestable part of the carcass part in the tray in a predefined position and in a predefined orientation.

In a preferred embodiment of the method according to the eighth aspect of the invention, the harvestable part is placed in a buffer in a predefined orientation prior to being deposited in the tray.

In a preferred embodiment of the method according to the eighth aspect of the invention, the feed device comprises a conveyor and the harvestable part comes to rest on the conveyor in a predefined orientation. Preferably, the harvestable part is deposited in the tray by means of a drop conveyor.

In a preferred embodiment of the method according to the eighth aspect of the invention, the feed device comprises a robot. Preferably, the robot deposits the harvestable part in the tray. Preferably, the robot holds the harvestable part during separation of the harvestable part from the rest of the carcass part. If in this preferred embodiment the robot deposits the harvestable part in the tray and the robot holds the harvestable part during separation of the harvestable part from the rest of the carcass part, preferably the robot holds the harvestable part from separation of the harvestable part from the rest of the carcass part until the harvestable part is deposited in the tray.

In the preferred embodiment of the method according to the eighth aspect of the invention in which the feed device comprises a robot, preferably, the robot comprises at least a first arm. Preferably, this first arm is rotatable around a first rotation axis, this first rotation axis being arranged substantially perpendicular to the longitudinal direction of the first arm. Preferably, the first arm has a variable length. Preferably, the robot further has a second arm which is hingedly connected to the first arm, this second arm having a fixed, extendable or pivotable mounting.

In the preferred embodiment of the method according to the eighth aspect of the invention in which the feed device comprises a robot, preferably the robot always makes the same movement when successively depositing a number of harvestable parts of carcass parts.

In a preferred embodiment of the method according to the eighth aspect of the invention, the feed device comprises a gripper, which gripper is used to handle the harvestable part while the harvestable part is fed into the tray. Preferably, the gripper is made of stainless steel. Preferably, the gripper is eccentrically mounted on a robot arm. Preferably, the gripper is eccentrically mounted on a robot arm and the gripper is rotatable relative to the robot arm. Preferably, the gripper holds the harvestable part of the carcass part during separation of the harvestable part from the rest of the carcass part.

In a preferred embodiment of the method according to the eighth aspect of the invention, the harvestable part is checked for unwanted bone parts. Preferably, the check for unwanted bone parts is performed using an X-ray device.

In a preferred embodiment of the method according to the eighth aspect of the invention, the harvestable part is visually inspected. Preferably, the visual inspection is carried out with the aid of a camera.

In the preferred embodiment of the method according to the eighth aspect of the invention in which the harvestable part is checked for unwanted bone parts and/or visually inspected the check or inspection is carried out after the harvestable part has been deposited into the tray.

In a preferred embodiment of the method according to the eighth aspect of the invention, a number of harvestable parts from one or more carcass parts are deposited in a tray. Preferably, the harvestable parts are deposited in the tray in a predefined position in relation to each other. Preferably, the tray is moved between a first harvestable part and a subsequent harvestable part being deposited in the tray in order to achieve the desired mutual position of both harvestable parts in the tray. Preferably, a number of harvestable parts are deposited in the tray simultaneously.

In a preferred embodiment of the method according to the eighth aspect of the invention, the harvestable part of the carcass part is a breast fillet.

In a preferred embodiment of the method according to the eighth aspect of the invention, the harvestable part of the carcass part is a leg or a part of a leg.

In a preferred embodiment of the method according to the eighth aspect of the invention, the harvestable part has been provided with a coating.

In a preferred embodiment of the method according to the eighth aspect of the invention, the tray also forms the transport packaging of the harvestable part.

In a preferred embodiment of the method according to the eighth aspect of the invention, the tray is fed from a destacker to the location at which a harvestable part will be deposited in the tray. Preferably, this method further comprising the following steps:

placing a stack of at least two trays in a holder,
supporting the stack of trays using a carrier, which carrier comprises two guides that are moveable simultaneously, each of which is provided with, in succession, a first, a second and a third bearing plate, in which the first and the third bearing plate lie mainly in line with each other and the second bearing plate is higher than the first and third bearing plate, and in which the stack of trays is supported on the first bearing plate,
simultaneously moving the guides, so that the second bearing plate supports the tray that is one from the bottom of the stack and the bottom tray of the stack is no longer supported,
simultaneously moving the guides further so that the third bearing plate supports that tray which is then the bottom of the stack.

The eight aspect of the invention further involves a system for processing a carcass part of slaughtered poultry,
this system comprising:
a product carrier for holding the carcass part,
a processing device for performing a process on the carcass part, in which the carcass part is in a predefined position and orientation in relation to the processing direction, during which processing at least one harvestable part of the carcass part is separated from the rest of the carcass part,
a powerable feed device for feeding the harvestable part of the carcass part into a tray, where the orientation of the harvestable part in relation to the feed device is known beforehand based on the orientation of the harvestable part in relation to the processing device,
a packaging station for holding a tray into which the feed device can deposit the harvestable part in a predefined position and with a predetermined orientation.

In a preferred embodiment of the system according to the eighth aspect of the invention, the system also comprises a buffer for receiving one or more harvestable parts prior to their being deposited in the tray, in which the orientation of each harvestable part is known during the stay of the harvestable part in the buffer.

In a preferred embodiment of the system according to the eighth aspect of the invention, the feed device comprises a conveyor. Preferably, the feed device also comprises a drop conveyor for depositing the harvestable part in the tray.

In a preferred embodiment of the system according to the eighth aspect of the invention, the feed device comprises a robot. Preferably, the robot comprises a first arm and a second arm. Preferably, the second arm is pivotable around a first rotation axis, which first rotation axis is arranged substantially perpendicular to the longitudinal direction of the second arm. Preferably, at least the second arm is of variable length. Preferably, the first arm of the robot has a fixed mounting.

In a preferred embodiment of the system according to the eighth aspect of the invention, the feed device comprises a gripper for handling the harvestable part while the harvestable part is being fed into the tray. Preferably, the gripper is made of stainless steel. Preferably, the gripper is mounted eccentrically on a robot arm. Preferably, the gripper is mounted eccentrically on a robot arm and the gripper is rotatable relative to the robot arm.

In a preferred embodiment of the system according to the eighth aspect of the invention, the system also comprises a checking device for checking the harvestable part for unwanted bone parts. Preferably, the checking device comprises an X-ray device.

In a preferred embodiment of the system according to the eighth aspect of the invention, the system also comprises an inspection station to visually inspect the harvestable part. Preferably, the inspection station comprises a camera.

In a preferred embodiment of the system according to the eighth aspect of the invention, the system also comprises a displacing device to displace the tray between a first harvestable part being deposited in the tray and a subsequent harvestable part in order to achieve the desired mutual position of both harvestable parts in the tray.

In a preferred embodiment of the system according to the eighth aspect of the invention, the system also comprises a destacker to feed a tray to the location in which a harvestable part will be deposited in the tray. Preferably, the destacker comprises:
- a container to contain a stack of trays,
- a carrier to support the stack of trays, which carrier has two guides that are moveable simultaneously, each of which has, in succession, a first, a second and a third bearing plate, in which the first and the third bearing plate lie substantially in line with each other and the second bearing plate is higher than the first and third bearing plate,
- a drive to simultaneously move the guides.

Preferably, the second bearing plate further comprises at least an edge for pressing down the tray that is to be removed from the stack.

List of Latin names for the muscles shown in FIGS. 1A, 1B and 5:

A1—M. pectoralis superficialis A2—M. obliquus externus abdominis; A3—M. obliquus internus abdominis; A4—M. cutaneus pectoralis cranialis; A5—M. cutaneus pectoralis caudalis; A6—M. patagialis; A7—M. tensor patagii longus; A8—cutaneus costohumeralis; A9—M. cutaneus iliacus; A10—M. biceps brachii; A11—M. triceps brachii, caput mediale; A12—M. expansor secundarium; A13—M. triceps brachii, caput dorsale; A14—M. latissimus dorsi, pars cranialis; A15—M. teres major et infraspinatus; A16—M. latissimus dorsi, pars caudalis; A17—M. rhomboideus; A18—M. serratus magnus; A19—M. levator caudae; A20—M. levator rectricum; A21—M. depressor caudae; A22—M. basirectricales; A23—M. depressor rectricum; A24—M. caudalis lateralis; A25—M. levator ani; A26—M. transversus perinei; A27—M. sphincter ani; A28—Bursa Fabricii.

B1—M. biceps brachii; B2—M. triceps brachii; B3—M. expansor secundarium; B4—M. latissimus dorsi; B5—M. teres major et infraspinatus; B6—M. serratus magnus; B7—M. serratus ventralis; B8. Mm. levatores costarum; B9—M. sternocostalis; B10—obliquus externus abdominis; B11—M. Aponeurois m. obliqui externi abdominis; B12—Mm. intercostales externi; B13—Mm. subcostales; B14—M. pectoralis superficialis; B15—M. pectoralis profundus; B16—M. coracobrachialis externus; B17—M. coracobrachialis internus; B18—M. coracobrachialis dorsalus; B19—M. subscapularis.

The invention claimed is:

1. A method for processing a carcass part of slaughtered poultry, the carcass part comprising:
   bone parts with at least a part of the back of the rib cage and the spine; and
   at least a part of the meat that is naturally present on the back of the rib cage and the spine,
   the method comprising the steps of:
   detaching a part of the back meat from the underlying bone parts of the carcass part; and
   engaging at least a part of the detached back meat, and then peeling the back meat off the bone parts of the carcass part.

2. The method according to claim 1, wherein the back meat is engaged by at least two rotating rollers, each of the two rotating rollers being provided with a profile, and wherein the two rotating rollers peel the back meat off the bone parts of the carcass.

3. The method according to claim 1, wherein the carcass part is advanced in a conveying direction in relation to the rollers during engaging and/or peeling-off, and wherein the rotating rollers move the back meat in a direction that is opposite to the conveying direction.

4. The method according to claim 3, wherein the carcass part is moved at least partly between the rollers.

5. The method according to claim 1, wherein during engaging of the back meat, the carcass part is oriented such that the previously detached part of the back meat hangs free from the bone parts of the carcass part.

6. The method according to claim 3, wherein the carcass part is pivoted around an axis that lies substantially perpendicular to a plane of symmetry of the carcass part while the back meat is peeled off.

7. The method according to claim 1, wherein the carcass part is arranged onto a product carrier and the product carrier engages on the inside of the carcass part.

8. A device for processing a carcass part of slaughtered poultry, the carcass part comprising:
   bone parts with at least a part of the back of the rib cage and the spine; and
   at least a part of the back meat that is naturally present on the back of the rib cage and the spine, which back meat has been partly detached from the bone parts of the carcass part,
   the device comprising:
   a gripper for engaging on at least a part of the previously detached back meat; and
   a peeler for peeling the back meat off the bone parts of the carcass.

9. The device according to claim 8, wherein the device further comprises at least two rotatable rollers, each of the two rotatable rollers being provided with a profile on the outer periphery, and wherein the rollers form part of both the gripper and the peeler.

10. The device according to claim 9, wherein profile of the two rotatable rollers is helical.

11. The device according to claim 9, wherein the rollers are mounted substantially parallel.

12. The device according to any of the claim 9, wherein, during operation, the carcass parts are moved in a conveying direction relative to the rollers, and the axial direction of the rollers and the conveying direction of the carcass part form a relative angle at the location of the rollers.

13. The device according to claim 9, wherein the rollers are positioned at some distance from each other and the distance between the rollers has such dimensions that it allows the carcass part to move at least partly in between of the rollers.

14. The device according to claim 9, wherein the rollers are resiliently mounted.

15. The device according to claim 8, wherein the device further comprises four substantially parallel rollers, each of the rollers being provided with a profile for engaging the back meat and peeling the back meat off the bone parts of the carcass.

16. The device according to claim 15, wherein the profile of the four parallel rollers is helical.

17. The device according to claim 15, wherein the rollers are arranged relative to each other in such a manner that, as seen in the axial direction of the rollers, the rollers approximate the contour of the carcass part as seen in the direction of the spine.

* * * * *